(12) United States Patent
Turnbull et al.

(10) Patent No.: US 7,327,226 B2
(45) Date of Patent: Feb. 5, 2008

(54) VEHICLE REARVIEW MIRROR ASSEMBLY INCORPORATING A COMMUNICATION SYSTEM

(75) Inventors: Robert R. Turnbull, Holland, MI (US); Robert C. Knapp, Coloma, MI (US); Eric J. Walstra, Grand Rapids, MI (US); Alan R. Watson, Buchanan, MI (US); G. Bruce Poe, Hamilton, MI (US); John K. Roberts, East Grand Rapids, MI (US); Wayne J. Rumsey, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 160 days.

(21) Appl. No.: 11/315,866

(22) Filed: Dec. 22, 2005

(65) Prior Publication Data

US 2006/0097855 A1 May 11, 2006

Related U.S. Application Data

(62) Division of application No. 09/827,304, filed on Apr. 5, 2001, now Pat. No. 6,980,092.

(60) Provisional application No. 60/242,465, filed on Oct. 23, 2000, provisional application No. 60/216,297, filed on Jul. 6, 2000, provisional application No. 60/195,509, filed on Apr. 6, 2000.

(51) Int. Cl.
*B60Q 1/00* (2006.01)
*H04M 1/00* (2006.01)

(52) U.S. Cl. ............................ 340/425.5; 340/426.15; 340/539.1; 455/575.5; 343/711; 343/720; 362/494

(58) Field of Classification Search ............. 455/575.5; 340/426.15, 425.5
See application file for complete search history.

(56) References Cited

U.S. PATENT DOCUMENTS 3,099,797 A 7/1963 Piccinini (Continued)

FOREIGN PATENT DOCUMENTS

DE 19640735 4/1998

(Continued)

OTHER PUBLICATIONS

René Nüsser and Rodolfo Mann Pelz, "Bluetooth-based Wireless Connectivity in an Automotive Environment," 2000, pp. 1935-1942.

(Continued)

*Primary Examiner*—Donnie L. Crosland
(74) *Attorney, Agent, or Firm*—Price, Heneveld, Cooper, DeWitt & Litton LLP

(57) ABSTRACT

A vehicle communication and control system is provided that may be more readily installed in a vehicle and that utilizes minimal additional wiring. According to some of the disclosed embodiments, the electrical components of the "brick" of a communication and control system are integrated into a rearview mirror assembly. Preferably, the microwave antenna for the GPS and the cellular telephone antenna are also integrated into the rearview mirror assembly. Various functions and features of the system are also disclosed.

8 Claims, 24 Drawing Sheets

U.S. PATENT DOCUMENTS

| | | |
|---|---|---|
| 4,056,696 A | 11/1977 | Meyerle et al. |
| 4,241,870 A | 12/1980 | Marcus |
| 4,247,850 A | 1/1981 | Marcus |
| 4,362,907 A | 12/1982 | Polacsek |
| 4,447,808 A | 5/1984 | Marcus |
| 4,588,267 A | 5/1986 | Pastore |
| 4,625,210 A | 11/1986 | Sagl |
| 4,630,904 A | 12/1986 | Pastore |
| 4,680,787 A | 7/1987 | Marry |
| D294,495 S | 3/1988 | Nissley |
| 4,733,336 A | 3/1988 | Skogler et al. |
| 4,737,976 A | 4/1988 | Borth et al. |
| 4,760,394 A | 7/1988 | Takeuchi et al. |
| 4,827,520 A | 5/1989 | Zeinstra |
| 4,870,676 A | 9/1989 | Lewo |
| 4,875,229 A | 10/1989 | Palett et al. |
| 4,881,258 A | 11/1989 | Kaiwa et al. |
| 4,905,270 A | 2/1990 | Ono |
| 4,905,304 A | 2/1990 | Bardon et al. |
| 4,930,742 A | 6/1990 | Schofield et al. |
| 4,943,796 A | 7/1990 | Lee |
| D315,890 S | 4/1991 | Lewo |
| D316,242 S | 4/1991 | Lewo |
| 5,029,233 A | 7/1991 | Metroka |
| D326,450 S | 5/1992 | Watanabe |
| 5,177,685 A | 1/1993 | Davis et al. |
| D337,582 S | 7/1993 | Lewo |
| 5,239,586 A | 8/1993 | Marui |
| 5,299,132 A | 3/1994 | Wortham |
| 5,353,376 A | 10/1994 | Oh et al. |
| 5,398,190 A | 3/1995 | Wortham |
| 5,454,027 A | 9/1995 | Kennedy et al. |
| 5,455,716 A | 10/1995 | Suman et al. |
| 5,513,111 A | 4/1996 | Wortham |
| 5,519,621 A | 5/1996 | Wortham |
| 5,546,458 A | 8/1996 | Iwami |
| 5,566,224 A | 10/1996 | ul Azam et al. |
| 5,576,687 A | 11/1996 | Blank et al. |
| 5,579,376 A | 11/1996 | Kennedy, III et al. |
| 5,631,638 A | 5/1997 | Kaspar et al. |
| 5,649,316 A | 7/1997 | Prudhomme et al. |
| 5,649,317 A | 7/1997 | Suzuki |
| 5,659,594 A | 8/1997 | Toda |
| 5,671,996 A | 9/1997 | Bos et al. |
| 5,673,325 A | 9/1997 | Andrea et al. |
| 5,745,850 A | 4/1998 | Aldermeshian et al. |
| 5,754,665 A | 5/1998 | Hosoi |
| 5,760,962 A | 6/1998 | Schofield et al. |
| 5,798,688 A | 8/1998 | Schofield |
| 5,815,820 A | 9/1998 | Kiem et al. |
| 5,829,782 A | 11/1998 | Breed et al. |
| 5,835,607 A | 11/1998 | Martin et al. |
| 5,878,353 A | 3/1999 | ul Zam et al. |
| 5,889,474 A | 3/1999 | LaDue |
| 5,898,392 A | 4/1999 | Bambini et al. |
| 5,899,956 A | 5/1999 | Chan |
| 5,917,921 A | 6/1999 | Sasaki et al. |
| 5,938,321 A | 8/1999 | Bos et al. |
| 5,940,503 A | 8/1999 | Palett et al. |
| 5,971,552 A | 10/1999 | O'Farrell et al. |
| 6,011,518 A | 1/2000 | Yamagishi et al. |
| 6,019,475 A | 2/2000 | Lynam et al. |
| 6,026,162 A | 2/2000 | Palett et al. |
| 6,028,537 A | 2/2000 | Suman et al. |
| 6,069,588 A | 5/2000 | O'Neill, Jr. |
| 6,081,237 A | 6/2000 | Sato et al. |
| 6,127,919 A | 10/2000 | Wylin |
| 6,131,042 A | 10/2000 | Lee et al. |
| 6,158,655 A | 12/2000 | DeVries, Jr. et al. |
| 6,198,947 B1 | 3/2001 | Barber |
| 6,239,928 B1 | 5/2001 | Whitehead et al. |
| 6,243,003 B1 | 6/2001 | DeLine et al. |
| 6,246,765 B1 | 6/2001 | Palett et al. |
| 6,278,377 B1 | 8/2001 | DeLine et al. |
| 6,285,757 B1 | 9/2001 | Carroll et al. |
| 6,294,989 B1 | 9/2001 | Schofield et al. |
| 6,326,613 B1 | 12/2001 | Heslin et al. |
| 6,329,925 B1 | 12/2001 | Skiver et al. |
| 6,366,213 B2 | 4/2002 | DeLine et al. |
| 6,366,622 B1 | 4/2002 | Brown et al. |
| 6,396,408 B2 | 5/2002 | Drummond et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,466,136 B2 | 10/2002 | DeLine et al. |
| 6,477,464 B2 | 11/2002 | McCarthy et al. |
| 6,520,667 B1 | 2/2003 | Mousseau |
| 6,528,782 B1 | 3/2003 | Zhang et al. |
| 6,547,133 B1 | 4/2003 | DeVries, Jr. et al. |
| 6,549,793 B1 | 4/2003 | Baratono |
| 6,553,308 B1 | 4/2003 | Uhlmann et al. |
| 6,559,769 B2 | 5/2003 | Anthony et al. |
| 6,587,756 B2 | 7/2003 | Moriguchi et al. |
| 6,614,911 B1 | 9/2003 | Watson et al. |
| 6,625,426 B2 | 9/2003 | Baratono et al. |
| 6,625,503 B1 | 9/2003 | Smith |
| 6,633,482 B2 | 10/2003 | Rode |
| 6,650,233 B2 | 11/2003 | DeLine et al. |
| 6,672,744 B2 | 1/2004 | DeLine et al. |
| 6,690,956 B2 | 2/2004 | Chua et al. |
| 6,693,517 B2 | 2/2004 | McCarthy et al. |
| 6,717,524 B2 | 4/2004 | DeLine et al. |
| 6,728,375 B1 | 4/2004 | Palett et al. |
| 6,735,506 B2 | 5/2004 | Breed et al. |
| 6,766,233 B2 | 7/2004 | Odinak et al. |
| 6,831,978 B2 | 12/2004 | Vandivier |
| 6,832,719 B2 | 12/2004 | DeVries, Jr. et al. |
| 6,882,734 B2 | 4/2005 | Watson et al. |
| 6,889,064 B2 | 5/2005 | Baratono et al. |
| 6,906,632 B2 | 6/2005 | DeLine et al. |
| 6,909,361 B2 | 6/2005 | McCarthy et al. |
| 6,980,092 B2 * | 12/2005 | Turnbull et al. ......... 340/425.5 |
| 2001/0030598 A1 | 10/2001 | DeLine et al. |
| 2002/0004416 A1 | 1/2002 | Baratono et al. |
| 2002/0013730 A1 | 1/2002 | Bigus |
| 2002/0030588 A1 | 3/2002 | DeLine et al. |
| 2002/0032510 A1 | 3/2002 | Turnbull et al. |
| 2002/0044065 A1 | 4/2002 | Quist et al. |
| 2002/0082058 A1 | 6/2002 | Baratono |
| 2002/0191409 A1 | 12/2002 | DeLine et al. |
| 2002/0197955 A1 | 12/2002 | Witkowski et al. |
| 2003/0020603 A1 | 1/2003 | DeLine et al. |
| 2003/0127513 A1 | 7/2003 | DeVries, Jr. et al. |
| 2003/0228879 A1 | 12/2003 | Witkowski et al. |
| 2004/0028239 A1 | 2/2004 | Watson et al. |
| 2004/0106427 A1 | 6/2004 | Collavo et al. |
| 2004/0110472 A1 | 6/2004 | Witkowski et al. |
| 2004/0142675 A1 | 7/2004 | Chen |
| 2004/0152494 A1 | 8/2004 | Huang |
| 2004/0160313 A1 | 8/2004 | McCarthy et al. |
| 2004/0196969 A1 | 10/2004 | Palett et al. |
| 2004/0199310 A1 | 10/2004 | DeLine et al. |
| 2004/0203379 A1 | 10/2004 | Witkowski et al. |
| 2004/0204159 A1 | 10/2004 | Van Bosch |
| 2004/0204163 A1 | 10/2004 | Ou |
| 2004/0204192 A1 | 10/2004 | Holloway et al. |
| 2004/0246607 A1 | 12/2004 | Watson et al. |
| 2005/0007256 A1 | 1/2005 | DeLine et al. |
| 2005/0090279 A9 | 4/2005 | Witkowski et al. |

FOREIGN PATENT DOCUMENTS

| | | |
|---|---|---|
| EP | 0846598 | 6/1998 |

| | | |
|---|---|---|
| EP | 1078818 | 2/2001 |
| GB | 2356312 | 5/2001 |
| JP | 0385949 | 4/1991 |
| JP | 179989 | 3/1992 |
| JP | 4290044 | 10/1992 |
| JP | 5162590 | 6/1993 |

OTHER PUBLICATIONS

Dipl.-Ing. (FH) E. Hafner, Radolfzell, "Advanced Domelight Module—A study of modularity versus complexity," 1996, pp. 569-582 (no translation).

* cited by examiner

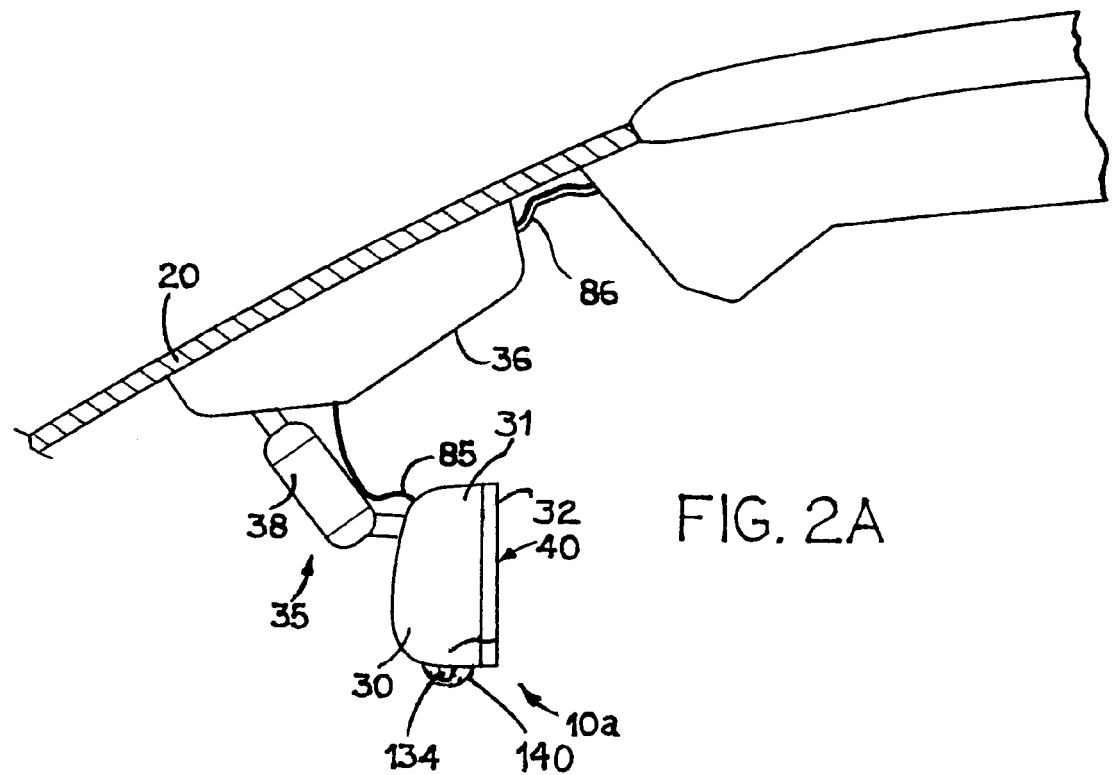
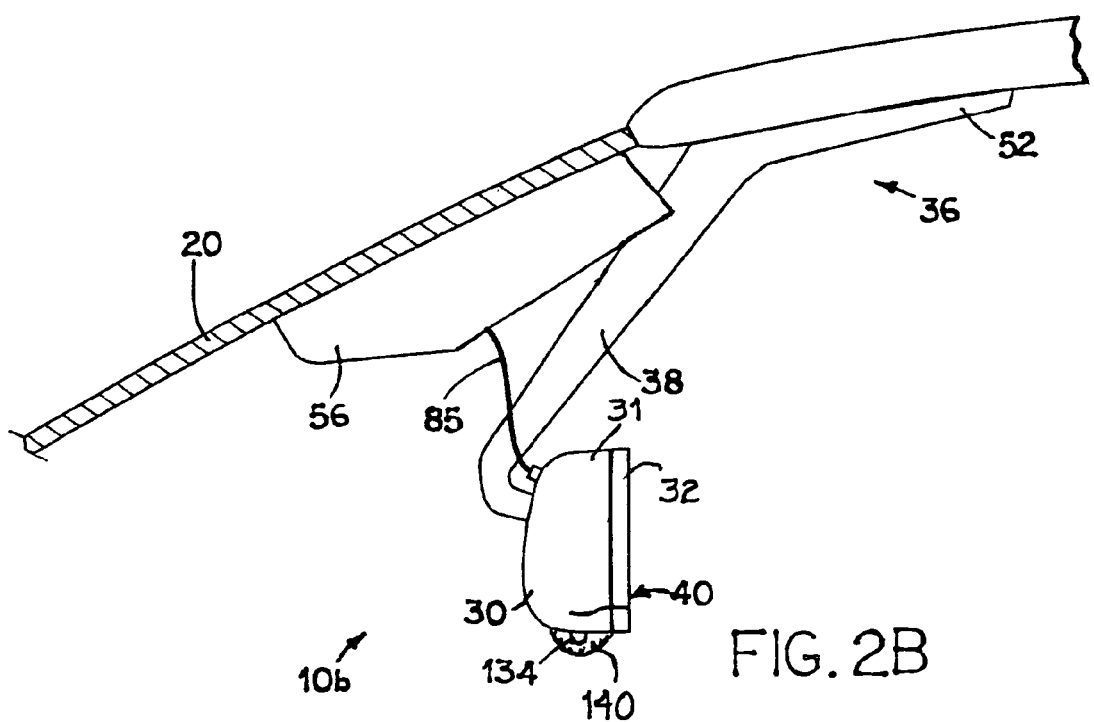

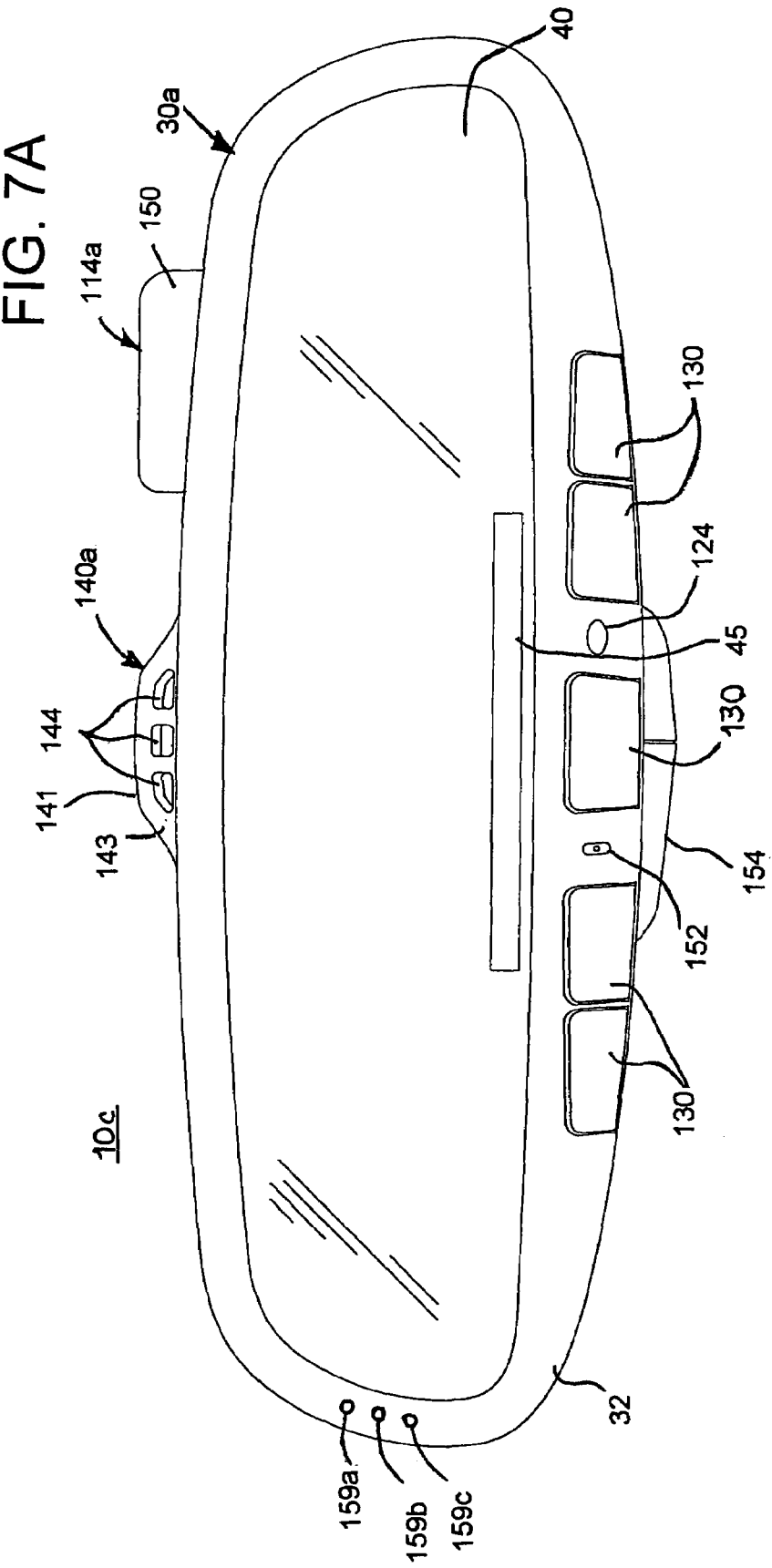

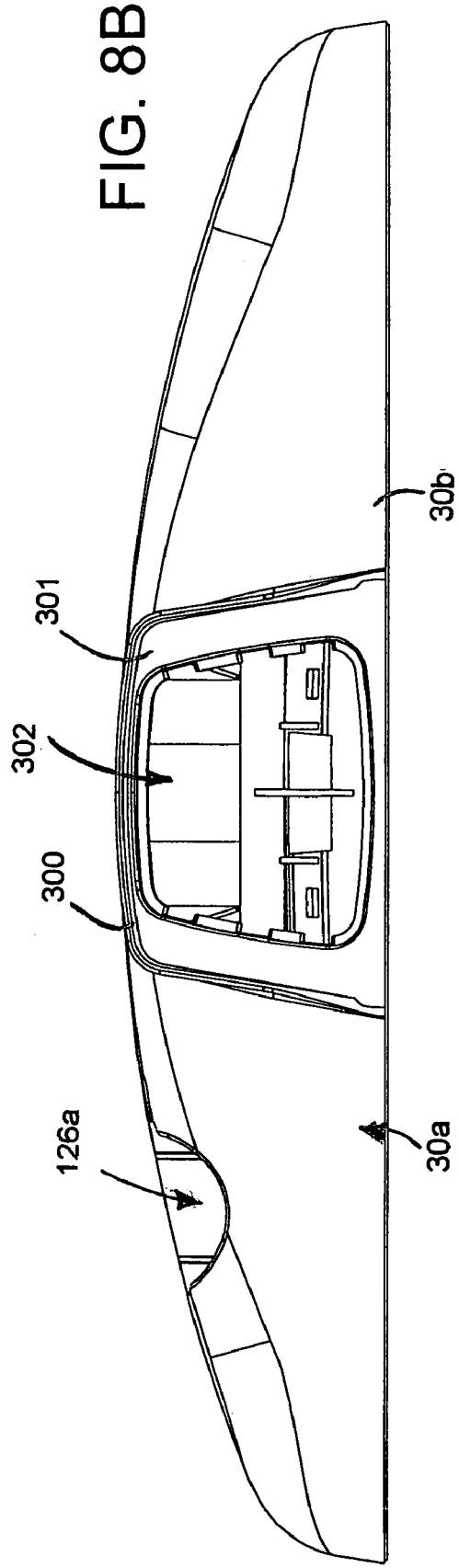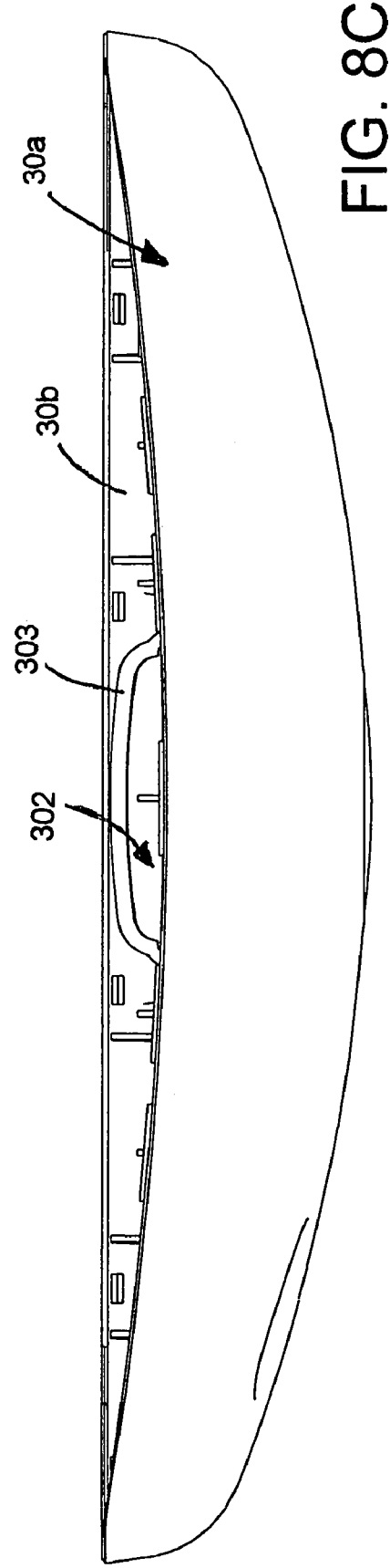

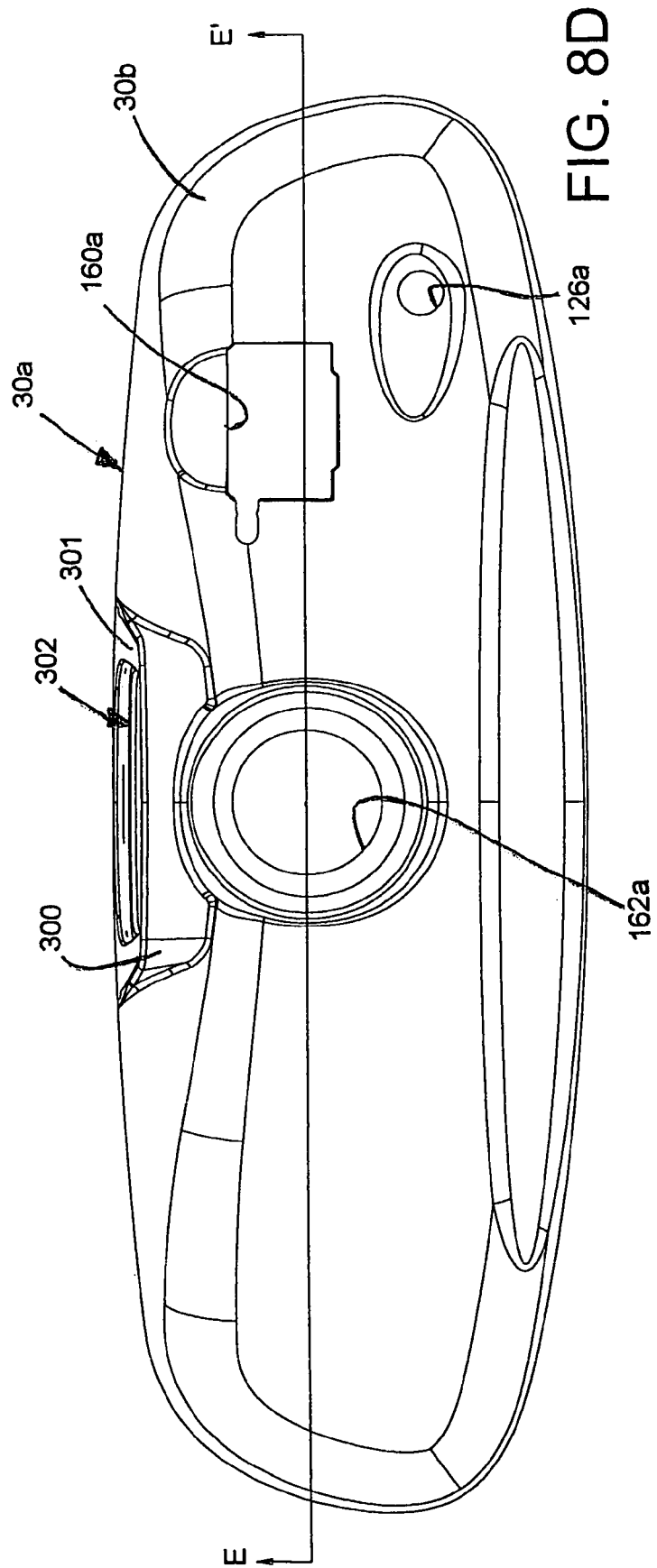
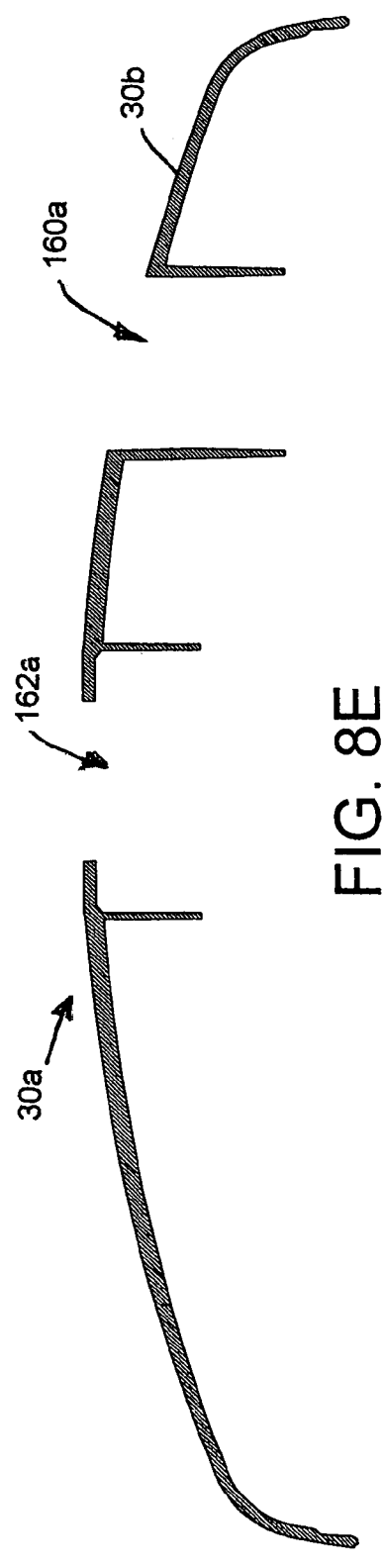
FIG. 8D
FIG. 8E

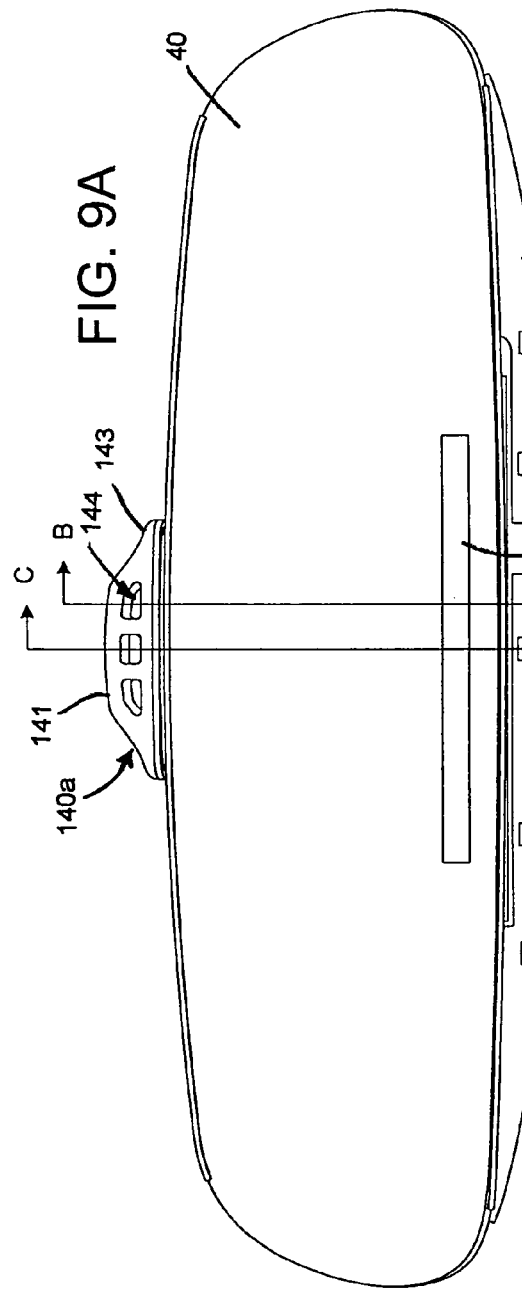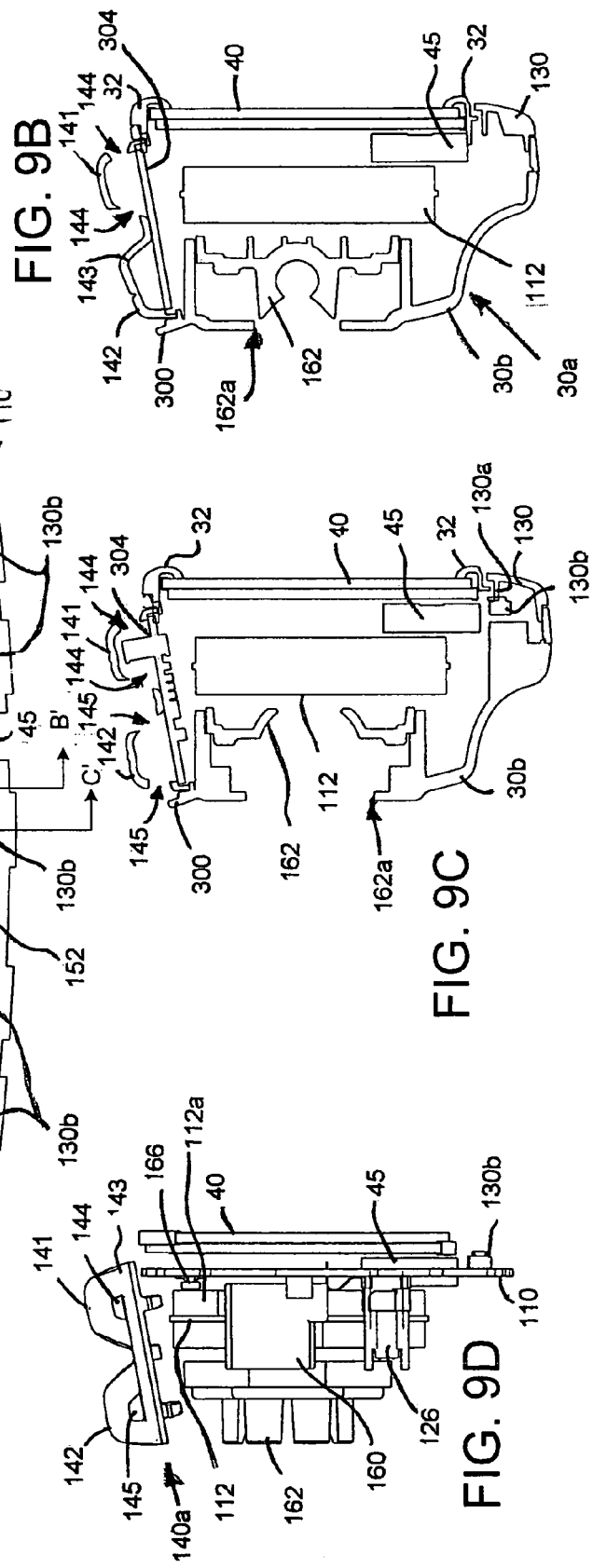

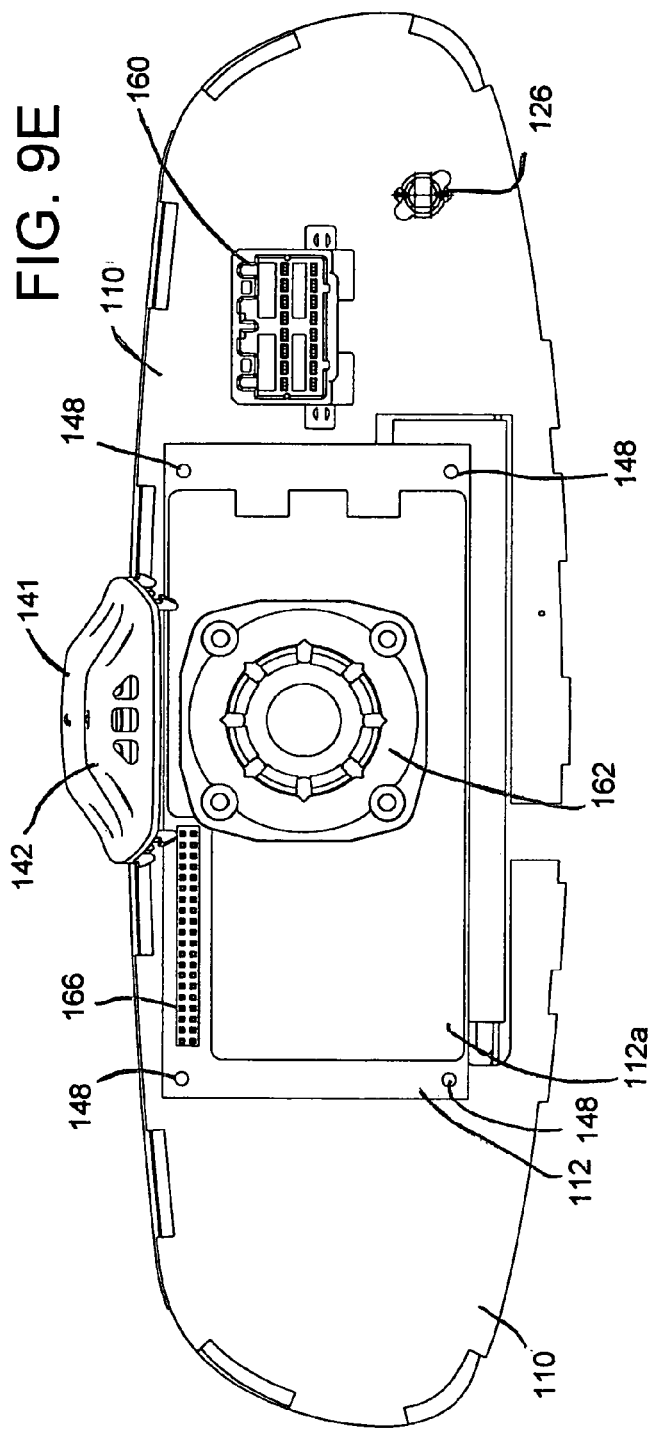

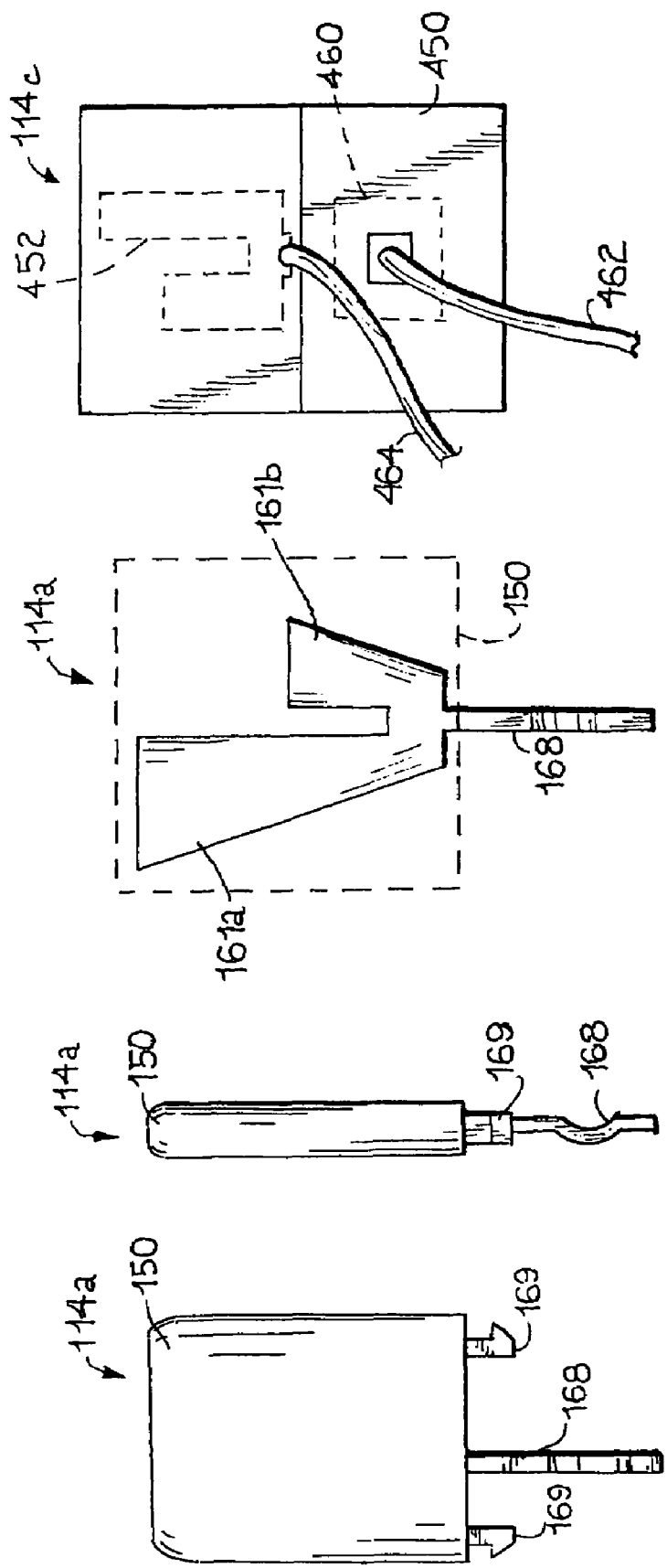

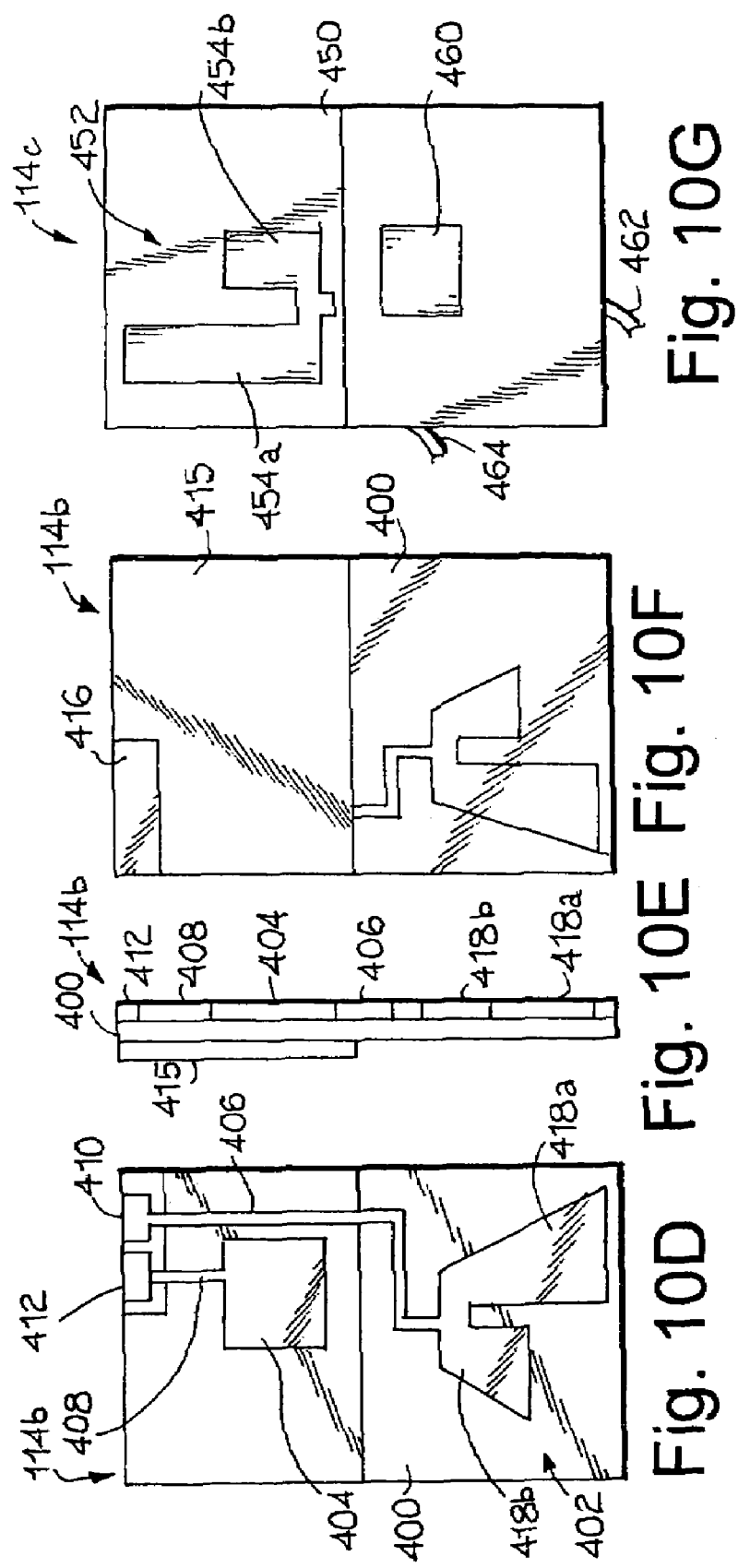

VEHICLE REARVIEW MIRROR ASSEMBLY INCORPORATING A COMMUNICATION SYSTEM

CROSS-REFERENCE TO RELATED APPLICATIONS

This application is a divisional of U.S. patent application Ser. No. 09/827,304 entitled VEHICLE REARVIEW MIRROR ASSEMBLY INCORPORATING A COMMUNICATION SYSTEM, filed on Apr. 5, 2001, by Robert R. Turnbull et al. now U.S. Pat. No. 6,980,092, and claims priority under 35 U.S.C. § 119(e) on U.S. Provisional Application No. 60/242,465 entitled VEHICLE REARVIEW MIRROR ASSEMBLY INCORPORATING A COMMUNICATION SYSTEM, filed on Oct. 23, 2000, by Robert R. Turnbull et al.; U.S. Provisional Application No. 60/216,297 entitled VEHICLE REARVIEW MIRROR ASSEMBLY INCORPORATING A COMMUNICATION SYSTEM, filed on Jul. 6, 2000, by Robert R. Turnbull et al.; and to U.S. Provisional Application No. 60/195,509 entitled VEHICLE REARVIEW MIRROR ASSEMBLY INCORPORATING A COMMUNICATION SYSTEM, filed on Apr. 6, 2000, by Robert R. Turnbull et al., the entire disclosures of which are incorporated herein by reference.

BACKGROUND OF THE INVENTION

The present invention generally relates to a rearview mirror assembly for a vehicle and vehicle communication and control systems.

Vehicle communication and control systems are commercially available that provide a wide variety of communication and control functions. An example of such a system is the ONSTAR® system from General Motors Corporation. Another example of such a system is disclosed in U.S. Pat. No. 6,028,537. Each of these systems includes a cellular telephone, a vehicle position identification system (specifically GPS), a processor, and a connection to the vehicle bus. These interconnected elements not only provide for conventional hands-free telephone operation, but also enable a number of other communication operations and remote vehicle control functions. For example, such a system may automatically call 9-1-1 and transmit the vehicle location (as provided by the GPS) when the vehicle air bags inflate, or enable a driver to request roadside assistance or ask for navigational directions at the touch of a button. These systems also enable remote control of vehicle functions such as remote door locking or unlocking and reprogramming/personalization of vehicle accessories. Additionally, such systems may provide for remote diagnostics of the vehicle. The systems may also allow for transmittal and reception of text/paging messages and enable the vehicle to be tracked by the owner or the police.

The ONSTAR® system has been implemented by providing an electronic module, also known and referred to as a "brick," which incorporates most of the system electronics including the GPS receiver, the telephone circuitry, and essentially all the electrical components for the system except for the antennae in the vehicle trunk or under or behind the seats. The GPS microwave antenna is mounted elsewhere in the vehicle and connected to the brick by a coaxial cable. The cellular telephone antenna is typically mounted on a side window of the vehicle and is connected to the telephone receiver by a coaxial cable. The user interface, which includes the speaker, microphone, and pushbuttons, is mounted near the driver and hardwired to the brick. Additionally, the brick must be wired to the vehicle battery and/or ignition. These types of systems may also be connected to the vehicle bus (CAN, J1850, etc.), the door locks, the air bags, the vehicle radio, to any RS232, RS-422 or other serial communication ports, and to any diagnostic circuits. All this wiring makes the system difficult and expensive to implement. When offered as a dealer-installed option, the wiring complexity of the ONSTAR® system becomes even more of a problem.

Despite all the research that has been conducted and all the literature that has been generated relating to the use of position identification systems (GPS) in vehicular applications, little consideration had been given to the practicalities of where to mount the microwave antenna that is to receive the microwave signals from the satellites. The ONSTAR® system has the microwave antenna mounted behind the front windshield just beneath the headliner or on the rear deck proximate the rear windshield. This antenna mounting is described in U.S. Pat. No. 5,959,581. Installing the antenna in this position is difficult. Published International Application No. WO 97/21127 discloses the mounting of two separate microwave antennas in the two external rearview mirror housings of the vehicle. While there are two microwave antennas located in the external rearview mirror housings, the system receiver circuit is located in the interior of the vehicle. The separation of the receiver circuit from the antennas introduces significant manufacturing difficulties. Coaxial cable typically used to connect the antenna to the receiver is expensive and difficult to handle in a manufacturing process, since it cannot be kinked and is relatively difficult to terminate. Furthermore, such coaxial cable typically has relatively expensive push-on or screw-on type connectors that connect it to the system receiver circuit and/or microwave antenna. Additionally, vehicle manufacturers have expressed an unwillingness to require their assembly line workers to connect the components using such a coaxial connector.

While WO 97/21127 further suggests that the antenna could additionally be positioned within an interior mirror of the vehicle, doing so is not preferred because the interior mirror is movable with respect to the passenger compartment, which may introduce error in the vehicle position measurements. Also, it is better to manufacture because it puts all the electronics in one housing and is more cost effective. However, it does not work as well. In general, GPS is a line of sight system. The more sky the antenna can "see," the better the system will perform. Having the antenna mounted to the channel mount by the glass allows better visibility of the sky and hence performance. Also, it is desirable to reduce the variability inherent in the design. Having an antenna and its radiation pattern changing as different people get in the car and adjust the mirror is extremely undesirable. Further, WO 97/21127 additionally states that metallic coatings on the vehicle windshield may interfere with the operation of a receiving antenna when mounted in an interior rearview mirror assembly. Additionally, like the configuration where the receiving antennas are mounted in the two exterior mirrors, the mounting of the receiving antenna in the interior rearview mirror housing also presents manufacturing problems associated with connecting the antenna with the receiver, which apparently is mounted in the vehicle instrument panel. In the ONSTAR® system, the GPS receiver is mounted in the brick which, in turn, is mounted in the vehicle trunk or under or behind one of the seats.

As noted above, it is very difficult to install a vehicle communication and control system in a vehicle. Furthermore, the next vehicle model this system is added to is likely to require a different installation. Tooling of parts for the vehicle may have to be modified to hold the brick and the antennas. Space has to be allowed for all the wiring between the user interface, the vehicle, the audio system, the GPS antenna, the cellular antenna, and the brick. Each car may require a slightly different installation and have tooling modified and extra parts tooled to accommodate the system being added.

There exists the need for a vehicle communication and control system that may be more readily installed in a vehicle and that utilizes minimal added wiring.

SUMMARY OF THE INVENTION

One aspect of the present invention is to provide a vehicle communication and control system that may be more readily installed in a vehicle and that utilizes minimal additional wiring. To achieve this and other aspects and advantages, the electrical components of the "brick" of a communication and control system are integrated into a rearview mirror assembly. Preferably, the microwave antenna for the GPS and the cellular telephone antenna are also integrated into the rearview mirror assembly. While it is preferable to integrate all the components of the system into the rearview mirror assembly in order to reduce the need to run additional wiring and to provide a system that is much easier to install, the present invention broadly is considered to be the combination of any two or more of the following components integrated within a rearview mirror assembly: a microwave antenna, a microwave receiver, a wireless communication device, such as a cellular telephone and its antenna, a Bluetooth™ transceiver, a Bluetooth™ controller, a Bluetooth™ antenna, at least one microphone, a digital signal processor, at least one speaker, a speech synthesizer, a voice recognition circuit including any voice recognition software, an electrochromic mirror, an electronic compass, map lamps, a moisture sensor, a headlamp sensor, a back-up power supply, a display, a vehicle bus interface, and an audio processing circuit. The present invention broadly pertains not only to various combinations of the above features, but also to the various disclosed, inherent, and implicit benefits and functions that flow from such features.

According to one embodiment of the present invention, a rearview assembly is provided for a vehicle. The rearview mirror assembly comprises a mirror mounting structure including a mirror housing and adapted to be mounted to the vehicle, and an antenna for a wireless telephone mounted to the mirror mounting structure.

According to another embodiment of the present invention, a rearview mirror assembly comprises a mirror mounting structure including a mirror housing and adapted to be mounted to the vehicle, and a speech synthesizer circuit carried by the mirror mounting structure for generating synthesized voice audio signals.

According to another embodiment of the present invention, a rearview mirror assembly comprises a mirror mounting structure including a mirror housing and adapted to be mounted to the vehicle, and a voice recognition circuit carried by the mirror mounting structure and coupled to a microphone for receiving voice signals from a vehicle occupant performs voice recognition on the received voice signals and generates data representing the recognized voice signals.

According to another embodiment of the present invention, a rearview mirror assembly is provided for a vehicle having an audio system. The mirror assembly comprises a mirror mounting structure including a mirror housing and adapted to be mounted to the vehicle, an audio source of audio signals carried by the mirror mounting structure, and a wireless audio/data RF transmitter carried by the mirror mounting structure and coupled to the audio source for transmitting audio signals received from the audio source via a wireless link to a receiver coupled to the audio system for playback on the vehicle's audio system.

According to another embodiment of the present invention, an electrical circuit is provided for a vehicle that comprises at least one microphone transducer for generating an electrical signal representing a received audio signal, a processing circuit coupled to the microphone transducer for processing the electrical signal, a voice recognition circuit coupled to the processing circuit for performing voice recognition on the processed electrical signals generated by the processing circuit, and a wireless telephone transceiver coupled to the processing circuit for transmitting the processed electrical signal through a wireless telephone link, wherein the processing circuit processes the electrical signal received from the microphone transducer differently for output to the voice recognition circuit than for output to the wireless telephone transceiver.

According to another embodiment of the present invention, a telephone system is provided for a vehicle that comprises a microphone, a telephone transceiver coupled to the microphone, the telephone transceiver transmits and receives voice signals via a wireless communication link, and a voice recognition circuit coupled to the microphone and the telephone transceiver, the voice recognition circuit recognizes spoken words received through the microphone and transmits a signal to the telephone transceiver pertaining to the recognized spoken words, and wherein the telephone transceiver transmits information over the wireless communication link in response to the signal received from the voice recognition circuit during a telephone call.

According to another embodiment of the present invention, a rearview mirror assembly for a vehicle comprises a mirror mounting structure adapted to be attached to the vehicle, an electronic circuit mounted to the mirror mounting structure, and a battery mounted within the mirror mounting structure for supplying power to the electronic circuit.

According to another embodiment of the present invention, an electronic vehicle accessory comprises an electronic circuit configured to receive power from a vehicle battery or ignition, a back-up battery for providing power to the electronic circuit when power from the vehicle battery or ignition is disrupted, and a heater circuit for heating the back-up battery.

According to another embodiment of the present invention, a rearview mirror assembly for a vehicle comprises a mirror mounting structure adapted to be attached to the vehicle, a telephone transceiver mounted within the mirror mounting structure, and an energy storage device mounted within the mirror mounting structure for supplying power to the telephone transceiver.

According to another embodiment of the present invention, a vehicle accessory telephone system comprises an accessory housing, a telephone transceiver mounted in the accessory housing and configured to receive power from a vehicle battery or ignition, and a back-up energy source mounted in the accessory housing for providing power to the telephone transceiver to enable the telephone transceiver to transmit a distress call when power from the vehicle battery or ignition is disrupted.

According to another embodiment of the present invention, a telematics system is provided for installation in a vehicle having an electronic module configured to control a feature of the vehicle that affects the ability of the vehicle to be driven. The telematics system comprises a global position identification component for identifying the location of the vehicle, a telephone transceiver component coupled to the global position identification component for transmitting the location of the vehicle to a remote system, and a controller component coupled to the global position identification component and the telephone transceiver component, wherein at least one of the components is configured to periodically communicate with the electronic module and to thereby acknowledge that each of the components is present and functional such that if the electronic module does not receive periodic acknowledgement of the presence and/or functionality of the components, the electronic module affects the ability of the vehicle to be driven.

According to another embodiment of the present invention, a telematics system is provided for installation in a vehicle having an electronic module configured to control the ignition of the vehicle. The telematics system comprises a global position identification component for identifying the location of the vehicle, a telephone transceiver component coupled to the global position identification component for transmitting the location of the vehicle to a remote system, and a controller component coupled to the global position identification component and the telephone transceiver component, wherein at least one of the components is configured to communicate with the electronic module and to thereby acknowledge that each of the components is present and functional such that if the electronic module does not receive acknowledgement of the presence and/or functionality of the components, the electronic module disables the vehicle ignition.

According to another embodiment of the present invention, a telephone system for installation in a vehicle having an electronic module for determining whether an ignition key has been inserted into the vehicle ignition and for communicating the presence of the key in the ignition, the telephone system comprises a telephone transceiver for transmitting calls over a wireless communication link, and a control circuit coupled to the telephone transceiver and in communication with the electronic module, the control circuit disables at least some functions of the telephone transceiver when an ignition key is not detected in the vehicle ignition.

According to another embodiment of the present invention, a telephone system for a vehicle comprises a telephone transceiver mounted to the vehicle, an audio and data transceiver for receiving audio and data signals from a portable telephone associated with the vehicle, a microwave receiver for receiving satellite signals from which the location of the vehicle may be identified, and a control circuit coupled to the microwave receiver, the audio and data transceiver, and the telephone transceiver, the control circuit controls operation of the telephone transceiver and selectively enables and disables certain functions of the telephone system in response to information obtained from the microwave receiver.

According to another embodiment of the present invention, a telephone system for a vehicle comprises a telephone transceiver mounted to the vehicle, a hands-free microphone coupled to the telephone transceiver, at least one hands-free speaker coupled to the telephone transceiver, an audio and data transceiver for receiving audio and data signals from a portable telephone associated with the vehicle, and a control circuit coupled to the audio and data transceiver and the telephone transceiver, the control circuit determines whether a portable telephone having a predetermined identification number is within the range of the audio and data transceiver and exchanges data with the portable telephone through the audio and data transceiver, the control circuit selectively performs functions in response to the data exchanged with the portable telephone.

According to another embodiment of the present invention, a vehicle rearview assembly provides an image of a scene to the rear of the driver of the vehicle. The rearview assembly comprises a mounting structure for mounting to the vehicle, an audio and data transceiver supported by the mounting structure, capable of receiving both audio and data signals from at least one remote device associated with the vehicle, a control circuit coupled to the audio and data transceiver, the control circuit processes a data signal received by the audio and data transceiver that are received from a remote device associated with the vehicle, and generates a control signal in response to such a data signal.

According to another embodiment of the present invention, a vehicle rearview assembly provides an image of a scene to the rear of a driver. The rearview assembly comprises a mounting structure for mounting to the vehicle, and a telephone transceiver supported by the mounting structure, wherein the rearview assembly exhibits an electromagnetic interference level less than about 61 dBµV/m for emissions in the frequency range from about 0.4 MHz to about 20 MHz.

According to another embodiment of the present invention, a vehicle rearview assembly that provides an image of a scene to the rear of a driver comprises a mounting structure for mounting to the vehicle, the mounting structure including a housing having an electrically conductive layer, and a telephone transceiver mounted within the housing.

According to another embodiment of the present invention, a telephone system is provided for use in a vehicle having a stereo audio system with at least two speakers disposed on opposite sides of the vehicle interior, the speakers configured to playback one of two stereo audio signals output from an audio receiver. The telephone system comprises a telephone transceiver mounted in the vehicle and having an audio output through which an audio signal is transmitted for playback on the stereo audio system, a microphone coupled to the telephone transceiver and mounted in the interior of the vehicle between the at least two speakers, and a phase inverter coupled to the audio output of the telephone transceiver and to the audio receiver such that the audio receiver provides the speaker disposed on one side of the vehicle with an audio signal whose phase is inverted relative to an audio signal provided to the speaker disposed on the opposite side of the vehicle.

According to another embodiment of the present invention, a method of configuring a hands-free telephone system in a vehicle comprises: providing first and second speakers for generating audible sounds in response to an electrical signal, providing a microphone in between the first and second speakers, coupling the microphone and the first and second speakers to a telephone transceiver, providing an audio output signal originating from the telephone transceiver to the first speaker, and inverting the phase of the audio output signal and providing the inverted signal to the second speaker.

According to another embodiment of the present invention, a telephone system for use in a vehicle comprises an audio speaker, a telephone transceiver mounted in the vehicle and having an audio output coupled to the audio speaker for delivering an audio output signal for playback on the speaker, an acoustic port acoustically coupled to the speaker so as to project sounds generated by the audio speaker that are out of phase with respect to the same sounds generated at the audio speaker, and a microphone coupled to the telephone transceiver and positioned between the audio speaker and the acoustic port.

According to another embodiment of the present invention, a traffic light warning system for a vehicle comprises a display device, a receiver for receiving a signal from a traffic light proximate the vehicle, the signal indicating the status of the traffic light, and a control circuit coupled to the receiver and to the display device for displaying the status of a traffic light on the display device.

According to another embodiment of the present invention, a heading indication system for a vehicle comprises a microwave receiver configured to receive signals from a global position satellite constellation, a turn sensor for sensing turning of the vehicle, a control circuit coupled to the microwave receiver and to the turn sensor for determining vehicle heading from signals received from the microwave receiver and for generating a control signal representative of the vehicle heading, wherein, when the control circuit determines that the vehicle heading has changed based upon the signals received from the microwave receiver and when the turn sensor does not sense that the vehicle has turned, the control circuit does not change the control signal thereby indicating that the vehicle heading has not changed, and a heading indictor coupled to the control circuit for providing an indication of the vehicle heading in response to the control signal.

According to another embodiment of the present invention, a network-aided navigation system for a vehicle comprises a microwave receiver configured to receive signals from a global position satellite constellation, and a wireless communication transceiver coupled to the microwave receiver for transmitting signals corresponding to the signals received by the microwave receiver to a network processor, and for receiving signals from the network processor from which the location of the vehicle may be derived.

According to another embodiment of the present invention, a navigation system for a vehicle comprises a control circuit for supplying travel directions, and a speech synthesizer coupled to the control circuit for receiving the travel directions and for reproducing the travel directions in an audible speech message.

According to another embodiment of the present invention, a navigation system for a vehicle comprises a navigation circuit for providing navigational information to a driver of the vehicle based in part on information stored in a navigation database, and a wireless communication transceiver coupled to the navigation circuit for receiving navigational data from a remote source and for supplying the received navigational data to the navigation circuit for storage in the navigation database.

According to another embodiment of the present invention, a blackbox recorder for a vehicle comprises a camera mounted to the vehicle for imaging a scene proximate or within the vehicle, and a non-volatile memory device for storing information pertaining to the vehicle including at least one image obtained from the camera.

According to another embodiment of the present invention, a blackbox recorder for a vehicle comprises a camera mounted to the vehicle for imaging a scene proximate or within the vehicle, a memory device for storing information pertaining to the vehicle including at least one image obtained from the camera, and a back-up battery for providing power to the blackbox recorder in the event of a disruption of power supplied from a primary power source in the vehicle.

According to another embodiment of the present invention, a blackbox recorder for a vehicle comprises a memory device for storing information pertaining to the vehicle including at least one of vehicle speed history, vehicle rollover indication, air bag deployment indication, and deceleration data.

According to another embodiment of the present invention, a vehicle rearview assembly that provides an image of a scene to the rear of the driver of the vehicle, comprises a first switched power supply operating at a first frequency, and a second switched power supply operating at a second frequency, wherein the first frequency is a multiple of the second frequency and the first and second switched power supplies are synchronized.

According to another embodiment of the present invention, a rearview assembly that provides an image of a scene to the rear of the driver of a vehicle, comprises a housing for housing an imaging component that provides the image of a scene to the rear of the driver of the vehicle, and a mounting bracket for mounting the housing to the vehicle, the mounting bracket having two rotary joints, wherein the housing has a mass in excess of 580 grams.

According to another embodiment of the present invention, a rearview assembly that provides an image of a scene to the rear of the driver of a vehicle, comprises a mounting structure adapted for mounting to the vehicle, a pushbutton mounted on the mounting structure, and a control circuit coupled to the pushbutton for performing a selected function in response to actuation of the pushbutton, wherein the control circuit is programmable to allow personalization of the selected function that is performed in response to actuation of the pushbutton.

According to another embodiment of the present invention, a rearview assembly that provides an image of a scene to the rear of the driver of a vehicle, comprises a mounting structure adapted for mounting to the vehicle, a pushbutton mounted on the mounting structure, a control circuit coupled to the pushbutton for performing a selected function and generating a display signal representing the function to be performed in response to actuation of the pushbutton, and a display supported by the mounting structure and coupled to the control circuit for displaying the function to be performed by the control circuit a mounting structure adapted for mounting to the vehicle, a pushbutton mounted on the mounting structure, and a control circuit coupled to the pushbutton for performing a selected function in response to actuation of the pushbutton, wherein the control circuit is programmable to allow personalization of the selected function that is performed in response to actuation of the pushbutton.

According to another embodiment of the present invention, a rearview assembly that provides an image of a scene to the rear of the driver of a vehicle, comprises a housing for housing an imaging component that provides the image of a scene to the rear of the driver of the vehicle, and a mounting bracket for mounting the housing to the vehicle, wherein the housing includes a contoured wall defining an interior cavity, the wall having a thickness that is non-uniform and that is greater at a central region to which the mounting bracket attaches to the housing than at other regions of the housing.

According to another embodiment of the present invention, a rearview assembly that provides an image of a scene to the rear of the driver of a vehicle, comprises a mounting structure for mounting to the vehicle, and a display circuit supported by the mounting structure for displaying information to occupants of the vehicle, the display circuit configured to display at least ten characters simultaneously and to operate at a voltage of less than 42 volts.

According to another embodiment of the present invention, a telephone system for a vehicle comprises a transparent antenna including a transparent substrate having at least one electrically conductive region configured to receive RF signals from a wireless telephone network and to transmit RF signals to the wireless telephone network, and a telephone transceiver coupled to the transparent antenna and mounted in the vehicle.

According to another embodiment of the present invention, a global position system for a vehicle comprises a transparent antenna including a transparent substrate having at least one electrically conductive region configured to receive microwave signals from satellites of a global position system constellation, and a microwave receiver coupled to the transparent antenna and mounted in the vehicle.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 2A is a perspective side view of a rearview mirror assembly;

FIG. 2B is a perspective side view of another rearview mirror assembly;

FIG. 7A is an elevational view of the front of a rearview mirror assembly constructed in accordance with a preferred embodiment of the present invention;

FIG. 8B is a top plan view showing the top of the rearview mirror housing shell of FIG. 8A;

FIG. 8C is a plan view showing the bottom of the rearview mirror housing shell shown in FIGS. 8A and 8B;

FIG. 8D is an elevational view showing the rear of the rearview mirror housing shell shown in FIGS. 8A-8C;

FIG. 8E is a cross-sectional view of the rearview mirror housing shell shown in FIG. 8D taken along line E-E';

FIG. 9A is an elevational view showing the front of the internal components contained within the rearview mirror assembly of the present invention;

FIG. 9B is a cross-sectional view of the internal component and a portion of the housing of the components shown in FIG. 9A taken along line B-B';

FIG. 9C is a cross-sectional view of the internal component and a portion of the housing of the components shown in FIG. 9A taken along line C-C';

FIG. 9D is a side elevational view showing the components of the inventive rearview mirror assembly;

FIG. 9E is a rear elevational view showing the interior components of the rearview mirror assembly;

FIG. 9F is a bottom plan view showing the bottom of the components of the inventive rearview mirror assembly;

FIG. 10A is an elevational view showing the front of an antenna structure 114a that may be used in the inventive rearview mirror assembly;

FIG. 10B is a side elevational view of the antenna structure shown in FIG. 10A;

FIG. 10C is a front elevational view showing the internal antenna structures contained within the internal antennas shown in the antenna structure of FIGS. 10A and 10B;

FIG. 10D is a front perspective view of an antenna structure 114b constructed in accordance with another embodiment of the present invention;

FIG. 10E is a side perspective view of the antenna structure 114b shown in FIG. 10D;

FIG. 10F is a perspective view showing the rear surface of the antenna structure 114b shown in FIGS. 10D and 10E;

FIG. 10G is a perspective view showing the front of an antenna structure 114c constructed in accordance with another embodiment of the present invention;

FIG. 10H is a perspective view showing the rear of the antenna structure shown in FIG. 10G;

DETAILED DESCRIPTION OF THE PREFERRED EMBODIMENTS

Figure 1:
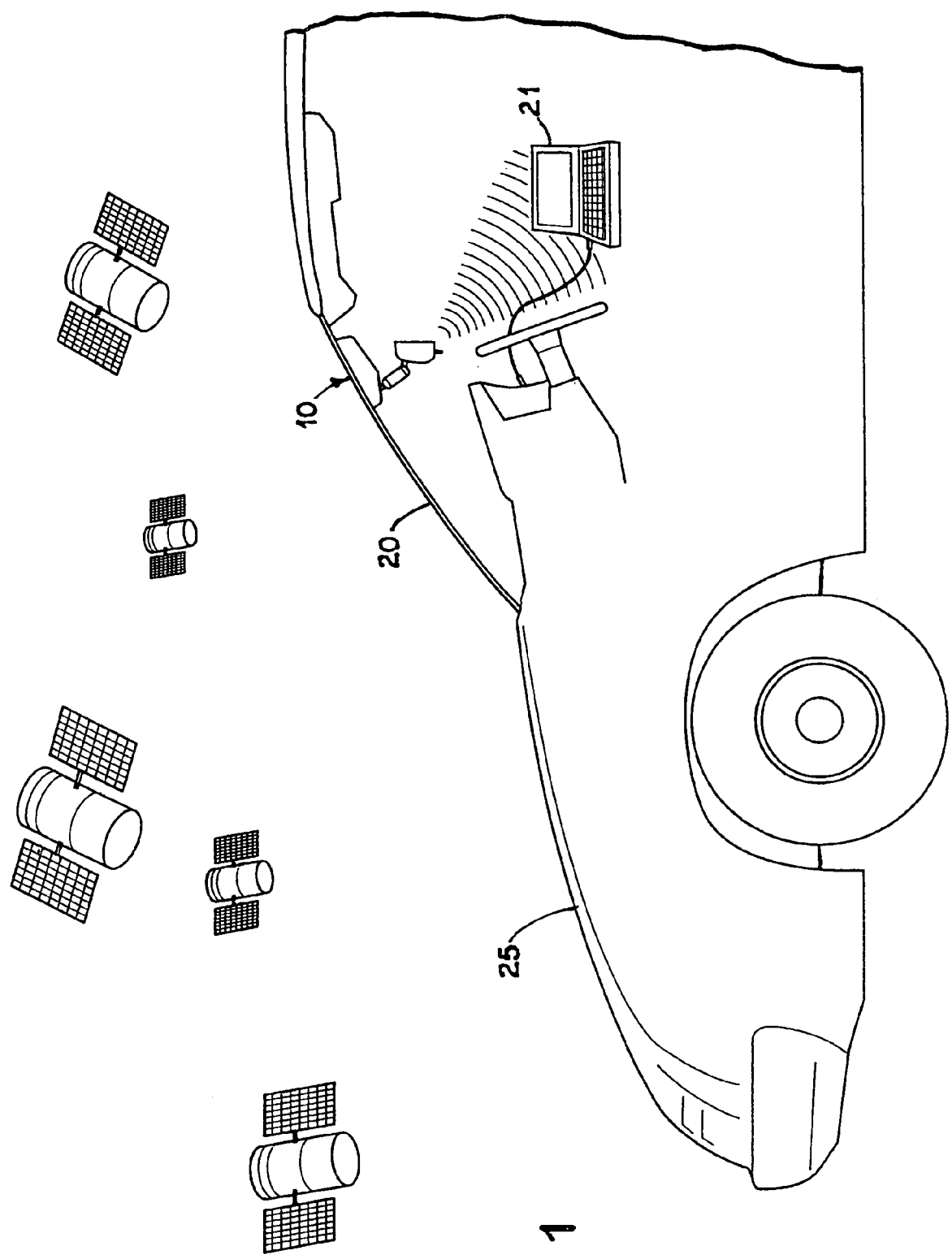
FIG. 1 is a cut-away perspective view of a vehicle in which a rearview mirror assembly is mounted.

Reference will now be made in detail to the present preferred embodiments of the invention, examples of which are illustrated in the accompanying drawings. Wherever possible, the same reference numerals will be used throughout the drawings to refer to the same or like parts.

As noted above, the present invention pertains to a vehicle rearview assembly that incorporates some or all of the components of a vehicle communication and control system.

As used herein, a "rearview assembly" is a structure that provides an image of a scene to the rear of driver. As commonly implemented, such rearview assemblies include an appropriately positioned mirror. A rearview assembly may additionally or alternatively include an electronic display that displays an image as sensed by a camera or other image sensor (see, for example, U.S. patent application Ser. No. 09/153,654 entitled SYSTEMS AND COMPONENTS FOR ENHANCING REAR VISION FROM A VEHICLE, filed on Sep. 15, 1998, by Frederick T. Bauer et al., the entire disclosure of which is incorporated herein by reference). As will be apparent to those skilled in the art, certain aspects of the present invention may be implemented in vehicle accessories other than a rearview assembly, such as an overhead console, a visor, an A-pillar trim panel, an instrument panel, etc. With respect to those implementations, the discussion below relating to rearview mirror assemblies is provided for purposes of example without otherwise limiting the scope of the invention to such rearview assemblies.

In some of the embodiments described below, the "brick" of such communication and control systems is integrated into a rearview assembly. Preferably, the GPS receiver and microwave antenna, as well as the cellular telephone antenna, are mounted to the rearview assembly. By integrating all of these components into the rearview assembly, the need for running extensive wiring through the vehicle is essentially eliminated. Furthermore, the whole system may be readily installed as a vehicle option by the vehicle manufacturer, the dealer, or anyone buying/selling the product as an after-market product. Other advantages of the invention are described further below.

Rearview Assembly Construction

An example of an inside rearview mirror assembly constructed in accordance with one embodiment of the present invention is shown in FIGS. 1-6. FIG. 1 shows the general mounting of rearview mirror assembly 10 to the inside surface of a front windshield 20 of a vehicle 25. FIGS. 2A and 2B show two different exemplary rearview mirror assembly constructions in which the microwave antenna may be mounted. More specifically, rearview mirror assembly 10a shown in FIG. 2A is designed to be mounted directly to windshield 20, whereas rearview mirror assembly 10b shown in FIG. 2B is mounted to the roof of the vehicle.

Figure 6:
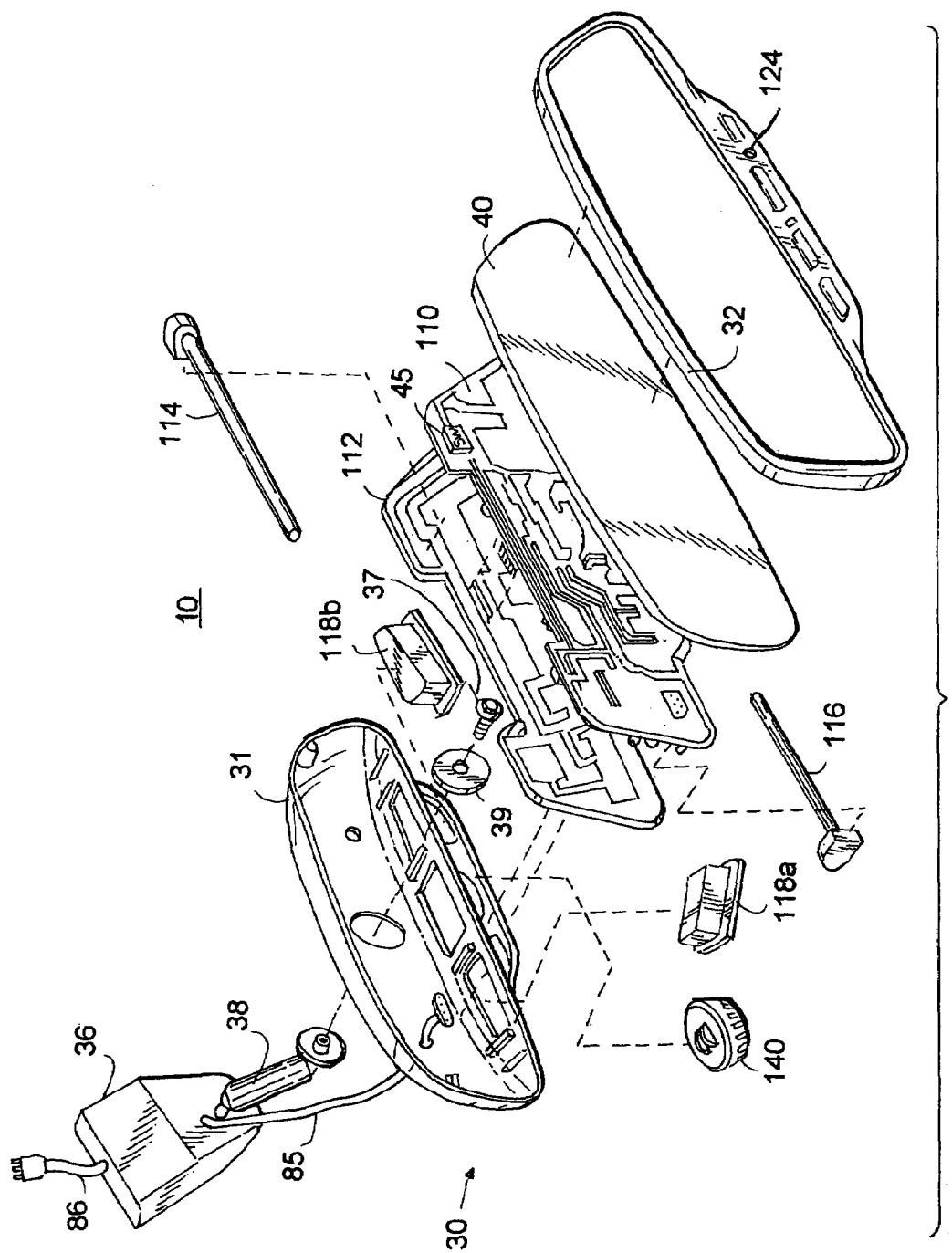
FIG. 6 is a partially exploded perspective view of the rearview mirror assembly of the present invention.

In general, rearview mirror assemblies include a mirror housing 30 that may have a wide variety of the possible designs, such as, for example, the mirror housing taught and claimed in U.S. Pat. No. 5,448,397. Rearview mirror assemblies also include a mirror 40 (FIG. 5) mounted in mirror housing 30, and a mounting bracket 35 that attaches mirror housing 30 to the vehicle. Such mounting brackets typically include a mounting foot 36 that is directly mounted to the vehicle and to a mirror stem 38 that extends between mounting foot 36 and mirror housing 30. As apparent from a comparison of FIGS. 2A and 2B, the structure of mounting foot 36 and mirror stem 38 may vary considerably from one rearview mirror assembly to the next. For example, mirror stem 38 may be pivotally mounted to mounting foot 36 as shown in FIG. 2A or fixedly attached to mounting foot 36 as shown in FIG. 2B. Additionally, mirror housing 30 is typically pivotally attached to mirror stem 38. Such pivotal attachments allow the driver to move and position the mirror so as to allow the driver to have a clear field of view towards the rear of the vehicle. The disclosed rearview mirror assembly also preferably includes a display 45 (FIG. 5) housed within mirror housing 30 or housed within mounting foot 36. As shown in FIGS. 2A, 2B, and 6, mirror housing 30 may include a mirror housing body 31 and a bezel 32 that is mounted to mirror housing body 31 so as to secure mirror 40 and all the components in mirror housing 30.

FIG. 6 shows an exemplary mechanical construction of mirror housing 30 of rearview mirror assembly 10. As illustrated, the following components are mounted in or on mirror housing 30: a mirror element 40; a first printed circuit board 110; a second printed circuit board 112; a first RF antenna 114; a second RF antenna 116; and first and second map lamps 118a and 118b. A microphone assembly 140 may be mounted to the bottom or top of mirror housing 30. Microphone assembly 140 is described in more detail below under the heading "Microphone Subassembly." As shown, mirror housing 30 is secured to mirror stem 38 by means of a bolt 37 and a washer 39. It will be appreciated, however, that any suitable means may be utilized to mount mirror housing 30 to mirror stem 38.

Although antennas 114 and 116 are shown as being oriented horizontally and having a generally linear shape (as would be true if the antennas were strip antennas), those skilled in the art will appreciate that these RF antennas may be helical or take any suitable form for performing the functions that are described further below. Also, either one or both of antennas 114 and 116 may be mounted to the exterior of the rearview mirror assembly.

A rearview mirror assembly 10c constructed in accordance with a preferred embodiment is shown in FIGS. 7-9. Like the mirror assembly shown in the previous embodiment, rearview mirror assembly 10c includes a mirror housing 30a and a mirror 40, which is preferably an electrochromic mirror. Assembly 10c further includes a display 45, a forward bezel portion 32 of housing 30a, a plurality of user pushbuttons 130, and a glare sensor 124. Rearview mirror assembly 10c further includes a microphone assembly 140a, which is described further below, an antenna structure 114a, an LED indicator 152, and an optional camera housing 154. Camera housing 154 is provided for housing an image sensor array for automatically controlling the beam pattern of the vehicle's exterior lights (i.e., low beam headlamps, high beam headlamps, daytime running lights, fog lights, etc.). A more detailed description of such a subassembly and the manner in which it is mechanically attached to a rearview mirror assembly is provided in commonly assigned U.S. patent application Ser. No. 09/800,460 (unofficial) filed on Mar. 5, 2001, by Joseph S. Stam et al. entitled SYSTEM FOR CONTROLLING EXTERIOR VEHICLE LIGHTS, the entire disclosure of which is incorporated herein by reference.

Figure 7B:
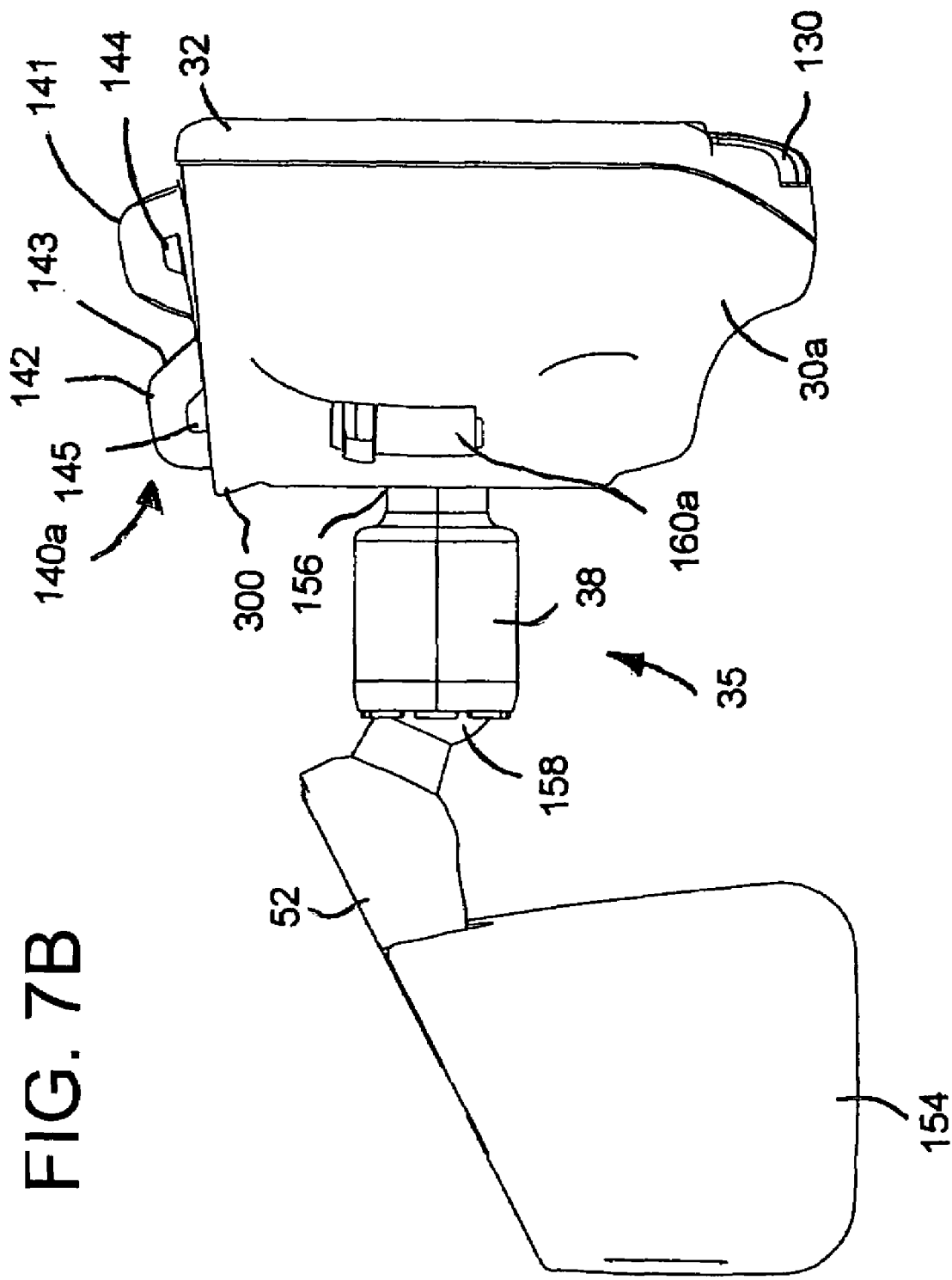
FIG. 7B is a side elevational view of the side of the rearview mirror shown in FIG. 7A.
Figure 7C:
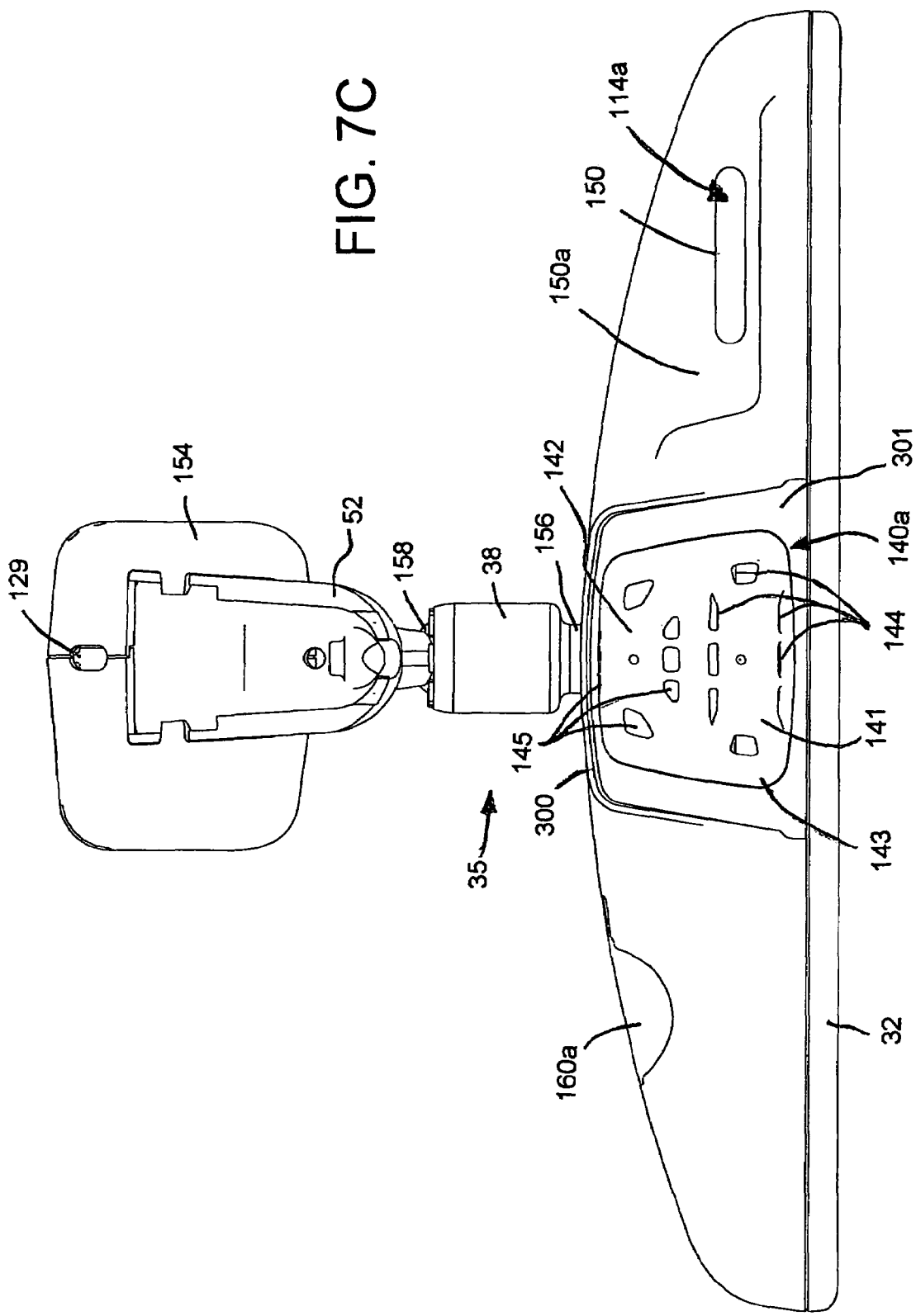
FIG. 7C is a top plan view showing the top of the rearview mirror assembly of FIGS. 7A and 7B.
Figure 7D:
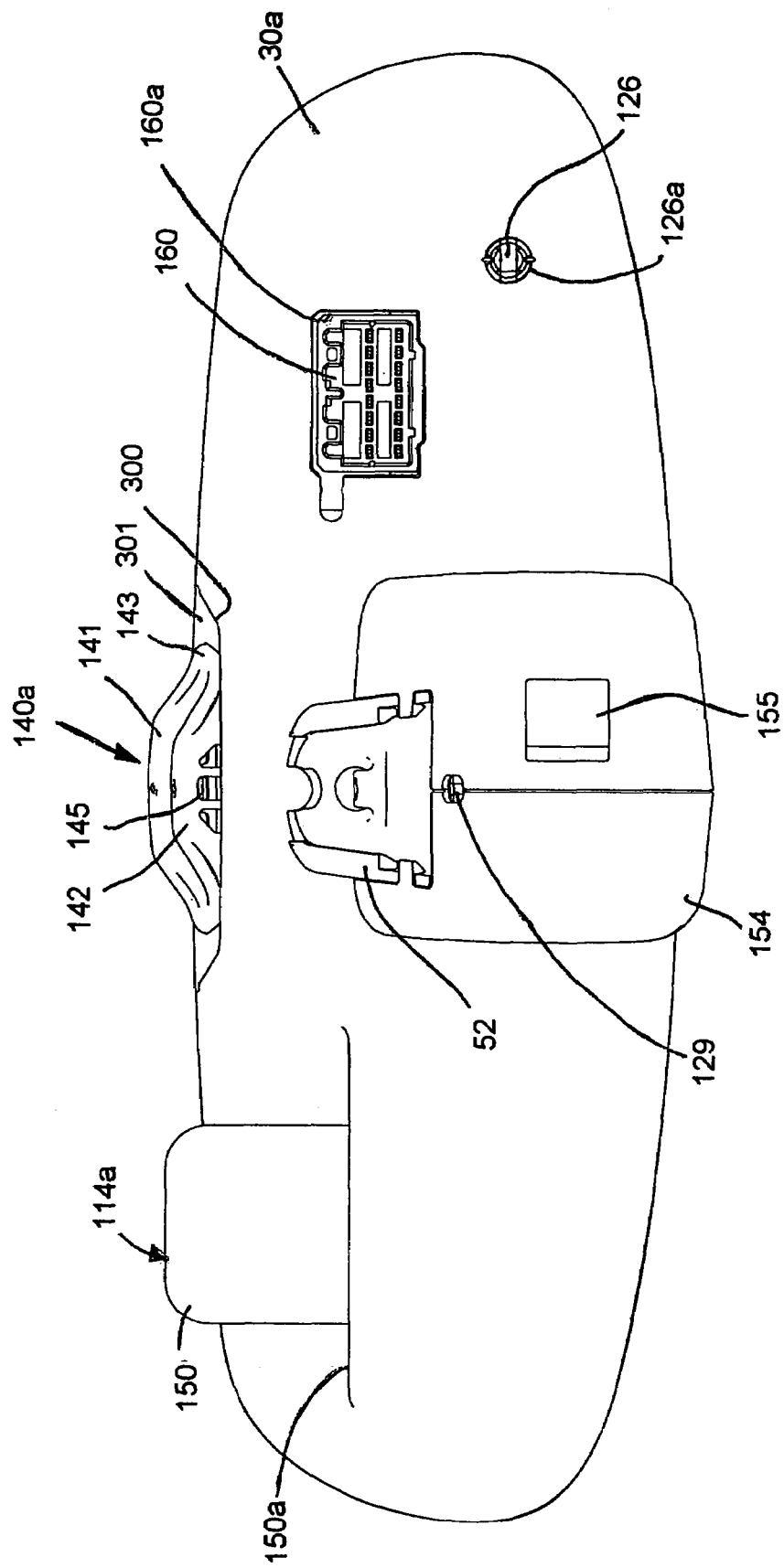
FIG. 7D is an elevational view showing the rear of the rearview mirror assembly shown in FIGS. 7A-7C.

As best shown in FIGS. 7B and 7D, camera housing 154 includes an opening for a sky sensor 129, which senses the ambient light level of the sky above and slightly forward of the vehicle. Additionally, a window 155 is provided through which the camera receives the light from the forward scene to be imaged. As described in more detail in the above-referenced patent application, camera housing 154 is secured to a mounting foot 52 of a mounting bracket 35. Mounting foot 52 includes a first rotary ball joint 158 that extends rearward from a surface of foot 152 opposite from the vehicle windshield. Ball 158 is received in a corresponding socket of a stem 38, which in turn includes a second rotary ball joint 156, which is received by a hub 162 (FIG. 9F) provided within mirror housing 30a.

As described in further detail below, a top middle portion of mirror housing 30a is substantially flat to provide a flat surface 301 upon which microphone subassembly 140a may be mounted. A rearward rim of surface 301 includes an air deflector 300 as also described further below. As best shown in FIGS. 8A-8D, an aperture 302 is provided in flat surface 301 for receiving microphone subassembly 140a. Surrounding the aperture 302 is a strengthening rim 303 that adds to the structural integrity of mirror housing 30a to provide sufficient support for microphone subassembly 140a and to receive tabs extending from the bottom of microphone subassembly 140a such that the microphone subassembly 140a may be snapped into place within aperture 302. As best shown in FIGS. 9B and 9C, microphone subassembly 140a further includes a circuit board 304 on which the transducers and associated microphone circuit components are mounted.

Referring back to FIGS. 7A, 7C, and 7D, an antenna structure 114a may be mounted so as to extend upward from a rear portion of mirror housing 30a. A relatively flat surface 150a may be formed in a portion of the rear of housing 30a for receiving antenna structure 114a. A preferred construction for antenna structure 114a is described below with reference to FIGS. 10A-10C.

As best shown in FIGS. 7C and 7D, housing 30a includes an aperture 160a through which a connector receptacle 160 is accessible. An additional aperture 126a is formed in housing 30a to allow light to strike an ambient light sensor 126, which is discussed further below.

Figure 8A:
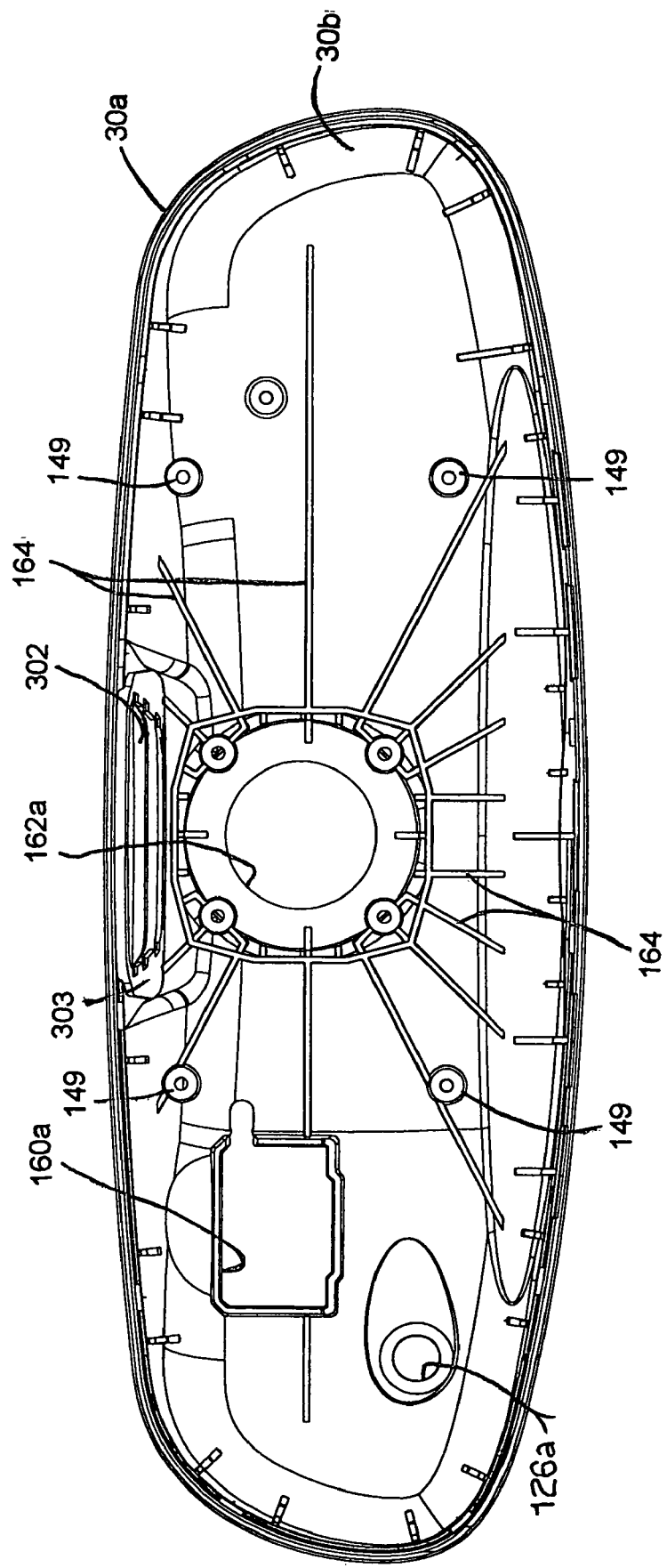
FIG. 8A is an elevational view showing the front of a rearview mirror housing shell that may be used in the rearview mirror assembly of the present invention.

FIGS. 8A-8D show the detailed interior and exterior shell of mirror housing 30a. FIG. 8A represents the view of the housing shell when viewing it from the direction in which the mirror would normally be located so as to see the interior view of the sides and back portion of housing 30a. FIG. 8B illustrates a top view of housing 30a, while FIG. 8C shows the bottom of housing 30a. FIG. 8D shows housing 30a from the rear of the housing that faces the vehicle windshield. FIG. 8E is a cross-sectional view taken along line E-E' of FIG. 8D.

As discussed further below with reference to FIGS. 9A-9F, the amount of circuitry contained within mirror housing 30a is significantly increased over that previously provided in a rearview mirror assembly. Consequently, the total mass of mirror housing 30a is significantly higher than the mass of prior art rearview mirror housings. The heaviest rearview mirror housing assembly of which the inventors are aware included various electrical components as well as an electrochromic mirror. This housing had a mass of approximately 565 grams. A prototype of the present invention was weighed, which did not include the antenna structure shown in the drawing figures. The mass of this prototype was approximately 630 grams. Thus, the mirror housing of the present invention may have a mass of at least about 580 grams.

This increase in mass creates several mechanical difficulties. First, housing 30a must be made larger and deeper than previous rearview mirror assemblies in order to accommodate the additional circuitry contained within the mirror housing. This increase in size of housing 30a requires additional strengthening components to minimize added torsional stresses that may be applied to the mirror, for example, as would occur when one were to grab opposite ends of the mirror and twist the sides in opposite directions. One manner to increase the strength of housing 30a would be to simply increase the thickness of the walls 30b of housing 30a. However, merely increasing the thickness of walls 30d would unduly add to the weight of the whole housing assembly.

Another problem associated with added mass of the mirror housing 30a is that the mirror housing is more likely to vibrate. Such vibration tends to blur the image viewed by the driver through the mirror 40. Further, the rotational joints that allow mirror housing 30a to pivot relative to the mounting bracket and to the vehicle at one or more positions must be all the more snug to maintain the position of the mirror housing 30a in the position set by the driver.

The housing should additionally be configured to allow for easy assembly of the various components to mirror housing 30a.

The mirror housing 30a depicted in FIGS. 8A-8E overcomes these problems by employing various measures. Specifically, with reference to FIG. 8A, housing 30a includes several strengthening ribs 164 that extend radially outward from the center of an aperture 162a where ball 156 of stem 38 is received by hub 162. While prior art mirrors previously utilized similar ribs, ribs 164 of the present invention are much deeper to improve the structural rigidity of the housing shell. Additionally, the housing shell includes walls 30b that are thicker in the area surrounding aperture 160a and that become thinner near the peripheral forward opening to which bezel portion 32 is attached along with mirror 40. Such a variation in thickness is illustrated in FIG. 8E. Additionally, various strengthening rims are provided around the various apertures formed in housing 30a to provide additional mechanical stability. As shown in FIGS. 9B-9F, at least two circuit boards 110 and 112 are provided within mirror housing 30a. Second circuit board 112 may include a plurality of pins, screws, or holes 148 (FIG. 9E) through which pins or screws may be inserted that correspond in position to threaded apertures 149 (FIG. 8A) extending from the inside rear wall of housing 30a. This allows circuit board 112 to be secured in place in mirror housing 30a following installation of hub 162. Hub 162 may similarly be screwed in place using threaded apertures provided in housing 30a. The first circuit board 110 may then be held in place by connector pins and receptacles 166 provided on each of first and second circuit boards 110 and 112. Alternatively, first circuit board 110 could be separately attached to housing 30a or otherwise attached to the rear surface of electrochromic mirror 40. As shown in FIGS. 9A-9F, connector receptacle 160 and ambient light sensor 126 may be mounted to a rear surface of first circuit board 110 so as to be aligned with and extend to the corresponding apertures 160a and 126a in housing 30a. To allow for the components to be as compact as possible within housing 30a, any of the larger circuit components on circuit board 110 are preferably mounted in the peripheral regions of the rear surface of circuit board 110 in areas not covered by second circuit board 112.

By mounting second circuit board 112 directly to the inside rear surface of housing 30a across a substantial portion thereof, particularly across the central rear region where hub 162 receives ball 156, circuit board 112 can add to the structural rigidity of the housing assembly. As shown in FIGS. 9B-9F, second circuit board 112 may be encased within an electrically conductive casing 112a that is secured on both sides of circuit board 112 so as to provide shielding from electromagnetic interference (EMI). Casing 112a may be made of metal or a metal-coated plastic. As discussed further below, the inside surface of mirror housing 30a may be coated with an electrically conductive coating or paint to provide additional EMI shielding. The electrically conductive coating on the inside of mirror housing 30a may also provide the additional function of serving as the ground plane for the antennas contained within antenna structure 114a. Such an electrical coating of the inside of housing 30a may be provided as an alternate measure of providing EMI shielding or as an additional measure to providing casing 112a.

In the exemplary structure shown in FIGS. 9A-9F, second circuit board 112 preferably includes all the electronic components for the cellular telephone. Other components of the circuit described in more detail in FIG. 11 may be provided on either of circuit boards 110 or 112. To enable more components to be mounted to the two circuit boards, either one or both of circuit boards 110 and 112 may be double-sided circuit boards that allow components to be mounted on either side of the board. Additionally, the present invention is not limited to utilizing only two circuit boards, and additional circuit boards may be included.

As shown in FIGS. 9A, 9C, 9D, and 9F, a plurality of switches 130*b* is mounted to the forward facing surface of first circuit board 110 in positions that correspond to pushbuttons 130. Pushbuttons 130 include an inward extending plunger 130*a* (see FIG. 9C) that pushes against an actuator in switch 130*b* when a user presses pushbutton 130. Display 45 is mounted on circuit board 110 so as to be viewable either from behind mirror 40 or from a position adjacent mirror 40 in bezel portion 32. As will be apparent to those skilled in the art, once all the electronic circuitry and microphone subassembly 140*a* have been appropriately attached to housing shell 30*a*, and the appropriate electrical connections are made, mirror 40 may be placed over the opening in housing 30*a*, and bezel portion 32 may be snapped into position across the opening of housing shell 30*a*. Alternatively, mirror 40 and bezel portion 32 may be preassembled and then subsequently snapped into place together as a unit.

FIGS. 10A-10C illustrate a preferred antenna structure 114*a* that may be used as the antenna for the cellular telephone contained within the mirror housing. As illustrated, antenna structure 114*a* preferably includes two antenna portions 161*a* and 161*b* that are shaped as quarter wave strips resembling inverted triangles or wedges so as to function as a broadband antenna. Antenna portions 161*a* and 161*b* may also be fractal. Specifically, first antenna portion 116*a* is configured to be tuned to frequencies of approximately 800 MHz while antenna portion 161*b* is configured to be tuned to frequencies of approximately 1.9 GHz, which correspond to signals from PCS devices. Antenna portions 161*a* and 161*b* are preferably encapsulated in a plastic antenna housing 150, which is preferably made of the same or like materials as housing shell 30*a* so as to provide a similar and aesthetically pleasing appearance. Antenna housing 150 is preferably molded to include at least two resilient tabs 169 that allow the antenna structure 114*a* to be snapped in place in a corresponding aperture formed in mirror housing 30*a*. One or more leads 168 extends downward from antenna housing 150 from antenna portions 161*a* and 161*b* for engagement with a contact in a receptacle plug provided on one of the first or second circuit boards 110 and 112 provided in housing 30*a*. Such a construction may eliminate the need for a coaxial cable connection. With the antenna construction shown in FIGS. 10A-10C, the mirror housing is coated with a metallic coating so as to serve as the ground plane for the antenna. In addition to providing an antenna for the internal telephone provided within housing 30*a*, an additional antenna may be provided in housing 150 to allow reception of Bluetooth™ signals.

Antenna structure 114*a* may be mounted in other locations of the rearview mirror assembly or may be mounted elsewhere in the vehicle. For example, the antenna may be configured as a transparent antenna and integrated in a structure with the GPS antenna in a manner similar to that illustrated in FIGS. 10D, 10E, and 10F. Specifically, the transparent structure includes a transparent substrate 400 preferably made of a transparent polymer, a dual band antenna structure 402 having dimensions and structure similar to that shown in FIG. 10C, a GPS patch antenna 404, lead lines 406 and 408, and contact terminals 410 and 412. Dual band cellular antenna 402, GPS antenna 404, lead lines 406 and 408, and contact terminals 412 and 410 are preferably formed on a first surface of substrate 400 and are formed of an electrically conductive material. The electrically conductive material may be provided on substrate 400 by selectively metallizing the regions of the first surface of substrate 400 in those regions defining the antennas, leads, and contact terminals. "Metallizing" should be understood to include application of transparent conductive coatings such as Indium Tin Oxide (ITO). Very thin, nearly transparent layers of metal such as gold may also be used. One suitable substrate material is polymethylpentene, also known as TPX. A low loss material, such as TPX, is desirable to construct an efficient GPS patch antenna. Other antenna structures, such as monopoles, which do not form high Q resonant cavities (as is the case for a patch antenna), may be constructed using higher loss materials such as polyester (Mylar). The antenna system may also be a hybrid system where part of the antenna or ground plane is opaque. As shown in FIGS. 10E and 10F, the opposite surface of substrate 400 may also be coated with an electrically conductive material to provide a ground plane 415. The transparent substrate 400 may serve as a dielectric layer between patch antenna 404 and ground plane 415 or an optional dielectric layer may be formed between patch antenna 404 and substrate 400. A small region 416 underlying contact terminal pads 410 and 412 may be left devoid of the ground plane conductive material 415 so as to provide for ease of connection of respective coaxial cables or other connection means.

Dual band cellular antenna 402 may be configured in any shape or fashion and is generally shown as having a similar broadband structure including two wedge-shaped micro strips 418*a* and 418*b*. As noted above, any one or all of the conductive components may be transparent or opaque and used in combination on a common substrate. The construction shown in FIGS. 10D-10F is preferred in that it allows dual band cellular antenna 402 and GPS patch antenna 404 to share a common ground plane 415. It will be appreciated, however, that the two antennas may be provided on separate substrates or otherwise totally separated from one another with one being an opaque and different structure similar to those disclosed above while the other may be transparent. Any of the above antennas may incorporate a transparent micro strip transmission line for connection to the receiver. The micro strip transmission line may be terminated to double-sided, low or zero insertion force connectors such as an AVX Series 8370 connector.

By utilizing the transparent antenna system disclosed in FIGS. 10D-10F, the antenna system can cover a larger area of the windshield than an opaque antenna system without becoming objectionable. A larger transparent antenna may have better performance than an opaque system whose size is constrained by aesthetic rather than engineering considerations. The transparent antenna system can be easily installed in an after-market application and may offer cost advantages over a system integrated in the windshield.

An alternative antenna construction 114*c* is illustrated in FIGS. 10G and 10H. This construction is similar to that shown in FIGS. 10D-10F, however, the structure is not formed on a transparent substrate. More specifically, the structure is formed on a dielectric substrate 450. The antenna structure includes a dual band cellular antenna 452 including two straight micro strips 454a and 454b provided on a first side of substrate 450. The ground plane 456 is provided on either side of a portion of substrate 450. A GPS patch antenna 460 is provided on an opposite surface of substrate 450 than ground plane 456. A pair of coax connectors 462 and 464 is connected to the respective antennas. Resistors and other circuit components may be formed on this structure as may be desired. The telephone antenna may have any shape or configuration including a planar, inverted "F" antenna (PIFA).

Microwave Antenna

Figure 3:
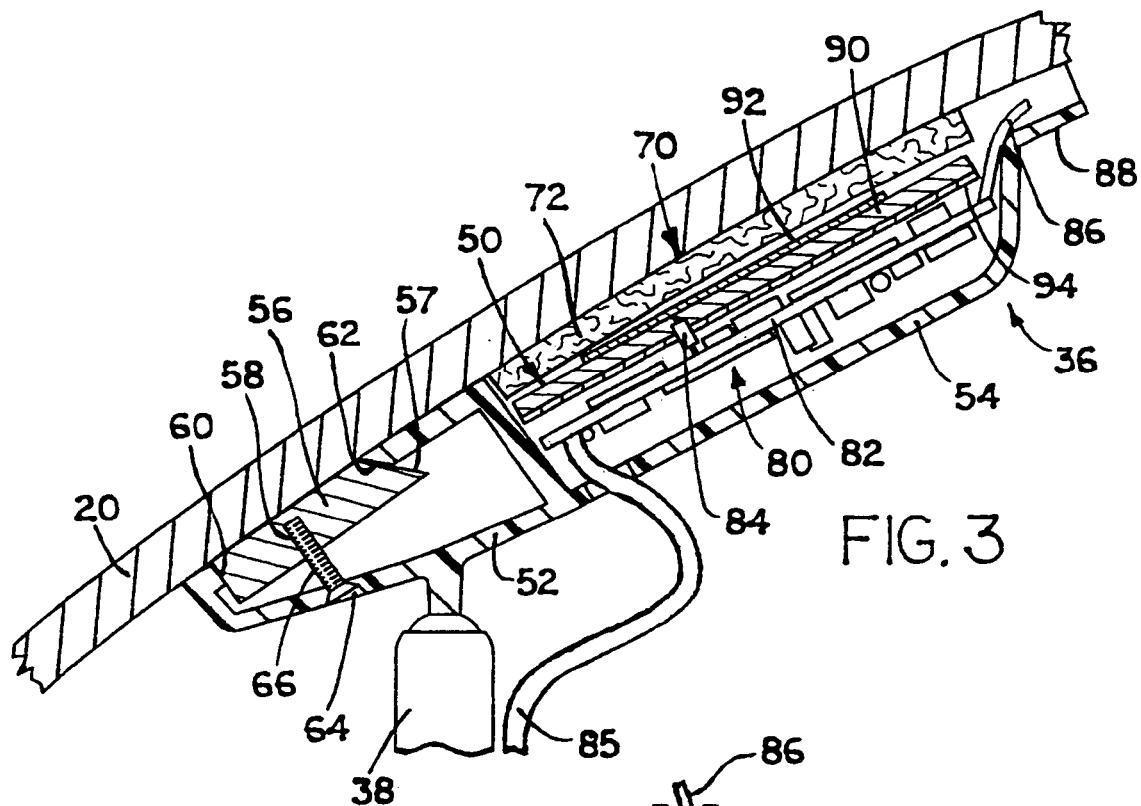
FIG. 3 is a cross-sectional view of the mounting foot of a rearview mirror assembly.
Figure 4:
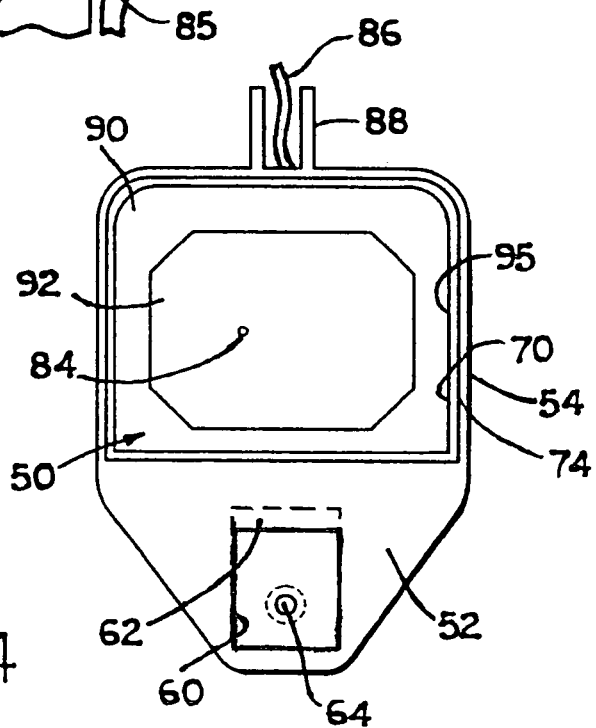
FIG. 4 is a perspective view of the forward-facing portion of the mounting foot of the rearview mirror assembly shown in FIG. 3.
Figure 5:
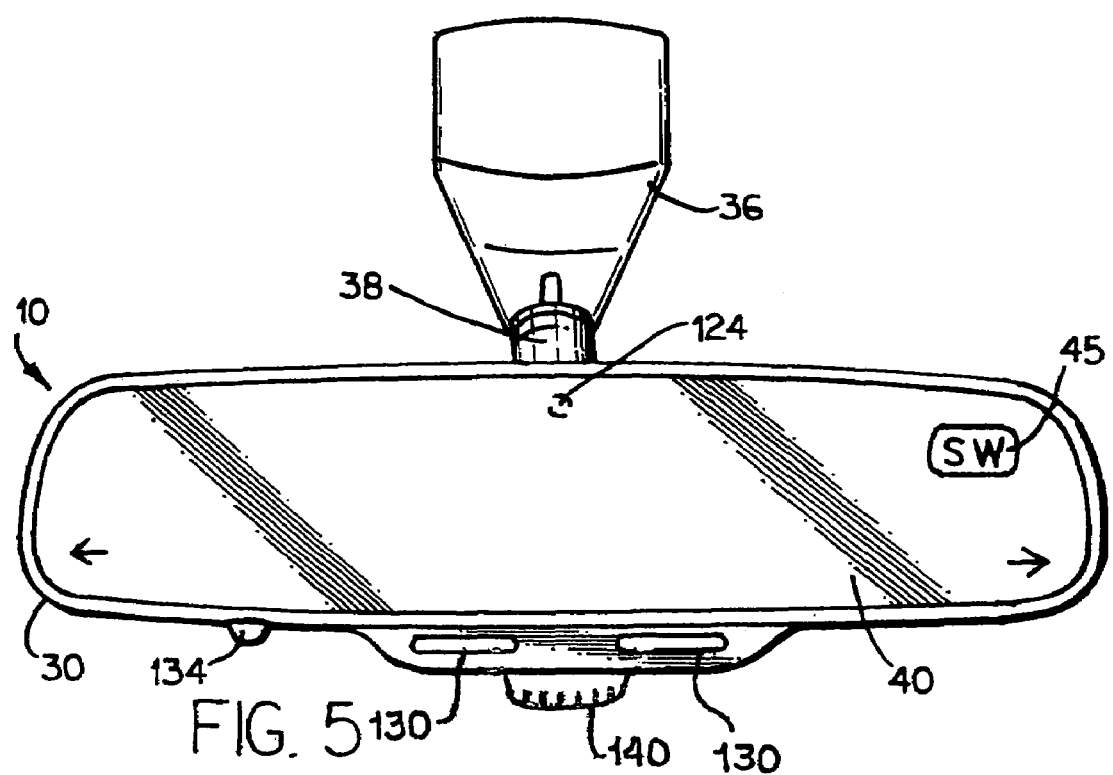
FIG. 5 is a rearward perspective view of the rearview mirror assembly shown in FIG. 2A.

As shown in FIGS. 3 and 4, a microwave antenna 50 is preferably mounted within mounting foot 36 of mounting bracket 35 of rearview mirror assembly 10a, 10b, 10c. As shown in FIG. 3, mounting foot 36 includes a mounting portion 52 and an antenna housing portion 54. The structure of mounting portion 52 is shown as being configured to attach to a mounting puck or button 56 that is attached to the inside surface of windshield 20 using an adhesive. Puck 56 includes an inclined edge surface 57 and a threaded aperture 58 formed in the surface of puck 56 opposite that which is adhered to windshield 20. Mounting portion 52 thus has an aperture 60 for engaging puck 56. One edge 62 of aperture 60 has a sloped profile so as to engage inclined edge surface 57 of puck 56. In this manner, the size of aperture 60 is slightly smaller than the area of the surface of puck 56 that is opposite that which is secured to windshield 20. To then secure mounting portion 52 to puck 56, a set screw 66 is slid into an aperture 64 formed in mounting portion 52 and turned so as to thread into threaded aperture 58 on puck 56.

Antenna housing portion 54 of mounting foot 36 may be integrally formed with mounting portion 52 or formed as a separate component that may be attached to mounting portion 52. Antenna housing portion 54 includes an aperture 70 having a generally square, rectangular, or round shape or any other shape for accommodating the particular shape of antenna 50. Aperture 70 is provided so as to open towards windshield 20 through which microwave signals from satellites may pass to reach microwave antenna 50. Antenna 50 may be mounted in aperture 70 so as to be substantially parallel to, and slightly spaced apart from, the inner surface of windshield 20. Preferably, antenna 50 is mounted horizontally in housing portion 54 and has a ground plane configured as disclosed in commonly assigned U.S. patent application Ser. No. 09/535,999, entitled MICROWAVE ANTENNA FOR USE IN A VEHICLE, filed on Mar. 28, 1999, the entire disclosure of which is incorporated herein by reference. The structure of antenna 50 is discussed further below.

As shown in FIG. 3, a foam pad 72 or other non-conductive substrate is placed within antenna housing portion 54 between antenna 50 and the inside surface of windshield 20. As shown in FIG. 4, antenna mounting portion 54 also includes a gasket 74 provided about the periphery of aperture 70, so as to provide for additional protection against moisture or debris coming between windshield 20 and antenna 50.

In addition to providing space for accommodating antenna 50, mounting foot 36 is configured to provide sufficient space for a receiver circuit 80 printed on a circuit board 82. Circuit board 82 is thus mounted directly behind antenna 50 in antenna mounting portion 54, so as to minimize the length of antenna connector 84 that extends between antenna 50 and printed circuit board 82.

Figure 11:
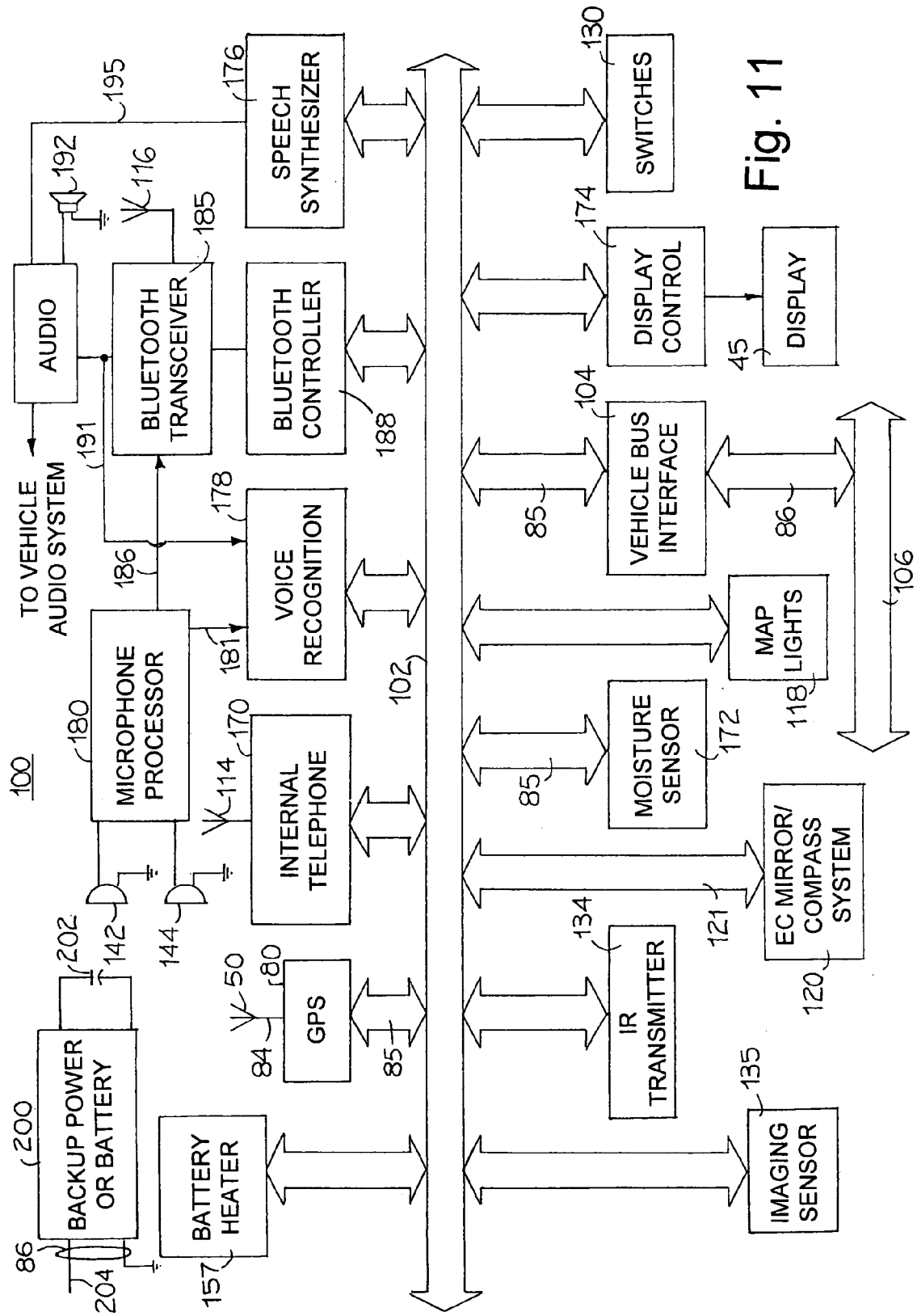
FIG. 11 is an electrical circuit diagram in block form showing an embodiment of the vehicle communication and control system of the present invention.

Because receiver circuit 80 converts the signals received by antenna 50 into signals that may be transmitted over conventional wires, the information obtained from the satellite signals may be transmitted to other components in the vehicle via the vehicle bus, discrete connections, an IR transmitter 134 (FIG. 11), or an RF transmitter 185 (FIG. 11). More specifically, if a display 45 or additional circuitry, such as a control circuit for an electrochromic mirror or electronic compass, is mounted in mirror housing 30, receiver circuit 80 may be coupled to such circuitry via a connector line 85 that may be run between mounting foot 36 and mirror housing 30 outside of mirror stem 38 or internally through mirror stem 38 as disclosed in U.S. Pat. No. 5,984,482. Additionally, data processed by receiver circuit 80 may be transmitted via line 86 to other electrical systems within the vehicle. Mirror assembly 10 may include a shroud 88 that extends from mounting foot 36 to the vehicle headliner, so as to provide a covert channel for running cabling 86 between rearview mirror assembly 10 and the remainder of the vehicle.

As shown in FIGS. 3 and 4, microwave antenna 50 is constructed as a patch antenna including a dielectric substrate 90 having a layer of a conductive material provided on one side of dielectric substrate 90 so as to form a resonant patch 92. Antenna 50 further includes a layer of electrically conductive material on the opposite side of dielectric substrate 90, which forms a conductive ground plane 94 for antenna 50.

By mounting microwave antenna 50 to the mounting bracket of an inside rearview mirror assembly, the antenna has a clear view through the sloped front windshield of much of the sky above and in front of the vehicle. Additionally, the front windshield of the vehicle protects the antenna from dirt, moisture, snow, and humid air that may readily reach the microwave antenna and adversely affect its performance if it is mounted in a component on the exterior of the vehicle.

In some implementations, it may be preferred to also mount the antenna for the telephone subsystem in antenna housing portion 54. By mounting both the microwave and telephone antennae in the same housing, any EMI shielding that is provided between microwave antenna 50 and the electronics in housing 30, may likewise shield the telephone antenna.

Microphone Subassembly

The microphone subassembly used in the present invention may or may not be mounted in the rearview mirror assembly. For the reasons described below, it is preferable to mount the microphone subassembly on the rearview mirror assembly. If the microphone subassembly is not mounted in the rearview mirror assembly, it may be incorporated in or attached to the headliner, overhead console, visor, or A-pillar of the vehicle and electrically coupled to the components in the rearview mirror assembly by a wire. When the microphone is installed after vehicle manufacture and fastened to the headliner or visor, the position of the microphone may vary depending on where the user installs the microphone. Such potential for variance makes it very difficult to design an optimal system. The position of the microphone relative to the person speaking determines the level of the speech signal output by the microphone and may affect the signal-to-noise ratio. Additionally, the position of the microphone relative to the audio speaker used for the hands-free operation will have an impact on feedback between the speaker and the microphone. Accordingly, the performance of the audio system is subject to the user's installation of the microphone. Additionally, the wire connecting the microphone to the rearview mirror will generally not be aesthetically pleasing. Alternatively, if the wire is to be mounted behind the interior lining, the vehicle interior must be disassembled and then reattached so that the wire can be hidden, which may result in parts that rattle loudly or hang loosely from the vehicle frame.

One potential solution to avoid these difficulties is disclosed in U.S. Pat. No. 4,930,742, which uses a microphone in a mirror mounting support. Conceivably, such a structure could be used in combination with certain aspects of the present invention. Although locating the microphone in the mirror support provides the system designer with a microphone location that is known in advance and avoids the problems associated with mounting the microphone after the vehicle is manufactured, there are a number of disadvantages to such an arrangement. Because the mirror is positioned between the microphone and the person speaking into the microphone, a direct unobstructed path from the user to the microphone is precluded. Additionally, the location of the microphone on the windshield detrimentally impacts microphone design flexibility and the overall noise performance of the microphone.

As discussed further below, it is desirable to provide a voice recognition circuit for use with a vehicle communication system, and most preferably, such a circuit would enable hands-free operation. Hands-free operation of a device used in a voice recognition system is a particularly challenging application for microphones, as the accuracy of a voice recognition system is highly dependent upon the quality of the electrical signal representing the user's speech. Conventional hands-free microphones are not able to provide the consistency and predictability of microphone performance needed for such an application in a controlled environment such as an office, let alone in uncontrolled environments, such as in an automobile.

Commonly assigned U.S. patent application Ser. No. 09/444,176, entitled VEHICLE ACCESSORY MICROPHONE, filed on Nov. 19, 1999, by Robert R. Turnbull et al. (hereinafter "the '176 application") and commonly assigned U.S. patent application Ser. No. 09/724,119, entitled VEHICLE ACCESSORY MICROPHONE, filed on Nov. 28, 2000, by Robert R. Turnbull et al. (hereinafter "the '119 application") disclose various microphone subassembly constructions that are suitable for use in voice recognition applications within a vehicle. The entire disclosures of both of these applications are incorporated herein by reference. The preferred mounting location for the microphone assemblies disclosed in the '176 and '119 applications is on the mirror housing. The mirror housing is a desirable location not only because it allows for a self-contained system as described above, but also because a driver will typically adjust the position of the mirror housing to reflect images visible through the rear window of the vehicle and thereby will simultaneously direct the front of the microphone subassembly toward the driver.

The '176 and '119 applications disclose a number of different microphone subassembly constructions. A first construction includes two transducers that are mounted so as to both receive the same in-phase pressure waves that correspond to mechanical vibration-induced noise. The electrical outputs of the two transducers are subtracted from one another such that the resultant electrical signal eliminates noise caused by such vibration. Additionally, the transducers are positioned relative to one another such that the transducers receive the driver's speech out of phase so that the subtraction of the output of one transducer relative to the other effectively increases the gain of the speech.

A second microphone subassembly construction disclosed in the '176 and '119 applications is a second order directional construction whereby two transducers are positioned such that the central axes of the transducers are coaxial with one another and are directed towards the mouth of the driver. The electrical outputs of the two transducers are subtracted from one another such that any noise coming in from the sides, which is detected in phase by the two transducers, is electrically nulled. The two transducers in this construction may be super-cartioid-type transducers so as to have reduced sensitivity to the rear direction and have enhanced sensitivity in the forward direction towards the driver. As explained in the '176 and '119 applications, certain frequencies within the speech of the driver are detected out of phase with one another by the two transducers and hence the gain of speech signals having these frequencies is effectively increased.

While the microphone subassembly 140 is shown in FIGS. 2A, 2B, 5, and 6 as being mounted to the bottom of the mirror housing, it should be noted that the preferred location is actually on the top of the mirror housing. An example of a rearview mirror assembly having a microphone subassembly 140a mounted on the top of the mirror housing is shown in FIGS. 7-9. Microphone subassemblies mounted on a mirror housing receive not only direct sounds from the driver, but also sounds reflected off the windshield. When the microphone subassembly is mounted on the bottom of the mirror housing, there is more of a time difference between the arrival of the direct sound and the reflected sound than when the microphone subassembly is mounted on the top of the mirror housing. When the arrival times are far enough apart, the resulting combination produces a frequency response that has a series of frequencies with no output. The series, when plotted, resembles a comb, and hence is often referred to as the "comb effect."

Mounting the microphone subassembly on top of the mirror housing avoids the comb effect in the desired pass band. As shown in the side view in FIGS. 2A and 2B, the distance between the windshield and the top of the mirror housing is much smaller than that at the bottom of the mirror housing and thus the reflected sound adds correctly to the direct sound creating a louder, but otherwise unaffected, version of the direct sound, the end result being a higher signal-to-noise ratio and better tonal quality. These are very important attributes in hands-free telephony and vocal recognition in an automotive environment.

A problem with mounting the microphone subassembly to the top of the mirror housing results from the fact that the microphone assembly is closer to the windshield. When the windshield defroster is activated, a sheet of air travels upward along the windshield. Thus, when the microphone subassembly is placed on top of the mirror housing, it is exposed to more airflow as the air from the defroster passes between the mirror housing and the window past the microphone subassembly. This airflow creates turbulence as it passes over the microphone subassembly, which creates a significant amount of white noise. To solve this problem, a deflector 300 extends upward from the rear of mirror housing 30a so as to smoothly deflect the airflow from the defroster over and/or beside microphone subassembly 140a so that it does not impact the transducers or create any turbulence as it passes over and around the microphone subassembly. Because the airflow primarily would enter the rear of the microphone subassembly, the deflector may be designed to redirect the air with minimal impact on the frequency response into the front of the microphone subassembly. This is important for high intelligibility in the motor vehicle environment. With no direct air impact and the avoidance of turbulence near the microphone subassembly, mounting the microphone subassembly on the top of the mirror housing can offer superior resistance to airflow-generated noise.

As an additional measure, a signal may be transmitted over the vehicle bus or other discrete wire or wireless communication link, which indicates that the windshield defroster has been activated. This signal could be received and processed by the microphone processor and used to subtract an exemplary white noise waveform that corresponds to that detected when the windshield defroster is activated. Alternatively, when the system determines that the driver is speaking into the microphone and that the windshield defroster is activated, the system will temporarily turn down or turn off the defroster, or otherwise produce a synthesized speech signal advising the driver to turn down the defroster. The voice recognition circuitry within the mirror may also be utilized for purposes of recognizing noise generated by the defroster such that the system will be able to either advise the driver to turn the defroster down or off or to perform that task automatically.

In addition to recognizing the sound produced by the windshield defroster, the microphone may also be used to recognize the sources of various other sounds and hence subtract them from the sound received while the driver is speaking. For example, the microphone may be used to detect low pass response to determine whether the vehicle is moving. Additionally, the microphone may be used to recognize other events, such as a door closing or whether the air bags have been inflated. Upon detecting that the air bags have been inflated, the telematics rearview mirror assembly may be programmed to call 9-1-1 and to transmit the vehicle location in a distress signal.

As best shown in FIGS. 7A-7D, microphone assembly 140a is positioned on the top of a rearview mirror assembly housing 30a. Housing 30a includes a deflector 300 that extends from the upper rear portion of housing 30a so as to provide a relatively flat surface 301 on which the microphone assembly 140a may be mounted.

Microphone assembly 140a includes two microphone housings. A first microphone housing 141 is positioned forward of a second microphone housing 142 and is positioned closer to the face of the rearview mirror assembly and hence closer to the driver of the vehicle. First microphone housing 141 includes a cover 143 having a first set of ports 144 through which sound may pass. Second microphone housing 142 shares a common cover 143, which has a second set of acoustic ports 145 acoustically coupled to second housing 142 and the transducer(s) housed therein. Both housings preferably include a hydrophobic windscreen to prevent ingress of moisture. The configuration of the ports on the covers and the acoustic resistivity of the windscreens may be different for each of housings 141 and 142 so as to compensate for any effects caused by the positioning of the transducers on the rearview mirror assembly.

Each of microphone housings 141 and 142 preferably includes a single transducer having its front surface facing down the approximate middle of the vehicle. As shown in FIG. 7C, the central axis of the transducers and housings 141 and 142 may be aligned along a common axis that is approximately perpendicular to a bisector to the rearview mirror surface. This is to ensure the transducers are aligned to pick up the driver's speech while not picking up too much noise on the side of the vehicle adjacent the driver, since the rearview mirror surface would be at more of an angle to allow viewing through the rear window of the vehicle. It should be noted that the transducers need not be aligned coaxially, but may be skewed with respect to one another.

As discussed in more detail in the above-referenced '119 application, microphone assembly 140a is preferably a second order microphone assembly with the centers of the two transducers physically separated by between about 0.75 and 1.4 inches, and preferably 1.3 inches. By spacing the transducers 1.3 inches apart, the distance between the transducers is approximately one-half the wavelength of sound at 5 kHz.

Electrical System

FIG. 11 shows the vehicle communication and control system 100 according to the present invention. As shown in FIG. 11, system 100 includes a GPS (or GLONAS) receiver 80 that is coupled to a microwave antenna 50 via an antenna connector 84. As discussed above, antenna 50 and GPS receiver 80 are preferably mounted in mounting foot 36 of rearview mirror assembly 10. GPS receiver 80 may be coupled to a local bus 102 via a cable 85, which extends between mounting foot 36 in mirror housing 30. Local bus 102 interconnects the various electrical components that are preferably provided on the first and second printed circuit boards 110 and 112 mounted within mirror housing 30. Cable 85 may also be considered as an extension of local bus 102.

Vehicle bus interface circuit 104 is preferably mounted on the same printed circuit board as GPS receiver 80 and is connected to local bus 102 via cable 85. Vehicle bus interface 104 is then connected to the vehicle bus 106 via cable 86, which extends from mounting foot 36 to a connector provided between the roof and headliner or within an overhead console. It is also possible to use an audio and data transceiver 185 in place of bus interface 104 provided that there is a corresponding compatible transceiver coupled to vehicle bus 106. Preferably, any such audio and data transceiver is a Bluetooth™ transceiver, which utilizes the Bluetooth™ standard communication protocols.

Both map lamps 118 and switches 130 may be coupled to local bus 102. Similarly, display 45 may be coupled to a display control circuit 174 which, in turn, may be coupled to local bus 102. Preferably, any map lamp(s) 118 that are provided in the assembly utilize light emitting diodes (LEDs) so as to minimize the size of the lamp subassemblies and/or reduce the heat dissipation from the lamps. Preferably, the lamps are constructed using the white-light-emitting LEDs disclosed in any one of: commonly assigned U.S. Pat. No. 5,803,579, commonly assigned U.S. patent application Ser. Nos. 09/148,375 and 09/426,795, or any of commonly assigned U.S. Patent Provisional Application Nos. 60/265,487, 60/265,489, and 60/270,054.

As described further below, internal cellular telephone 170 may be printed on circuit board 110 or 112 and connected to first RF antenna 114, which is also preferably mounted on mirror housing 30. The manner in which internal cellular telephone 170 is utilized is described in further detail below. Antenna 114 is preferably mounted on the exterior of mirror housing 30, however, those skilled in the art will appreciate that this cellular telephone antenna may likewise be mounted remotely from mirror assembly 10 or in mounting foot 36. By mounting antenna 114 on mirror housing 30, however, the vehicle communication and control system of the present invention may be confined to a single integral vehicle accessory—thereby eliminating the need for running additional wiring to a remote location and thus saving substantial materials, manufacturing, and installation costs.

Microwave antenna 50 may also be integrated with cellular antenna 114, an RF antenna for a trainable garage door opener transmitter, an RKE receiver, and/or an antenna for a satellite CD radio.

Rearview mirror assembly 10 may further include a moisture sensor 172 that may be coupled to local bus 102.

Moisture sensor 172 is also preferably mounted in mounting foot 36 so as to detect the presence of moisture such as fog, rain, dew, or snow on the vehicle windshield. A preferred moisture sensor is disclosed in commonly assigned U.S. Pat. No. 5,923,027, the entire disclosure of which is incorporated herein by reference. As disclosed in U.S. Pat. No. 5,923,027, the output from moisture sensor 172 may be analyzed to control the windshield wipers and/or the window and mirror defrosters of the vehicle. Because it is preferable to mount moisture sensor 172 in mounting foot 36, moisture sensor 172 would be coupled to local bus 102 via cable 85.

Figure 12:
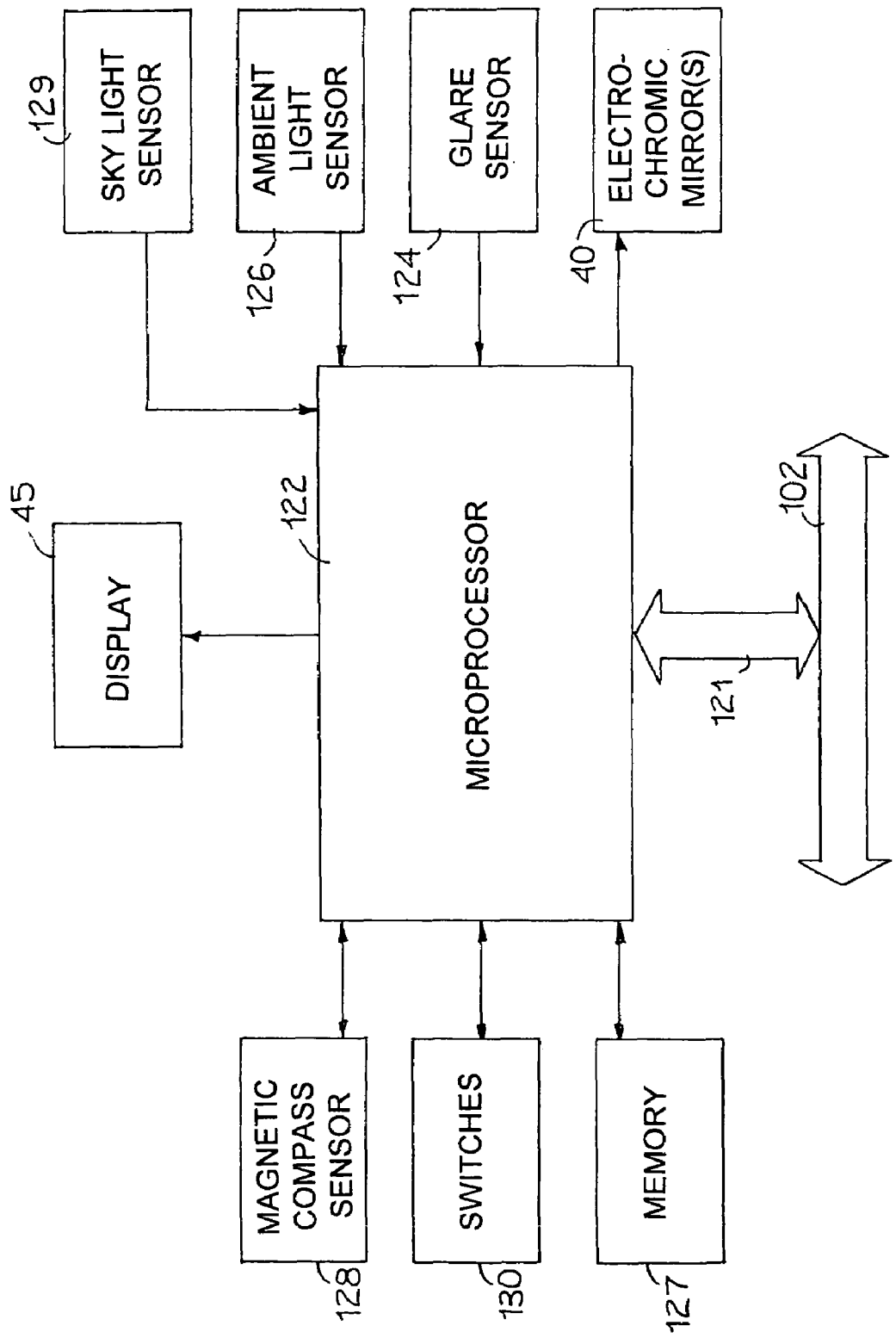
FIG. 12 is an electrical circuit diagram in block form showing an exemplary electrochromic mirror/compass system for use with the present invention.

System 100 may also include an imaging sensor 135 that is utilized for purposes of controlling the vehicle headlights using headlamp controller 216 (FIG. 11). Suitable sensors and headlamp controllers are disclosed in commonly assigned U.S. Pat. No. 5,837,994; U.S. patent application Ser. No. 09/528,389 entitled IMPROVED VEHICLE LAMP CONTROLLER, filed on Mar. 20, 2000; and U.S. patent application Ser. No. 09/800,460 (unofficial) entitled SYSTEM FOR CONTROLLING EXTERIOR VEHICLE LIGHTS, filed on Mar. 5, 2001, by Joseph S. Stam et al., the entire disclosures of which are incorporated herein by reference. The imaging sensor utilizes a low resolution pixel sensor to obtain an image from the front of the vehicle to detect the presence or absence of vehicles in front of the vehicle for purposes of controlling the brightness of the vehicle headlamps. The images obtained from the low resolution pixel sensor 135 may also be stored in memory to provide a brief history of what was in front of the vehicle, which may be particularly advantageous when determining the cause of an accident. The memory in which such images are stored is preferably non-volatile memory unless suitable battery back-up power is available in which case the memory may be volatile memory. During normal operation, images from sensor 135 are stored in volatile memory on a first-in/first-out basis for processing to identify light sources. Upon detection of a crash, a control circuit of the present invention may transfer the images stored in the volatile memory to the non-volatile memory for subsequent retrieval. In addition to use in sensing images, sensor 135 may be used as an ambient light sensor for controlling an electrochromic mirror(s) 40 (FIG. 12).

As shown in FIG. 11, the vehicle communication and control system of the present invention may also include a speech synthesizer (or system for playback of prerecorded messages) 176, a voice recognition circuit 178, a microphone processor 180, an audio and data transceiver 185 (used interchangeably throughout with "Bluetooth™ transceiver," which is the preferred implementation), a Bluetooth™ control circuit 188, and an audio circuit 190. Of these components, voice recognition circuit 178, Bluetooth™ control circuit 188, and speech synthesizer 176 are coupled to a local bus 102. Speech synthesizer 176 responds to commands transmitted over local bus 102 to generate synthesized speech signals that are transmitted over a line 195 to audio circuit 190. Audio circuit 190 may be connected to one or more speakers 192 that are mounted inside the rearview mirror assembly or remote therefrom so as to play back the synthesized speech. Embodiments of the invention utilizing internal speakers are discussed below under the heading "Internal Speakers." Alternatively or additionally, audio circuit 190 may transmit the audio signals via a dedicated connection 197 to the vehicle audio system so as to cause the audio system to interrupt (or superimpose upon) any radio broadcast or other music playing over the audio system and to produce the synthesized speech. Alternatively, Bluetooth™ transceiver 185 may be used to provide an RF connection to the vehicle's audio system so as to eliminate the need for a discrete connection 195 or a connection through the vehicle bus.

Microphone processor 180 preferably provides two separate output audio streams from the microphone subassembly. The first audio stream, which is provided on line 181 to voice recognition circuit 178, is processed differently than a second audio stream provided on line 186 to Bluetooth™ transceiver 185. The noise reduction processing performed by the digital signal processor in microphone processor 180 renders the sounds detected by the microphones better for human listening, however, such noise reduction removes detail that is useful for voice recognition. Thus, the second audio stream is filtered differently than the first audio stream since the processed signal would not be as suitable for use by the voice recognition circuit 178. Microphone processor 180 preferably includes a digital signal processor (DSP).

Bluetooth™ transceiver 185 is configured to be capable of transmitting and receiving both audio signals and data signals. As illustrated, Bluetooth™ transceiver 185 is connected to second RF antenna 116. Both Bluetooth™ transceiver 185 and antenna 116 are preferably mounted to mirror housing 30 as shown in FIGS. 6 and 7. It should be noted that antennas 114 and 116 could conceivably be combined and then used for both cellular telephone transmissions and Bluetooth™ transmissions.

As described above, Bluetooth™ transceiver 185 may receive audio signals from microphones 142 and 144 via microphone processor circuit 180 over line 186. These audio signals may be modulated and transmitted via antenna 116. Bluetooth™ transceiver 185 is also coupled to audio circuit 190 and to voice recognition circuit 178 such that audio signals received by Bluetooth™ antenna 116 may be played back through the vehicle audio system or a dedicated speaker 192 or otherwise transmitted to voice recognition circuit 178, which recognizes certain voice commands and translates those commands into command signals that are transmitted over local bus 102 and optionally over vehicle bus 106. When data is to be transmitted by Bluetooth™ transceiver 185 to another device, the data is first supplied to Bluetooth™ controller 188 over local bus 102 and then supplied to Bluetooth™ transceiver 185.

When microwave antenna 50 is tuned to receive satellite transmissions from GPS satellites, microwave receiver 80 receives and supplies data over bus 102 identifying the satellites from which transmissions are received, as well as a clock signal from each of the different satellites. In a manner well known in the art, this data may be processed to identify the position of the vehicle in terms of its latitude, longitude, and altitude. Insofar as clock signals are received from the various satellites, receiver 80 also serves as a source of a clock signal that may be used to determine the time of day. This information can be used to determine the vehicle's velocity, heading and position. Vehicle position and GPS time may be used to determine in which time zone the vehicle is located and thereby the local time may always be displayed.

If microwave antenna 50 is tuned to receive signals from one or more CD radio satellites, microwave receiver 80 serves as a source of a CD quality satellite radio broadcast transmission, which may be supplied to an audio system 234 (FIG. 11) via a discrete connection. The audio or other data may also be transmitted via an IR or low power RF link (such as through Bluetooth™ transceiver 185). Audio could be transmitted directly to the vehicle's radio from the mirror assembly on a vacant channel with a low power transmitter. This would be particularly useful in aftermarket and retrofit applications.

As discussed above, microwave receiver 80 may be configured such that microwave antenna 50 receives signals from both GPS satellites and CD radio satellites, in which case microwave receiver 80 would serve as a source of a wide variety of information and audio signals. Moreover, to the extent that microwave receiver 80 could be tuned to receive satellite transmissions from other communication satellites, such information may be displayed on a display 45 or other displays 226 (FIG. 13) connected to vehicle bus 106. Additionally, such information, if provided as a GPS or audio signal, may be transmitted to audio system 234 as described above with respect to CD radio signals. Further still, such information may be simply used and processed by vehicle communication and control system 100 or otherwise transmitted by RF or IR signals to other vehicle components or non-vehicle devices via Bluetooth™ transceiver 185 or IR transmitter 134. The information transmitted may be derived from either the microwave receiver or vehicle bus. Information derived from the vehicle bus may be particularly useful for troubleshooting and diagnostic purposes. Transmission of diagnostic data could be activated by a special vehicle startup sequence such as holding a radio or mirror button or buttons depressed while starting the vehicle. Alternatively, a command could be received via Bluetooth™ transmission or other wireless communication link that would trigger the transmission of the diagnostic data.

As shown in FIGS. 11 and 12, rearview mirror assembly 10 may also include an electrochromic mirror/compass system 120 having a connection 121 to local bus 102. As shown in FIG. 12, electrochromic mirror/compass system 120 has a microprocessor 122 that is preferably coupled at least to the interior electrochromic mirror 40 and optionally to external electrochromic mirror(s) 212, which may be coupled thereto by discrete connection or via local bus 102 and vehicle bus 106. As will be described in more detail below, microprocessor 122 may be programmed to change the reflectivity of the electrochromic mirror(s) 40, 212 in response to information obtained from an ambient light sensor 126, a glare sensor 124, as well as any of the other components coupled to microprocessor 122 either directly or through local bus 102 or vehicle bus 106. As well known in the art, ambient light sensor 126 is preferably mounted in a mirror housing of a rearview mirror assembly in a forward-looking location so as to be exposed to the light conditions in front of the vehicle, whereas glare sensor 124 is typically mounted in mirror housing 30 in a rearward-facing position so as to sense glare from head lamps of vehicles behind the vehicle. A more detailed description of the manner by which microprocessor 122 may control electrochromic mirror(s) 120 is provided in the above-referenced U.S. Pat. No. 6,166,698. Although mirror 40 is preferably electrochromic, mirror 40 may alternatively be a simple prismatic mirror. Alternatively, mirror 40 may be replaced with a display device for providing an image from a rearward facing camera.

Electrochromic mirror/compass 120 may also include a memory device 127 coupled to microprocessor 122. Memory device 127 may be external to microprocessor 122 or internal, depending upon the need for additional memory. The depicted memory device 127 represents both volatile and non-volatile memory as needed for the system.

As shown in FIGS. 6 and 12, rearview mirror assembly 10 may include a plurality of user-actuated switches 130 that provides user input information to microprocessor 122. Such switches may cause microprocessor 122 to change information displayed on display 45 or to deactivate the electrochromic mirrors 40, 212, or to initiate or answer a telephone call, to name just a few functions that may be affected through user actuated switches.

Display 45 may be located behind the reflective surface of the mirror or mounted adjacent the mirror in the mirror housing. Alternatively, display 45 may be mounted in front of the reflective layer and across part or the entire surface of the mirror. A suitable display for mounting in front of the reflective layer is an organic LED display. An example of such an organic LED display in a mirror is disclosed in commonly assigned U.S. patent application Ser. No. 09/311,955, the entire disclosure of which is incorporated herein by reference.

Display 45 is preferably a vacuum florescent display including at least ten seven-segmented character display areas, and preferably including at least sixteen such character portions. Using conventional technology, such a large display requires a 42 volt power supply. However, using the techniques disclosed in commonly assigned U.S. patent application Ser. No. 09/359,616 entitled LOW EMI MULTIPLEXED DUAL DISPLAY, filed on Jul. 22, 1999, by Robert R. Turnbull, the display may be driven using a 12 volt power supply and will also exhibit substantially lower electromagnetic interference. The entire disclosure of U.S. patent application Ser. No. 09/359,616 is incorporated herein by reference.

The display may provide various information including the vehicle heading, the external temperature, telephone numbers, roaming information, telephone and voice signal strength information, paging messages, control menus and selections, e-mail, navigational directions, diagnostic information, voice mail icons, traffic reports, news, weather, tire pressure warnings, blind spot warnings, stop sign/traffic light warnings, maintenance reminders, and any other information available on the Internet. Additionally, the display may be used to provide positive feedback to the user as to which button a user has depressed. For example, if a user has pressed a "911" button, an indication to this effect may be displayed on display 45.

As noted above, display 45 may be mounted behind mirror 40 such that the display is visible through a window provided in the reflective surface of mirror 40. The window may be formed by completely removing or partially removing reflective material on the reflective surface. Alternatively, the window may be provided by forming a partially transmissive or partially reflective area in the reflective surface. The window may also include a number of regions devoid of reflective material. Creation of such devoid regions allows the display to be visible through the reflective surface of the mirror. The devoid regions can be created in the reflective surface through a number of techniques, such as etching (laser, chemical or otherwise), masking during deposition, mechanical scraping or sand-blasting. These techniques are well known to those skilled in the art and as such are not further discussed herein. An example of an electrochromic mirror having such a display window is disclosed in commonly assigned U.S. Pat. No. 5,825,527, by Jeffery Forgette et al., the disclosure of which is incorporated herein by reference.

Preferably, the entire reflective surface could be partially reflective and partially transmissive such that no "window" need be provided and the display could be positioned anywhere behind the mirror and have any size or configuration. Display 45 may also be comprised of a plurality of separate displays. Examples of electrochromic mirror assemblies having partially transmissive reflective surfaces are disclosed in commonly assigned U.S. patent application Ser. No. 09/311,955, entitled ELECTROCHROMIC REARVIEW MIRROR INCORPORATING A THIRD SURFACE METAL REFLECTOR AND A DISPLAY SIGNAL LIGHT, filed on May 14, 1999, by William L. Tonar et al., the entire disclosure of which is incorporated herein by reference.

As will be explained in further detail below, vehicle communication and control system 100 may include an IR transmitter 134 for transmitting an IR signal into the interior passenger area of the vehicle. This IR signal may include any data or other information intended for portable electronic devices that may be located in the passenger area. If such devices have an RF receiver, Bluetooth™ transceiver 185 may be used for that purpose.

Vehicle communication and control system 100 may also include a receiver intended to receive RF signals or the like from remotely located transmitters such as an RKE transmitter or tire pressure monitoring sensors.

As will become apparent to one skilled in the art from the description of the various functions below, vehicle communication and control system 100 may include various combinations of the elements identified above and shown in FIG. 11, and thus need not include each and every element described above. Further, although each of the elements shown in FIG. 11 may be housed within rearview mirror assembly 10, some or all of the components may be provided in other remote locations and transmit and receive information over vehicle bus 106 or via RF Bluetooth™ transmissions. Further, the various components that may be mounted in rearview mirror assembly 10 may be mounted in either mounting foot 36 or mirror housing 30 with appropriate electrical connections made therebetween.

Figure 13:
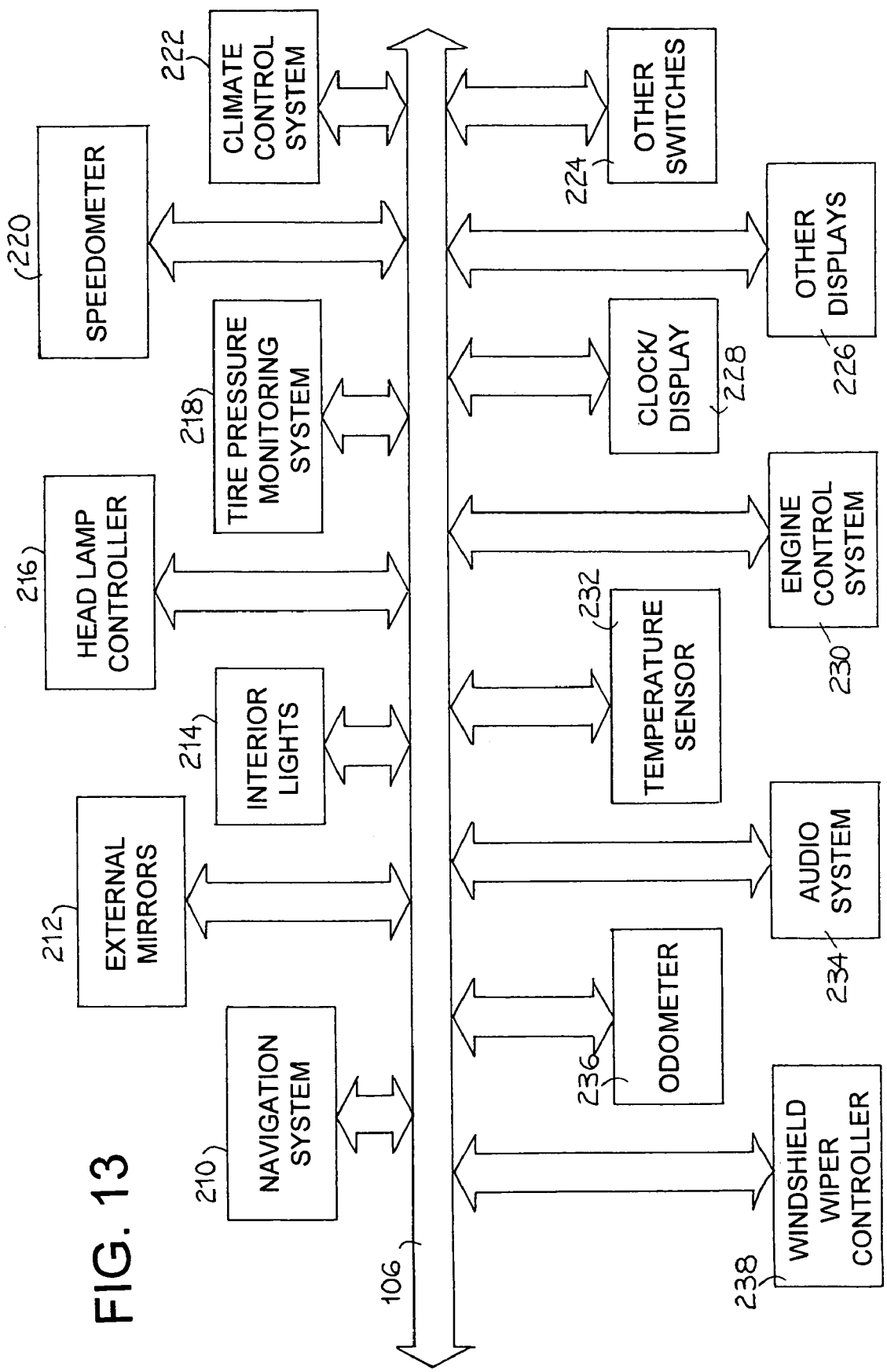
FIG. 13 is an electrical circuit diagram in block form showing various electrical systems that may be coupled to the inventive vehicle communication and control system shown in FIG. 11.

FIG. 13 shows an example of some systems and other electrical devices within the vehicle that may be connected to vehicle bus 106, and hence in electrical communication with the various components that are mounted in mirror assembly 10. Specifically, the following are a few examples of the components that may be coupled to vehicle bus 106: navigation system 210, external rearview mirrors 212, interior lights 214, head lamp controller 216, tire pressure monitoring system 218, speedometer 220, climate control system 222, clock/display 228, engine control system 230, temperature sensor 232, audio system 234, odometer 236, the vehicle windshield wiper controller(s) and various other switches 224 and other display devices 226 that may be located throughout the vehicle.

By providing both Bluetooth™ transceiver 185 and an internal telephone 170 in the vehicle communication and control system, an individual having a relatively low power portable cellular telephone may effectively utilize a higher powered cellular telephone 170 when inside or otherwise within range of the Bluetooth™ transceiver 185 in a manner similar to how a ZONE™ telephone operates. See, for example, U.S. Pat. No. 5,745,850. Specifically, Bluetooth™ transceiver 185 may be trained or otherwise configured to look for signals transmitted from a person's portable telephone and then transfer the received signals to internal telephone 170 for transmission at a higher power. Likewise, incoming signals may be received by internal telephone 170 and transferred to the portable telephone handset via Bluetooth™ transceiver 185. Internal telephone 170 may be provided for emergency calls only and any cellular telephone calls are made through the driver's portable telephone, which in turn are transmitted through the internal telephone which transmits at a higher power level. This is also advantageous for vehicles in Europe where use of handheld telephones in vehicles is illegal. For example, once a user comes within range of their vehicle, their portable telephone is disabled and the hands-free telephone installed within the mirror is activated without disruption of the telephone call. Such a hand-off from a portable telephone to internal telephone 170 may also occur upon detection that the vehicle alarm has been deactivated, a door has opened, the ignition key is inserted into the vehicle ignition, the ignition is turned on, the vehicle is put into gear, the vehicle is travelling above a threshold speed, or any combination of these events. Likewise, any of these events may trigger an automatic hand-off from internal telephone 170 to the portable telephone. For example, detection that the vehicle ignition has been turned off and/or opening of the door may trigger such an automatic hand-off. Alternatively, a manually activated call transfer button or voice activated command may be used to manually cause a call transfer. Such a manual switch may be provided on either or both of the portable telephone and internal telephone 170.

To enable such call transfer, a unique ID code associated with, and transmitted by, one or both of the Bluetooth™ compatible transceivers of the portable telephone and internal telephone would be input into the other so that the respective telephone will not respond or attempt to transfer control, or partial control, of a call function to the telephone of a third party.

While it is generally desirable to transfer the entire call functionality to internal telephone 170, it will be appreciated that only some of the call functions may be transferred. For example, it is possible to transfer (or duplicate) the microphone and speaker functions of the portable telephone to those of internal telephone 170. In this manner, the transceiver, antenna, and keypad of the portable telephone would continue to function while enabling hands-free use of the speaker and microphone of internal telephone 170 with the audio transmitted through a Bluetooth™ or similar communication link. As yet another example, the keypad and other call initiation features (redial/speed/memory dialing) of the portable telephone may remain functional while the transceiver, antenna, microphone, and speakers of internal telephone are used.

Another possibility is that the driver or other vehicle occupant may utilize a headset having a low power RF Bluetooth™ transceiver for communicating with Bluetooth™ transceiver 185 provided in rearview mirror assembly 10. The vehicle occupant may then make cellular telephone calls using this headset, Bluetooth™ transceiver 185, and internal telephone 170 and may also speak into the headset microphone and have voice commands transmitted to Bluetooth™ transceiver 185 and then transferred to voice recognition circuit 178 where those voice commands are translated into control signals that are transmitted over local bus 102 and optionally vehicle bus 106 to thereby affect various vehicle functions.

Provided that the portable headset or portable cellular telephone carried by a person is Bluetooth™ compatible, virtually any level of interaction between internal telephone 170 and the headset or portable cellular telephone is possible. For example, the cellular telephone or headset may include a unique serial number that may be transmitted from the cellular telephone or headset by its Bluetooth™ transceiver. When the portable cellular telephone or headset is brought within range of Bluetooth™ transceiver 185, any portion of the telephony functions may be transferred to internal telephone 170. Conversely, a call initiated using the internal telephone 170 may be transferred to the portable telephone or headset. For example, the keypad on the cellular telephone may be used as a means for initiating a telephone call by internal telephone 170. Additionally, the microphone and/or speaker of the portable telephone may be disabled with those functions being performed by the microphone and speaker within the vehicle while the remainder of the call processing and call transmission is handled by the portable cellular telephone. Further still, the portable cellular telephone could be used for RKE functions and/or disabling the vehicle alarm or otherwise activating the lights within or on the vehicle for illuminated entry. This can be performed simply by having the Bluetooth™ transceiver 185 continuously monitor for the presence of another Bluetooth™ transceiver having the known unique identification number corresponding to the driver's cellular telephone. Also, a person may utilize their cellular telephone as a mechanism for unlocking the vehicle doors if they lock their keys in the car. More specifically, a person could bring their cellular telephone within range of Bluetooth™ transceiver 185 and either dial in a sequence of numbers representing a door unlock code, speak into the microphone such that voice recognition circuit 178 responds to a command to unlock the doors, or dial a telephone number associated either with the vehicle or with a service organization that allows the person to either directly or indirectly communicate with the vehicle from a distance to either lock or unlock the vehicle doors.

Internal cellular telephone 170 is preferably a dual-band tri-mode analog/digital telephone. Internal telephone 170 may be configured to utilize any of the standard communication protocols including AMPS, GSM, TDMA, IDEN, or CDMA. By providing internal telephone 170, the vehicle occupants are provided with a hands-free telephone, a means for receiving electronic mail, voice mail, Internet access, weather reports, news reports, traffic reports, and other useful information. Additionally, the vehicle occupants may use the telephone to access concierge services. By providing GPS receiver 80 in addition to cellular telephone 170, a system is provided whereby an emergency 9-1-1 call may automatically be placed upon detection of airbag deployment or activation of an emergency switch. Upon such activation, telephone 170 dials 9-1-1 and transmits with the signal the vehicle location as determined by GPS receiver 80. In this way, if the vehicle occupants are unconscious, emergency vehicles may still be deployed to the identified location.

By integrating the cellular telephone, Bluetooth™ transceiver, microphone processor 180, and voice recognition circuit 178 in a common accessory, the system benefits from the integration by only requiring a single digital signal processor (DSP) circuit. This clearly eliminates the cost of providing separate digital signal processors in these components when they are located at different locations throughout the vehicle.

Another advantage of incorporating voice recognition circuit 178 in the control system is that voice recognition circuit 178 may be used to perform certain voice recognition functions that assist an automated call answering system having its own voice recognition functions. Such call answering systems are becoming more commonplace since individuals utilizing hands-free telephones often do not have easy access to a keypad to press numbers when prompted by the automated call answering service. Thus, these services typically request the caller to audibly speak one of the various options. The automated call answering system then performs voice recognition on the spoken option to determine how to further process the call. One problem facing such automated call systems is that there is limited bandwidth through which such spoken options are transmitted over the telephone lines. The use of cellular telephones, which may not always transmit a clear signal, creates further problems.

To improve the effectiveness of such systems, a vehicle equipped with its own voice recognition circuit 178 may allow for prerecognition of a spoken command within the vehicle. Speech synthesizer 176 may then produce a synthesized voice command that is transmitted to the automated call answering system. Provided that all speech synthesizers produce a synthesized voice that is substantially the same, the voice recognition circuitry in the automated call answering system may function much more accurately since it does not have to process a very wide variety of speech patterns transmitted from all of the users of the system. Further, the voice recognition circuit (178) in a vehicle may be trained to the driver's specific voice patterns thereby providing much more accurate voice recognition processing. Further still, voice recognition circuit 178 is not limited by a restricted bandwidth when receiving the voice commands that it must recognize.

A further option is to have voice recognition 178 recognize a spoken command (i.e., a number, pound sign, etc.) and to have the system transmit additional data over the wireless telephone link data that will assist a voice recognition system within an automated call answering system to recognize the spoken command. In this case, the spoken command would still be transmitted over the wireless telephone link in the driver's own voice, but the additional data transmitted with the spoken command would allow more accurate recognition by the automated voice answering system.

An alternative option is to employ vocal recognition in the car to recognize any spoken number, pound sign or star in the outgoing telephone signal. Immediately after the recognition, the processor would add the appropriate DTMF tone for that keypad option. At the receiving end, any voice mail system or service provider capable of DTMF tone control would respond to the signal. This would allow hands-free activation of voice mail, remote dialing and menu options requiring/desiring a keypad entry with no keypad. The driver would not have to hear these tones, and thus, such a system would prevent the tones from distracting the driver. Another vocal command or switch could be used to turn this feature on and off, if necessary.

In general, the voice recognition circuit may be used to recognize any spoken command during such time that a call is not in progress. Once a call is in progress, the voice recognition may be selectively turned off so as not to inadvertently invoke commands based upon words spoken during the telephone conversation that are not intended to invoke such commands. On the other hand, when the voice recognition circuit is to be utilized to perform functions during a telephone call, a specific key word can be utilized that is not commonly used in conversation so as to place the system in a voice recognition mode. Such would be desirable when, for example, a call is placed through an automated call processing network that asks for an individual to press a number on a key pad.

As shown in FIG. 11, the vehicle communication and control system may further include a backup power or battery component 200. As illustrated, this circuit includes a connection 204 to the vehicle battery or ignition through cable 86. Component 200 preferably includes a large capacitor or capacitor bank 202 that stores a sufficient amount of energy that is received from vehicle battery/ignition so as to enable the system to still operate for a brief period should the connection to the vehicle battery/ignition be disrupted. A primary or rechargeable battery may alternatively or additionally be used. The capacitor bank may be charged to a relatively high voltage using a flyback, boost, or other switching power supply. Since $E=\frac{1}{2}CV2$, more energy can be stored using a higher voltage. The stored energy can then be used to power a flyback, buck, or other switching power supply to provide regulated low voltage to the cellular telephone. Alternatively, a bi-directional power supply may be used to charge and discharge the capacitor bank. Thus, for example, if the vehicle is in an accident and the rearview mirror assembly becomes disconnected from the vehicle ignition or battery, the internal telephone 170 may still make the emergency 9-1-1 telephone call and transmit the vehicle location. Alternatively, internal telephone 170 could initiate an emergency call and then transfer control of the call to the vehicle occupants' portable telephone if it is present and active. This would allow the emergency call to stay active for a longer period of time given that portable telephones typically have a relatively long battery life. It should further be noted that internal telephone 170 may be configured to provide less than full functions of a cellular telephone and thus only be provided for purposes of emergency telephone calls. By transmitting an emergency signal to an individual's portable telephone and appropriately programming the portable telephone, both internal telephone 170 and the portable telephone provide a redundancy when making emergency calls that may be critical. For example, in the event one of the telephones is disabled in a serious accident, such redundancy increases the likelihood that the distress call will be completed.

To ensure that the backup battery is fully functional in cold weather climates, a heater 157 is preferably utilized to heat the battery upon detection that the vehicle ignition has been turned on so as to quickly improve the functionality of the battery in cold weather in the event that an emergency or other need for the backup battery results before the battery may otherwise heat up as a result of the vehicle climate control system.

By providing GPS receiver 80 and internal telephone 170 in the vehicle communication and control system, the system may be utilized to track the location of the vehicle. This is particularly useful when the vehicle is stolen. Upon notification that the vehicle is stolen, the owner or the police may call the vehicle and request location information from GPS receiver 80. This information may then be transmitted through internal telephone 170 and utilized for the police to locate or disable the vehicle. Also, the transmitted information may include information about any accident in which the vehicle is involved. For example, this information could include the speed of the vehicle prior to the accident, whether the vehicle rolled over, whether the air bags deployed, deceleration data, and other data indicating crash dynamics and the severity of the accident. Such information can be very helpful in determining which emergency vehicles to dispatch to the scene of the accident.

While integration of the components of the invention into a single accessory such as a rearview mirror assembly makes the system much easier and less costly to install, it is conceivable that a would-be thief could simply rip the rearview mirror assembly off the windshield and throw it from the vehicle or otherwise cut any exposed cables. One solution to this potential problem is to provide a module within engine control system 230 or within some other component connected to vehicle bus 160 or another Bluetooth™ transceiver that periodically polls a component located within a rearview mirror assembly to determine its presence. Then, if the engine control system component or other component remotely located from the mirror assembly determines that the rearview mirror assembly has been disconnected from the vehicle bus, the engine control system executes a routine that disables the vehicle by causing it to slowly come to a stop and prevent further movement of the vehicle. Alternatively, the vehicle would stop and refuse to restart if the vehicle speed dropped below a predetermined speed with the security mirror removed. The backup power in the rearview mirror assembly could simultaneously be utilized to at least track the location of the rearview mirror assembly and provide the police with an approximate location of the stolen and disabled vehicle.

Additionally, the vehicle communication and control system 100 provided in rearview mirror assembly 10 may have a particular serial number or rolling code that it transmits back to the polling engine control system component such that the engine control system component may ensure that a thief has not simply switched rearview mirrors or otherwise installed some form of module that would fool the engine control system component.

It is also preferable that at least one component within the system shown in FIG. 11 periodically determines the status of the other components to ensure they are present and operational. If any one component is disabled, the component checking the status of the other components within the system may then appropriately interact with the engine control module so as to disable the vehicle in the manner discussed above.

The Bluetooth™ transceiver 185 may also be utilized in connection with an RF identification tag implemented in an individual's key fob to actively sense when the RF identification tag is proximate the vehicle. When the RF identification tag comes into close proximity to the vehicle such that the Bluetooth™ transceiver 185 can detect transmissions from the RF identification tag transponder, commands may be sent via Bluetooth™ controller 188 and busses 102 and 106 to various electronic components within the vehicle. For example, upon detecting the RF identification tag for a particular individual, the system may adjust the seats and mirrors and even the radio presets for that particular person. Additionally, various other electronic components can be personalized and automatically selected for the individual identified in the RF identification tag. For example, an individual may program the system to perform different and personalized functions in response to actuation of any of the switches 130. Additionally, the identification of the person entering the vehicle may be used to select the appropriate data in the voice recognition circuit for most effectively recognizing the voice of that particular individual.

A transceiver located in the vehicle rearview mirror assembly may also be used to energize and/or receive confirmation of the presence of a transponder on the ignition key or in a key fob. In the absence of such confirmation, the control circuit in the rearview mirror may transmit a signal preventing starting of the vehicle. Alternatively, the vehicle engine modules may be programmed not to start the engine in the absence of a signal from the rearview mirror indicating that the proper signal is received from the transponder on the vehicle owner's key or key fob. The transceiver in the rearview mirror may continue to interrogate the transponder and disable the vehicle if the transponder is no longer present. By placing the rearview mirror in this vehicle control loop, the vehicle will not start if a thief removes the rearview mirror assembly from the vehicle in an effort to remove the remote vehicle tracking feature from the vehicle.

Additionally, Bluetooth™ transceiver 185 may be used for detecting signals from tire pressure sensors provided in the vehicle tires. When the pressure in a tire falls below a threshold level, Bluetooth™ transceiver 185 may generate a warning signal that is either audio and/or visual.

Bluetooth™ transceiver 185 may also be used to receive RKE RF signals and respond by unlocking vehicle doors and disarming a security system. Further, Bluetooth™ transceiver 185 may be used to transmit garage door opening signals and other control signals to various receivers in a person's home, security gate, or other building.

The Bluetooth™ transceiver 185 may also be used to transmit diagnostic information to the user and out of the car.

Another use for the Bluetooth™ transceiver is to detect whether or not there is a similarly equipped vehicle in the vehicle's blindspot. Specifically, when a driver activates the turn signal, Bluetooth™ transceiver 185 receives a command via busses 106, 102, and Bluetooth™ controller 188 and responds by transmitting a signal indicating that a turn is about to be completed in a particular direction. The adjacent vehicle may then receive the signal and generate a warning signal or otherwise respond back to the vehicle with its turn signal on so as to warn the driver of the turning vehicle that there is a vehicle in its blindspot. Additionally, Bluetooth™ transceiver 185 may receive signals from stop signs or traffic lights indicating their presence or their particular status so as to warn the driver in advance. As shown in FIG. 7A, a number of colored indicator lights 159 may be provided on the rearview mirror assembly to display the status of the traffic lights. Specifically, a first indicator light 159$a$ may be a red light, a second indicator light 159$b$ may be a yellow light, and a third indicator light 159$c$ may be a green indicator light. This will enable drivers to merely look at the rearview mirror to see the status of a traffic light in such circumstances where the sun is in their eyes or their view of the traffic light is otherwise impeded by the vehicle roof or other obstacle.

Further still, Bluetooth™ transceiver 185 may be utilized to transmit and receive information for payment of tolls at toll booths or payment of various expenses by transmitting a credit card number or debit card number and passcode to an external receiver.

By providing sufficient memory in system 100, the system may be utilized as a data/accident recorder or black box. The black box may store information such as the speed the vehicle was traveling prior to a crash. Other accident reconstruction information can also be stored such as readings from gyroscopes, suspension systems, air bag deployment sensors, roll sensors, GPS data, and other devices or sensors that indicate dynamics of a crash. The memory may also store a history of the speed, direction, driver input, ambient temperature, and other information available on the vehicle bus or other interface, such that this information may be read from memory to prove that the vehicle was traveling at a specific speed to either serve as additional evidence that a speeding ticket was or was not warranted.

Electronic vehicle compass systems are known that include electronic compass sensors for sensing the earth's magnetic field, and generate an electrical signal representing the vehicle's direction of travel based upon the sensed magnetic field. Such systems are typically calibrated based upon sensor readings obtained while driving the vehicle through one or two closed loops. Such calibration techniques are also well known and described in U.S. Pat. No. 5,761,094. These known electronic compass systems compensate the compass sensor readings based upon the calibration data as well as other filtering parameters, and display the current vehicle heading on a display device commonly provided in the overhead console or interior rearview mirror of the vehicle. One of these parameters is used to adjust the vehicle heading based upon a geographical zone of variance in which the vehicle is currently located. Typically, a user is required to manually input in which zone the vehicle is currently located. U.S. Pat. No. 5,761,094, however, utilizes vehicle position data obtained from a GPS receiver to determine the vehicle's current location and to determine which zone of variance the compass system should use to further compensate the sensed vehicle heading.

As noted above, the prior art electronic compass systems all utilize some form of device that senses the earth's magnetic field. Such sensing devices are relatively expensive and must be mounted in particular locations within the vehicle so that the sensors are not adversely affected by the metal structure of the vehicle, which may introduce errors to the magnetic sensors. Such magnetic sensors are also susceptible to errors resulting from driving over railroad tracks and driving in large cities. Further, the compasses must be calibrated for each different model vehicle in which it is mounted, since the body style of these different model vehicles may have differing effects on the way in which the compass sensors sense the earth's magnetic field and sense the vehicle's current heading.

The compass system according to the present invention overcomes the problems noted above with respect to conventional electronic compass systems. According to one aspect of the present invention, the compass system includes an electronic compass sensor for sensing the earth's magnetic field and for generating an electrical signal representing the vehicle's direction of travel based upon the sensed magnetic field, a microwave receiver for receiving transmissions from satellites of a position identification system constellation and for generating vehicle position data from the satellite transmissions, a control circuit coupled to the electronic compass sensor and to the microwave receiver for determining the vehicle's direction of travel from the vehicle position data received from the microwave receiver, adjusting the vehicle's direction of travel as identified by the electronic compass sensor using calibration data, comparing the vehicle's direction of travel as determined using the vehicle position data with the vehicle's direction of travel as received from the electronic compass, and recalibrating the compass system when the vehicle's direction of travel as determined by both the microwave receiver and the adjusted electronic compass sensor readings are not substantially the same. The compass system further includes a vehicle direction indicator, such as display 45, coupled to the control circuit for advising a vehicle occupant of the vehicle's direction of travel.

If combined with a magnetic sensor, the GPS heading data may be used to provide continuous calibration correction for the magnetic sensor, allowing placement of the magnetic sensor in a non-fixed location, such as inside the movable portion of the rearview mirror assembly. Magnetic, angle rate, speedometer, odometer, or other inertial sensor data can then be used to supplement GPS data when buildings or other environmental obstacles interfere with reception of the GPS satellite constellation.

According to yet another aspect of the present invention, the inventive compass system does not include an electronic compass sensor or any other form of sensor that senses the earth's magnetic field, but instead utilizes vehicle position data that is derived from transmissions received from satellites of a position identification system constellation utilizing a microwave receiver that is mounted in the vehicle.

By utilizing the vehicle position data that is available from microwave receiver 115, a control circuit including microprocessor 110 may use this data to directly determine the vehicle's current heading, which is subsequently displayed on display device 45.

Because it is possible that tunnels or tall buildings may at times block the signals from some of the satellites that are otherwise needed to accurately determine the vehicle heading, the present invention preferably utilizes information obtained from the vehicle speedometer and a gyroscope, wheel speed sensors, or the like to compute the heading using dead reckoning. The heading computed using dead reckoning may then be compared with that obtained from the GPS receiver to more accurately determine the actual vehicle heading. For example, if the GPS unit is indicating a change in heading but the gyroscope has not detected that the vehicle has turned, the compass processor may determine that the displayed heading should not change. Alternatively, the processor may use the dead reckoning heading as a filter mechanism for the heading obtained from the GPS unit. For example, if the heading obtained by the GPS unit changes and the gyroscope has indicated that no change in direction has occurred, the compass processor may maintain the presently displayed heading for a predetermined time period at which point the processor will either change the heading to correspond to that obtained from the GPS unit or will maintain the heading if the heading obtained from the GPS unit fluctuates back and forth during this time period. Thus, dead reckoning may be utilized not only when the GPS unit determines that there is an insufficient number of satellite signals received, but may be used at all times to improve the accuracy of the vehicle heading that is displayed or otherwise communicated to the driver.

Thus, the inventive electronic compass system may be constructed without utilizing an electronic compass sensor, and may therefore provide accurate vehicle heading information independent of the earth's magnetic field and its inherent anomalies when sensed by a sensitive electronic compass sensor. Accordingly, much of the expense of providing such magnetic field sensors may be eliminated.

The GPS unit may compute the vehicle location and heading autonomously or the vehicle location and heading may be computed with the aid of a network. This network-aided navigation techniques distributes the processing demands necessary to compute the vehicle location and heading to other processors either within the vehicle or external to the vehicle. For example, the GPS receiver in the vehicle may be used to collect information from the satellites and then transmit this information via internal telephone 170 to a base station which performs the computations and transmits the heading and/or vehicle location back to the vehicle. Such a system allows for the use of less-expensive processing circuits in the vehicle's system. Similarly, the processing power demands could be performed by another processor located elsewhere in the vehicle. The communication of the information obtained from the GPS receiver may be transmitted to that other processor either over the vehicle bus or via a discrete wire or wireless link. For example, the information could be transmitted by means of Bluetooth™ transceiver 185 or another RF or IR link. Yet another alternative is that the processing of this information could be performed by the driver's portable computer or personal digital assistant and such information could be transmitted to that device by means of a Bluetooth™ transceiver or IR link.

One benefit of having much of the vehicle location and heading processing performed by a base station is that the base station may provide a clock signal that is received from GPS satellites and that has an accuracy approaching that of an atomic clock. Such a base station would require less satellite signals to be received by the vehicle to accurately compute the vehicle heading. Additionally, the system could be programmed to only communicate with a base station when it determines that it does not have sufficient satellite signals to accurately compute the vehicle heading or location. Another benefit to such shared processing with a base station is that the base station may also transmit other data with the vehicle location/heading. Such information may include traffic or construction information along with recommended detours.

Another feature enabled by the present invention is a navigation system. The navigation system may provide visual information to the driver on a display or audible driving instructions that are downloaded into memory and communicated to the driver using speech synthesizer 176 or audio playback/decompression system (i.e., mp3, wav, or other audio format). Such direction information could be presented to the driver at each leg of a given trip based upon the determined location of the vehicle as it approaches an upcoming turn or exit. While there are many navigational systems disclosed in the prior art that utilize data from a GPS unit, many of these systems require vast amounts of map data to be stored within the vehicle. Furthermore, when such vast amounts of information are stored in the vehicle, the information may quickly become out of date and not provide information such as information pertaining to construction or traffic congestion. In addition, a large and expensive non-volatile memory would need to be utilized in the vehicle to store all of this information. According to one aspect of the present invention, an Internet web site may be provided that contains accurate and up-to-date information including any map data, directional data, points of interest, traffic congestion information, and construction information. A driver may access such a web site and provide their origination and destination locations so as to download only information pertaining to that particular trip into either a portable storage medium or into memory within the vehicle via an RF or IR wireless link. Alternatively, this information could be downloaded into the vehicle via the internal telephone provided in the vehicle. Such information may include visual map data limited to that along the route to be traveled. The information could also include audible and/or visual prompts that are played back by speech synthesizer 176 over the vehicle audio system or an internal speaker or displayed by the mirror display. The information may further include points of interest such as gas stations, restaurants, and lodging facilities.

The microphone and voice recognition portions of the system may be utilized by the driver to input inquiries such as "identify closest gas station." The system may then access the downloaded information and either display the location of the closest gas station on the map display and/or play back a synthesized audible message identifying the location of the gas station and giving directions.

The advantage of such a system is that it does not require excessive amounts of memory to be provided in the vehicle and the information that is stored in the vehicle is much more current than in prior systems.

Another way in which the information may be requested and downloaded would be through requests entered by the driver within the vehicle by way of a cellular telephone call from internal telephone 170 to a service center. The service center may have, for example, voice recognition capabilities such that the driver may simply state the desired destination into the microphone of the vehicle such that the destination information may be sent to the automated call service center along with GPS information identifying the current location of the vehicle. The information may then be translated by the automated call center into route information that is subsequently transmitted back to the vehicle's navigation system.

Various features of the telematics rearview mirror assembly described above may be enabled or disabled depending upon the status of the vehicle. For example, when the vehicle ignition is off, the system may be utilized to receive RKE signals. When the vehicle ignition is on, the system need not receive RKE signals. Similarly, the cellular telephone may be disabled when the vehicle doors are locked and the alarm is activated. Moreover, the telephone may further be activated if the vehicle's transmission is in drive or if the vehicle is travelling at a speed exceeding a threshold level.

Additionally, the telephone within the rearview mirror may be disabled when a key is not in the vehicle ignition except, perhaps, for enabling a call to be made to 911 for emergency purposes. Such disabling would possibly prohibit unauthorized calls by someone breaking into the vehicle.

Features within the above-described telematics mirror may also be enabled, disabled, or modified based upon location information derived from the in-vehicle GPS and navigation systems. More specifically, the navigation system may include a database of local regulations and, based upon the location of the vehicle as derived from the GPS system, the system may enable or disable certain features of the vehicle and/or telematics system. For example, in some locations, local ordinances dictate that only hands-free telephones may be operated in a vehicle, whereas in other locations, telephones may have been completely banned from use. In still other locations, telephones may be used only as hands-free telephones when the vehicle is in motion. All of these features could be effectively enabled or disabled based upon input from the GPS system, navigation system, and from the vehicle status information (i.e., vehicle speed or transmission information). Additional features that may be enabled or disabled that may be included in the rearview mirror assembly include a speed limit warning and/or engine governor that determines the speed limit for the road on which the vehicle is traveling based upon the GPS location signal and navigation database, and generates a warning if the speed of the vehicle exceeds the speed limit or a reasonable threshold above or below the speed limits. The system could also be used to govern the vehicle's engine so as to prevent a person from exceeding the speed limit or a reasonable range above the speed limit. Similarly, a radar detector in the vehicle may be selectively enabled or disabled based upon the GPS location signal and data obtained from the navigation database as to whether or not radar detectors are permitted in the location in which the vehicle is being driven.

Another feature that may be included in a rearview mirror assembly is a rain/fog sensor. The rain/fog sensor may generate a control signal to turn on or off the vehicle windshield wipers based upon a detection of moisture on the vehicle windshield. The connection to the vehicle windshield wipers may be utilized to disable the windshield wipers in situations where the GPS system does not detect any GPS satellites in the sky. When GPS satellites are not detected in the sky, this could serve as an indication that the vehicle is inside of a car wash, in which case it would be desirable to disable entirely the ability of the operator of the vehicle to activate the windshield wipers. When windshield wipers are activated in a car wash, there is a significant possibility that the windshield wipers could be ripped off the vehicle by the car wash brushes. In general, operators of the car washes pay for such damage caused to a vehicle. Further, the time and effort required to have the windshield wipers replaced creates an additional burden on the owner of the vehicle. Thus, there is a need for a system that disables the windshield wipers of a vehicle upon entry into a car wash. Another mechanism that could be used to disable the windshield wipers is to provide a transmitter that transmits a predetermined RF control signal, at the entry to each car wash. The telematics rearview mirror of the present invention could be used to sense the RF control signal transmitted from such a transmitter and respond by disabling the vehicle's windshield wipers. Additionally, the system could respond by lowering the vehicle's radio antenna (if the vehicle includes such an automatic antenna), and also to roll up and lock the vehicle windows and to close a sunroof, if present.

In addition to the functions above, any of the functions disclosed in U.S. Pat. No. 6,166,698 may also be performed by the inventive vehicle communication and control system.

Figure 14:
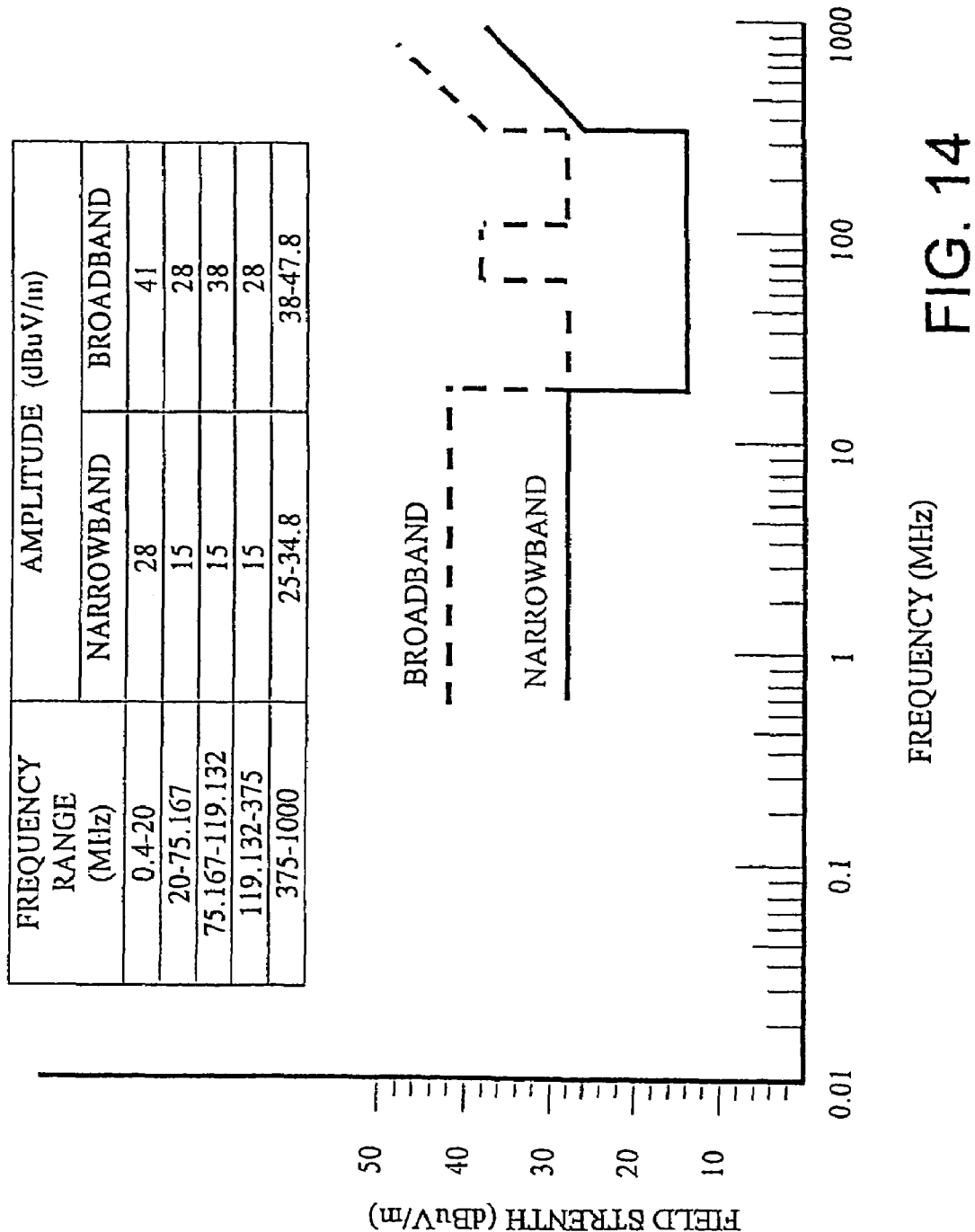
FIG. 14 is a graphical illustration of currently acceptable EMI levels for both narrowband and broadband emissions in a rearview mirror assembly.

FIG. 14 graphically illustrates currently acceptable EMI levels for both narrowband and broadband emissions for a rearview mirror assembly. In this context, broadband refers to a bandwidth which is greater than that of the receiver that is used to measure emissions. Conversely, narrowband refers to a bandwidth that is less than that of the receiver that is used to measure emissions. A typical EMI measurement receiver has a bandwidth of approximately 10 kHz. A typical broadband emission source includes ignition systems and brush type DC motors. A typical narrowband emission source includes microprocessors, clocks, pulse width modulated motor drivers and light dimmers and chopping type power supplies.

As illustrated in FIG. 14, from 0.4-20 MHz, narrowband emissions are limited to 28 dBµV/m and broadband emissions are limited to 61 dBµV/m, more preferably to 51 dBµV/m, and most preferably 41 dBµV/m. From 20-75.167 MHz, narrowband emissions should not exceed 15 dBµV/m and the broadband emissions should not exceed 28 dBµV/m. From 75.167-119.132 MHz, narrowband emissions are limited to 15 dBµV/m and broadband emissions are limited to 38 dBµV/m. From 119.132-375 MHz, narrowband emissions should not exceed 15 dBµV/m and broadband emissions should not exceed 28 dBµV/m. In the range of 375-1000 MHz, narrowband and broadband limitations are approximately linear.

At 375 MHz, narrowband emissions should not exceed 25 dBµV/m and at 1000 MHz narrowband emissions should not exceed 34.8 dBµV/m. At 375 MHz, broadband emissions should not exceed 38 dBµV/m and at 1000 MHz broadband emissions should not exceed 47.8 dBµV/m. Of particular interest in this case is the frequency range from 0.4-20 MHz. As previously stated, in this frequency range narrowband emissions should be less than about 28 dBµV/m and broadband emissions should be less than about 41 dBµV/m.

Figure 15:
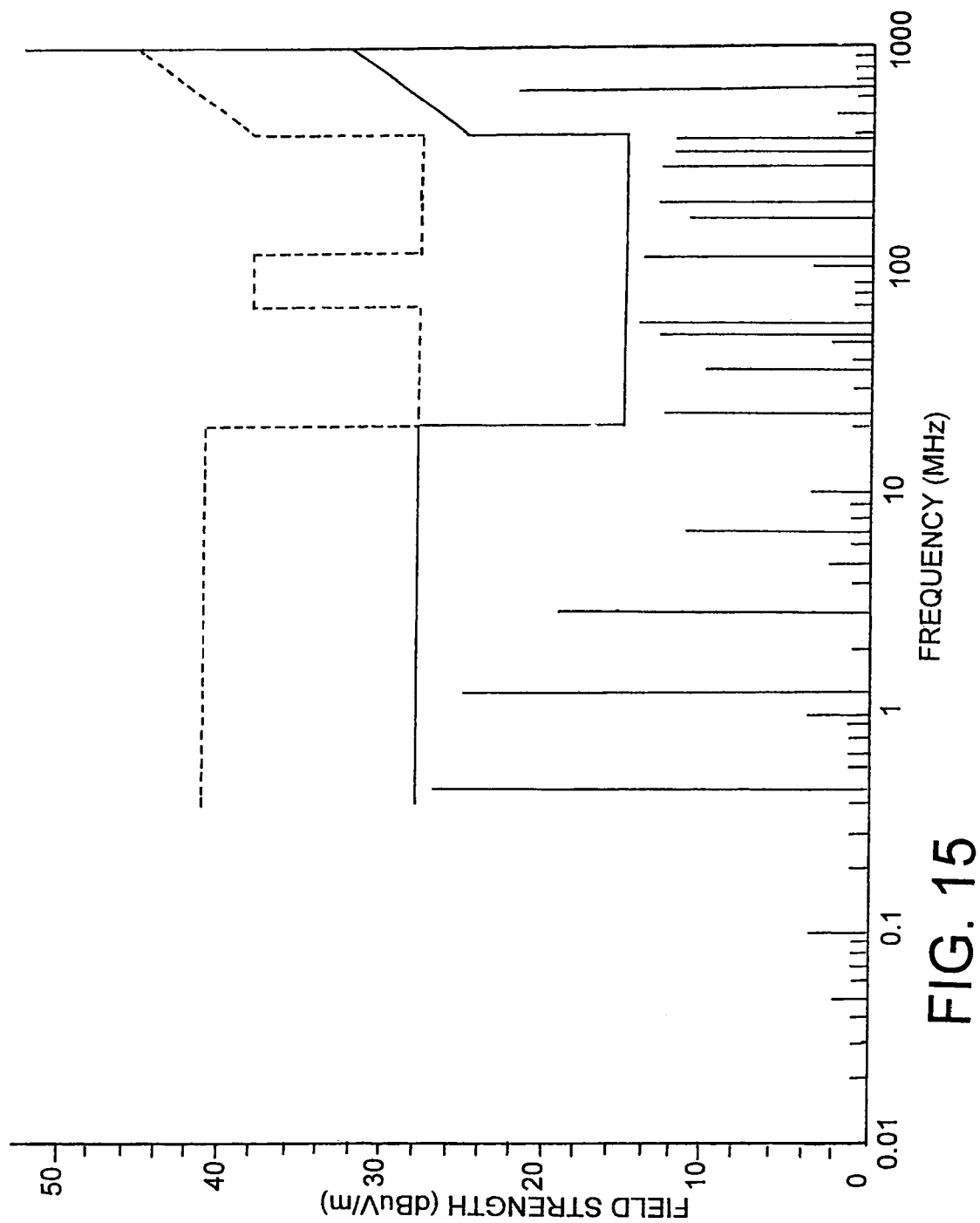
FIG. 15 is a graphical illustration of a typical narrowband EMI emission spectrum.

FIG. 15 illustrates a typical narrowband emission spectrum. The illustrated narrowband emission spectrum is within the narrowband emission limits of FIG. 14. As stated above, a typical narrowband emission source includes microprocessors, clocks, pulse width modulated motor drivers and light dimmers and chopping type power supplies. The narrowband emission spectrum of FIG. 13 is provided for illustration only and is not intended to be limiting. One skilled in the art will appreciate that narrowband emission spectrums depend on the characteristics of a given circuit or device.

Figure 16:
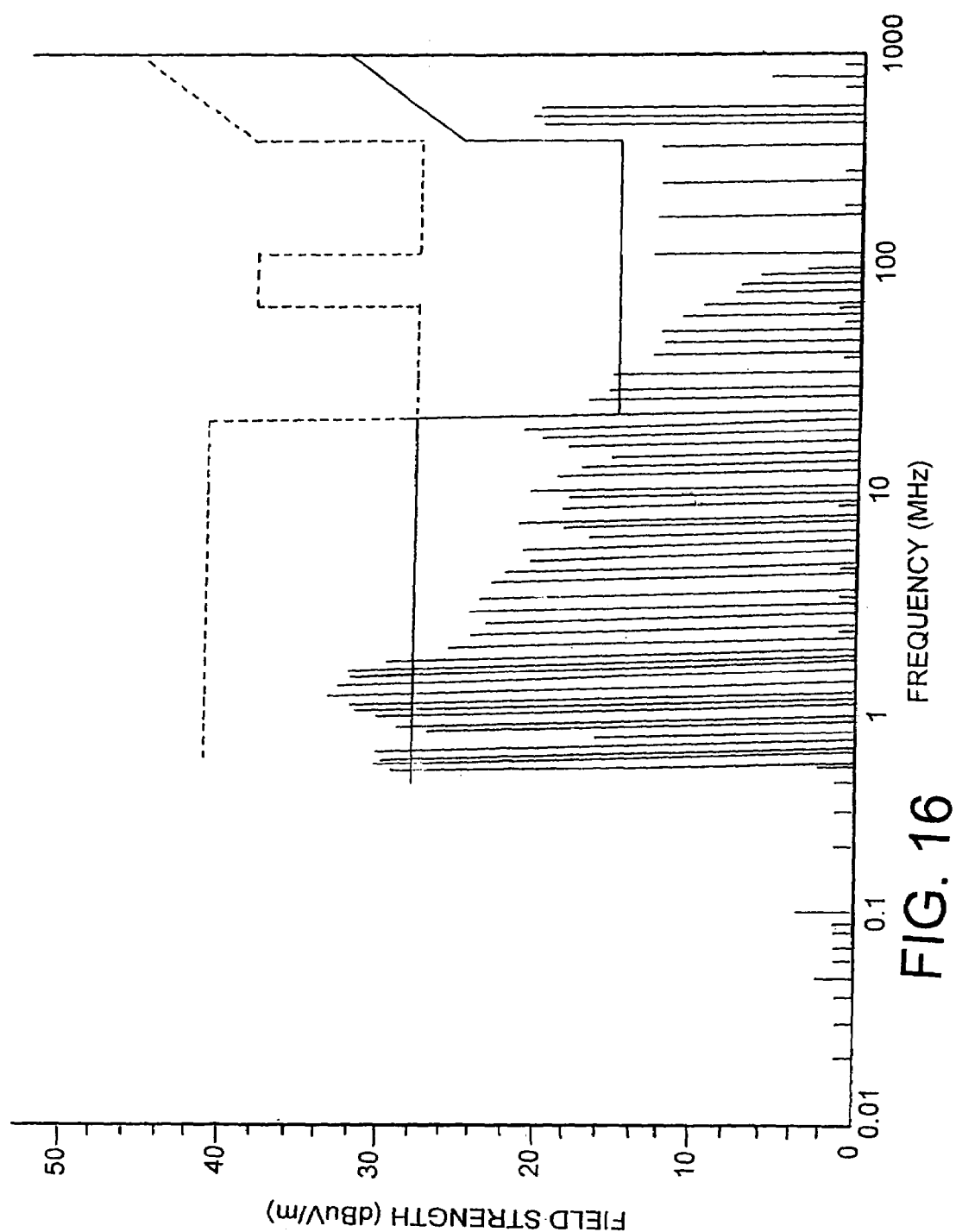
FIG. 16 is a graphical illustration of a typical broadband EMI emission spectrum.

FIG. 16 graphically depicts a typical broadband emission spectrum. The broadband emission spectrum, of FIG. 16, is within the broadband emission limits as set forth in FIG. 14. As previously stated, a typical broadband emission source includes ignition systems and brush type DC motors. The illustrated broadband emission spectrum is only provided as an example and is not intended to be limiting. One skilled in the art will appreciate that broadband emission spectrums also depend on the characteristics of a given circuit or device.

To obtain a rearview mirror assembly meeting the above EMI criteria, the circuitry disclosed in commonly assigned U.S. patent application Ser. No. 09/359,616, filed on Jul. 22, 1999 is preferably utilized. The entire disclosure of U.S. patent application Ser. No. 09/359,616 is incorporated herein by reference. A way to further ensure that the above-described rearview mirror assembly meets the EMI requirements is to encase one or more of printed circuit boards 110 and 112 in a metal case such as a copper case, or a plastic case or mirror housing coated with a conductive/resistive coating such as a vacuum metallized coating or a copper-silver-loaded paint. Preferably, the circuit elements that require such shielding are provided on only one of the two circuit boards such that only one of the circuit boards need be encased since it is preferred that the antennas not be so encased.

Other techniques for ensuring that the above-described rearview mirror assembly meets the EMI requirements is to utilize time multiplexing. This may be accomplished by utilizing a jittered clock source, or otherwise managing which tasks are performed within the mirror at any given instant. For example, when an RF receiver within the mirror housing is actively receiving an RF signal, one or more of the other functions within the mirror may be temporarily disabled. Given the short duration intervals at which an RF signal may be received, suspending other functions may be accomplished with little disruption. In general, the EMI levels of a rearview mirror assembly may be measured for each separate function it performs and for various combinations of the functions to determine which functions may be enabled simultaneously, and which functions may not be enabled when other functions are being performed. Priorities for these functions would also need to be established.

In some implementations of the inventive telematics system, it may be necessary to utilize two different power supplies to generate different voltages for the various components of the circuit. For example, the display may require a twelve-volt supply and various processors within the circuit may require five volts. These power supplies may be switched power supplies, which operate at different frequencies. The frequency at which one power supply may operate may be a multiple of the frequency at which another power supply operates. To reduce the EMI levels produced by the switched power supplies, it may be desirable to synchronize these switched power supplies so as to not produce sum and difference signals from the resultant EMI that is generated by these supplies. By eliminating the sum and difference signals, those frequency components are not present in the EMI and it is easier to focus efforts on eliminating the EMI generated at the particular frequency components at which the switched power supplies operate.

Internal Speakers

While the use of the vehicle's existing audio system is the preferred way to play back audio from a rearview mirror incorporating the telematics components of the present invention, some vehicle radios do not include an audio input jack that would enable remote use of the speakers. Further, even in vehicles that come with a standard radio having an input jack, there is the possibility that the vehicle owner may replace the radio with an after-market radio that does not include such an input jack. For these reasons, it may be desirable to incorporate and utilize internal speakers within the rearview mirror assembly.

Providing speakers in a rearview mirror presents several challenges. First, the speakers have to be very small and yet create an output loud enough to be clearly heard over the typical background noise present in a vehicle. Second, the microphone, if exposed to the required loud speaker output, will become overloaded. Even through the use of switching to shut off either the speaker or the microphone, this overloading can cause problems. Switching, though common in hands-free telephones, is generally undesirable and can be avoided provided that the speaker sound is not loud relative to the driver's speech level at the microphone.

Figure 17:
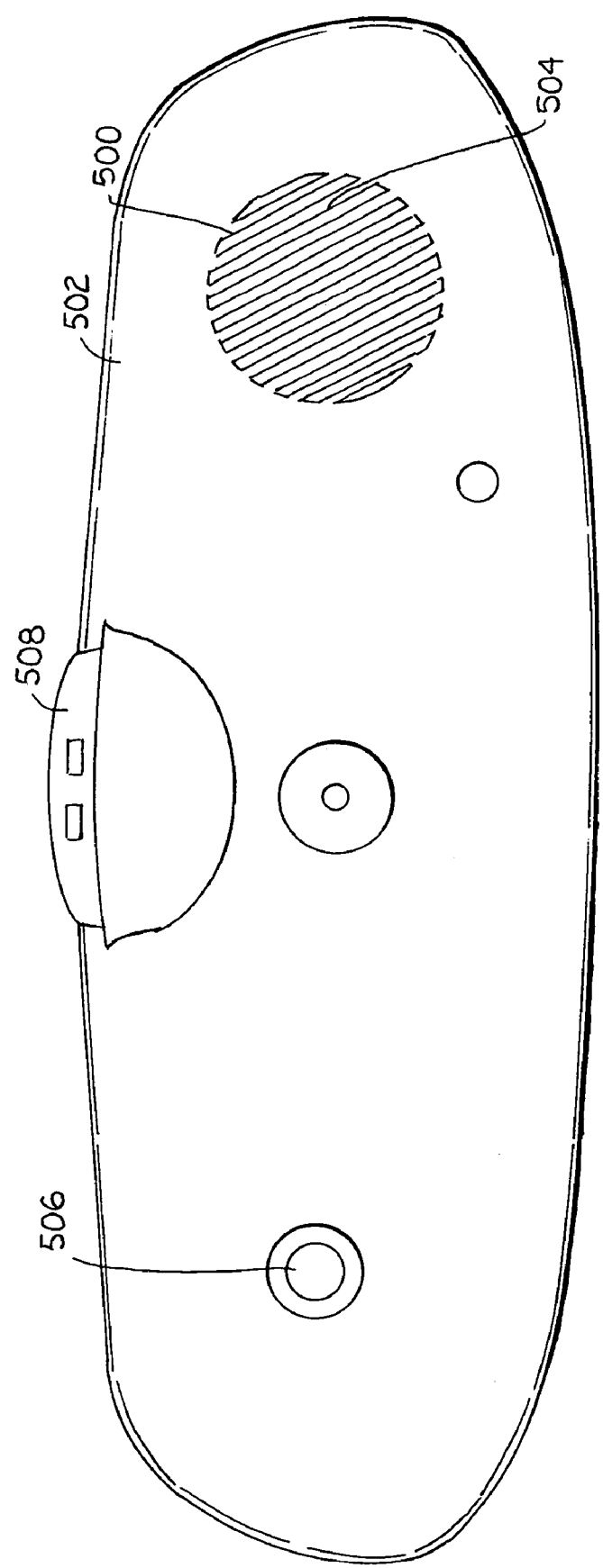
FIG. 17 is a perspective view of a rearview mirror constructed in accordance with another embodiment of the present invention.

In accordance with one aspect of this invention, the above-noted microphone overload problem may be ameliorated by positioning a speaker at one end of the rearview mirror housing and providing an acoustically coupled port at the opposite end of the rearview mirror assembly. An example of such a rearview mirror is shown in FIG. 17. As shown, a speaker 500 is positioned on the forward-facing surface of the rearview mirror housing 502 (the "forward-facing surface" is that which faces toward the windshield and opposite that which faces the driver). The speaker is positioned so as to generate sound toward the vehicle windshield such that the higher frequency sound is reflected towards the driver's ears. In this regard, louvers 504 may be disposed as a grill for speaker 500 to direct the sound in a desired direction. Louvers 504 also serve to protect speaker 500 from damage. The rearview mirror housing 502 further includes an acoustic port 506 disposed on an opposite end from speaker 500. Port 506 also preferably opens towards the windshield so as to project sound towards the windshield such that it may be reflected towards the driver's ears and away from microphone 508. Preferably, microphone 508 is mounted midway on or within rearview mirror housing 502 between speaker 500 and acoustic port 506. Because the sound exiting acoustic port 506 is 180 degrees out of phase with the sound generated from speaker 500, the sound levels to which microphone 508 is exposed would be nulled at certain lower wavelengths.

Figure 18:
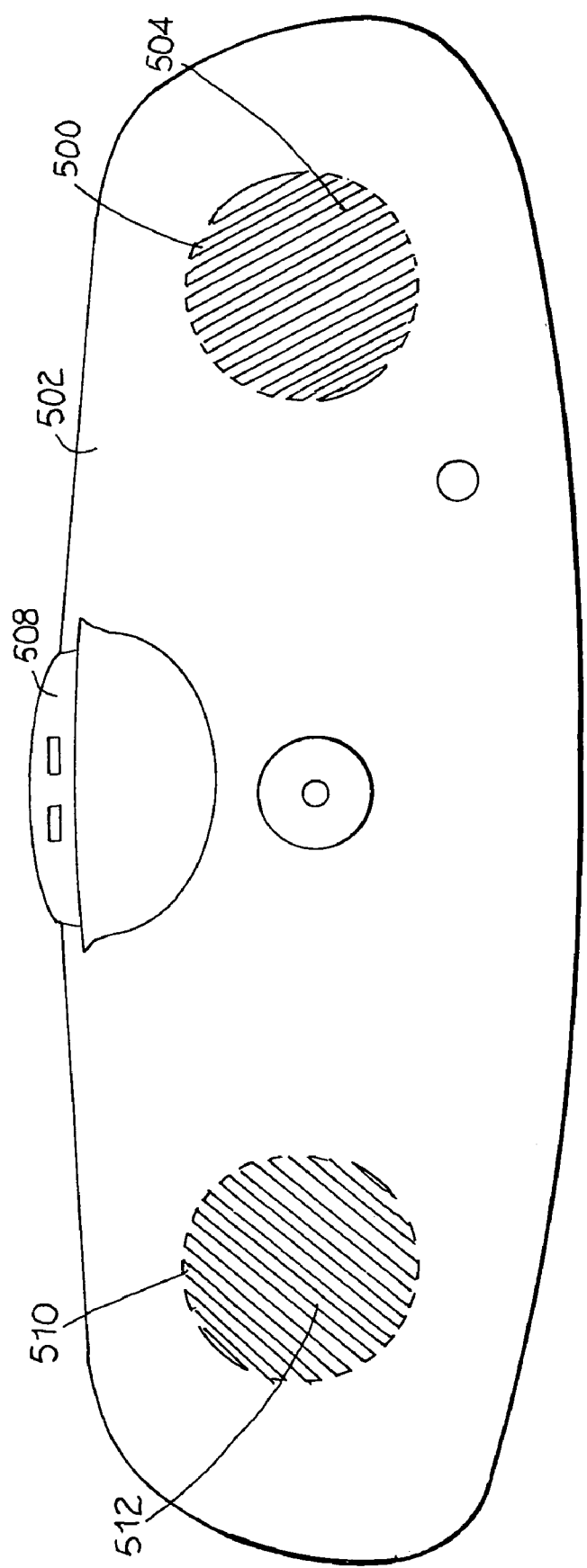
FIG. 18 is a perspective view of a rearview mirror constructed in accordance with another embodiment of the present invention.

An alternative internal speaker construction is shown in FIG. 18. In this assembly, a second speaker 510 having louvers 512 is utilized in place of acoustic port 506. By utilizing two speakers, the acoustic power may be effectively doubled. The use of two speakers also allows for smaller speakers to be utilized than would otherwise be utilized if only one speaker was used. By using two speakers at each end of mirror housing 502 facing towards the windshield, a dipole may be created. Speakers 500 and 510 are preferably driven out of phase such that sound on the left side of the microphone is out of phase with the sound on the right side. In the center, where microphone 508 is disposed, there would be a null so that the effect of providing the internal speakers would be minimized.

Dipolar output is very efficient around 1 kHz, since half-wave spacing is possible. Assuming a deep null over the microphone is desirable, active null adjustment may be achieved. The two speaker outputs may be adjusted on a band by band basis to minimize the speaker-generated sound sensed by microphone 508.

Speakers 500 and 510 may be directly driven by two electrical signals that are out of phase. Alternatively, the two speakers may be connected via an acoustically inductive duct. A resonant frequency would be chosen to support lower frequency efficiency. The inductance of the duct would decouple the cavities at higher frequencies. One advantage to utilizing direct electrical drive of the speakers is that the extent to which the speakers are driven out of phase may be dynamically adjusted in response to the signal obtained from the microphone. In this manner, the frequency band that is nulled may be adjusted. Such adjustment may be desirable due to the fact that the mirror may be tilted in relation to the windshield and may differ from one vehicle to another.

An additional advantage of utilizing two speakers is the redundancy that is provided such that the failure of one of the speakers would not stop output, but only eliminate the benefits of utilizing two separate speakers.

An added benefit of providing internal speakers in a rearview mirror assembly is that the speakers may also be used for generating sound from the vehicle's audio system. For example, such speakers could be used for a central or mono channel output from the vehicle's radio. Such a center channel is desirable in light of the implementation of various multi-media equipment, such as televisions and VCRs, in a vehicle.

Speakers 500 and 510 are preferably lightweight piezo electric speakers so that they would not interfere with a magnetic compass that may be located within the rearview mirror assembly or otherwise located proximate the rearview mirror assembly. The speakers are preferably driven using a class D amplifier.

While the internal speakers have been described as being positioned in the rearview mirror housing, at least one speaker may be located in a housing mounted to the foot of the rearview mirror assembly. For example, a speaker could be mounted in antenna housing 54.

If use of the vehicle audio system is possible without providing added speakers, it may be desirable to provide audio input signals to the vehicle's radio where the audio signal for the left channel is inverted relative to that of the right channel. In this manner, a null may be created near the center of the vehicle where the microphone is mounted on the rearview mirror assembly. This would generally create a null at low frequencies where acoustic feedback is generally the worst.

Additionally, if a microphone and speaker are to be mounted in a proximity to one another in the same or different housings of one or more vehicle component, such as a visor, overhead console, A-pillar, instrument panel, etc., similar techniques to those employed in a rearview mirror may be utilized. For example, if a microphone and speaker are both mounted in a sun visor, a second speaker or port may be provided such that the microphone lies between the first speaker and either a second speaker or port, which provides an out-of phase signal to create a null at the microphone.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention.

The invention claimed is:

1. A rearview assembly for a vehicle comprising:
a mirror mounting structure including a mirror housing and adapted to be mounted to the vehicle;
electronic circuitry contained in said mirror housing;
an antenna for a wireless telephone mounted to said mirror mounting structure; and
an electromagnetic shield provided between said electronic circuitry and said antenna to substantially block electromagnetic radiation generated by said electronic circuitry from reaching said antenna.

2. The rearview mirror assembly of claim 1, wherein said antenna is mounted to said mirror housing.

3. The rearview mirror assembly of claim 1, wherein said electromagnetic shield is electrically coupled to a ground of said antenna to function as a ground plane.

4. The rearview mirror assembly of claim 1, wherein said electromagnetic shield includes a conductive coating on an inside surface of said mirror housing.

5. The rearview mirror assembly of claim 4, wherein said mirror housing includes an aperture extending from an outside surface of said housing to the inside of said housing and through said conductive coating, said antenna is part of an antenna structure that is mounted to said mirror housing, and a portion of said antenna structure extends through said aperture.

6. The rearview mirror assembly of claim 5, wherein at least one electrical lead from said antenna extends through said aperture.

7. The rearview mirror assembly of claim 1, wherein said electronic circuitry is disposed between two circuit boards, and wherein said electromagnetic shield includes a shielding gasket disposed between the two circuit boards and surrounding said electronic circuitry.

8. The rearview mirror assembly of claim 1, wherein said mirror housing exhibits an electromagnetic interference level less than about 41 dBµV/m for emissions in the frequency range from about 0.4 MHz to about 20 MHz.

* * * * *